United States Patent
Milanovich

(10) Patent No.: US 9,777,547 B1
(45) Date of Patent: Oct. 3, 2017

(54) BLOWOUT PREVENTERS MADE FROM PLASTIC ENHANCED WITH GRAPHENE, PHOSPHORESCENT OR OTHER MATERIAL, WITH SLEEVES THAT FIT INSIDE WELL PIPES, AND MAKING USE OF WELL PRESSURE

(71) Applicant: Philip John Milanovich, Butte, MT (US)

(72) Inventor: Philip John Milanovich, Butte, MT (US)

(73) Assignee: Milanovich Investments, L.L.C., Phoenix, AZ (US)

( * ) Notice: Subject to any disclaimer, the term of this patent is extended or adjusted under 35 U.S.C. 154(b) by 0 days.

(21) Appl. No.: 15/197,626

(22) Filed: Jun. 29, 2016

Related U.S. Application Data

(60) Provisional application No. 62/185,728, filed on Jun. 29, 2015, provisional application No. 62/239,189,
(Continued)

(51) Int. Cl.
  *E21B 33/06* (2006.01)
  *E21B 33/068* (2006.01)
  (Continued)

(52) U.S. Cl.
  CPC .............. *E21B 33/063* (2013.01); *C08K 3/04* (2013.01); *E21B 29/08* (2013.01);
  (Continued)

(58) Field of Classification Search
  CPC .......... E21B 21/10; E21B 21/14; E21B 34/06; E21B 34/10; E21B 43/12; E21B 43/128;
  (Continued)

(56) References Cited

U.S. PATENT DOCUMENTS

| 1,543,456 A | 6/1925 | Stirling |
| 3,548,848 A | 12/1970 | Stichling |

(Continued)

FOREIGN PATENT DOCUMENTS

| CA | 2 506 828 | 10/2006 |
| CN | 103865205 A | 6/2014 |

(Continued)

*Primary Examiner* — Michael R Reid
*Assistant Examiner* — Jonathan Waddy
(74) *Attorney, Agent, or Firm* — Swift & Swift, Attorneys at Law, P.L.L.C.; Stephen Christopher Swift

(57) ABSTRACT

Blowout preventers made from plastic infused with graphene, phosphorescent material, and/or other enhancing material. They include a sleeve that is inserted into a well pipe or other opening from which first fluid (such as petroleum or natural gas) is escaping, to stop it from escaping. The large end of a funnel id placed over the well pipe opening. The small end of the funnel is connected to a return pipe. A high pressure pipe (through which a second fluid flows) with a smaller diameter is inserted into the opening. The primary source of power for the apparatus is the pressure from the fluid escaping from the well pipe or other opening, which turns a turbine and propellers that push the device down into the opening to stop the fluid from escaping. If the pressure from the escaping fluid does not provide enough power itself, supplemental power may be used.

9 Claims, 56 Drawing Sheets

Related U.S. Application Data filed on Oct. 8, 2015, provisional application No. 62/289,326, filed on Jan. 31, 2016.

(51) Int. Cl.
  *E21B 29/08* (2006.01)
  *E21B 34/06* (2006.01)
  *E21B 43/01* (2006.01)
  *E21B 43/12* (2006.01)
  *C08K 3/04* (2006.01)

(52) U.S. Cl.
  CPC ........ *E21B 43/0122* (2013.01); *E21B 33/068* (2013.01); *E21B 34/06* (2013.01); *E21B 43/12* (2013.01)

(58) Field of Classification Search
  CPC .... E21B 43/0122; E21B 29/08; E21B 33/063; E21B 33/068
  USPC ................ 251/1.1; 166/242.1, 319, 373, 374
  See application file for complete search history.

(56) References Cited

U.S. PATENT DOCUMENTS

| | | |
|---|---|---|
| 3,766,979 A | 10/1973 | Petrick |
| 3,980,094 A | 9/1976 | Schroder et al. |
| 3,980,138 A | 9/1976 | Knopik |
| 4,215,749 A | 8/1980 | Dare et al. |
| 4,220,207 A | 9/1980 | Allen |
| 4,301,827 A | 11/1981 | Murthy |
| 4,376,467 A | 3/1983 | Allen |
| 4,440,523 A | 4/1984 | Milgram et al. |
| 4,523,639 A | 6/1985 | Howard, Jr. |
| 4,568,220 A | 2/1986 | Hickey |
| 4,605,069 A | 8/1986 | McClaflin et al. |
| 4,619,284 A | 10/1986 | Delarue et al. |
| 4,969,676 A | 11/1990 | LaMagna |
| 5,012,854 A | 5/1991 | Bond |
| 5,064,164 A | 11/1991 | Le |
| 5,135,591 A | 8/1992 | Vockel, Jr. et al. |
| 5,156,212 A | 10/1992 | Bryant |
| 5,199,496 A | 4/1993 | Redus et al. |
| 5,735,502 A | 4/1998 | Levett et al. |
| 6,026,904 A | 2/2000 | Burd et al. |
| 6,059,040 A | 5/2000 | Levitan et al. |
| 6,119,779 A | 9/2000 | Gipson et al. |
| 6,354,568 B1 | 3/2002 | Carruthers |
| 6,601,888 B2 | 8/2003 | McIlwraith et al. |
| 6,739,570 B2 | 5/2004 | Carlsen |
| 7,243,713 B2 | 7/2007 | Isaacks |
| 7,785,557 B2 | 8/2010 | Gruner et al. |
| 7,987,903 B1 | 8/2011 | Garcia |
| 8,016,030 B1 | 9/2011 | Prado Garcia |
| 8,205,678 B1 | 6/2012 | Milanovich |
| 8,316,872 B1 | 11/2012 | Milanovich |
| 8,418,767 B1 | 4/2013 | Milanovich |
| 8,555,979 B1 | 10/2013 | Milanovich |
| 8,567,427 B1 | 10/2013 | Milanovich |
| 8,794,308 B1 | 8/2014 | Milanovich |
| 8,794,333 B1 | 8/2014 | Milanovich |
| 9,010,182 B1 | 4/2015 | Glenn |
| 2009/0050828 A1 | 2/2009 | Edwards |
| 2010/0171331 A1 | 7/2010 | Jonas et al. |
| 2011/0143045 A1 | 6/2011 | Veerasamy |
| 2013/0309475 A1 | 11/2013 | Veerasamy |
| 2014/0144541 A1 | 5/2014 | De Carvalho et al. |
| 2014/0147675 A1 | 5/2014 | Han et al. |
| 2015/0099214 A1 | 4/2015 | Khe et al. |

FOREIGN PATENT DOCUMENTS

| | | |
|---|---|---|
| CN | 104004252 A | 8/2014 |
| CN | 104151696 A | 11/2014 |
| GB | 2 175 328 | 11/1986 |
| SU | 1427057 | 9/1988 |

BLOWOUT PREVENTERS MADE FROM PLASTIC ENHANCED WITH GRAPHENE, PHOSPHORESCENT OR OTHER MATERIAL, WITH SLEEVES THAT FIT INSIDE WELL PIPES, AND MAKING USE OF WELL PRESSURE

CROSS REFERENCE TO RELATED APPLICATION

This application is based on and claims the benefit of Provisional Patent Application Ser. No. 62/185,728, filed Jun. 29, 2015, Provisional Patent Application Ser. No. 62/239,189, filed Oct. 8, 2015, Provisional Patent Application Ser. No. 62/289,326, filed Jan. 31, 2016, which are incorporated herein by reference.

BACKGROUND OF THE INVENTION

1. Field of the Invention

The present invention relates to blowout preventers made from plastic, which may be enhanced with graphene, phosphorescent material or other suitable material, having sleeves that fit inside well pipes, and make use of well pressure.

2. Description of the Prior Art

As shown by events six years ago in the Gulf of Mexico, and more recently in California, oil and gas well blowouts are a serious threat to the environment, and can be very costly. There is a need for reliable devices for recovering from blowouts. None of the prior inventions discussed below are equivalent to the present invention.

U.S. Pat. No. 1,543,456 issued on Jun. 23, 1925, to Robert Stirling, discloses a blowout preventer, without the use of plastics as in the instant invention.

U.S. Pat. No. 3,548,848, issued on Dec. 22, 1970, to Gerhardt C. Stichling, discloses explosively actuated valves, but does not disclose the use of plastics in a blowout control device, as in the instant invention.

U.S. Pat. No. 3,766,979, issued on Oct. 23, 1973, to John T. Petrick, discloses a well casing cutter and sealer, but does not disclose the use of plastics, as in the instant invention.

U.S. Pat. No. 3,980,094, issued on Sep. 14, 1976, to Fritz Schröder and Klaus Rössel, discloses a quick action slide valve with a sliding plate, but does not disclose the use of plastics as in the instant invention.

U.S. Pat. No. 3,980,138, issued on Sep. 14, 1976, to Duane L. Knopik, discloses an underground fluid recovery device, but does not disclose the use of plastics, as in the instant invention.

U.S. Pat. No. 4,215,749, issued on Aug. 5, 1980, to Roy R. Dare and Jeff L. Merten, discloses a gate valve for shearing workover lines to permit shutting a well, using a shear plate and pistons. The instant invention is distinguishable, in that only uses plastic parts.

U.S. Pat. No. 4,220,207, issued on Sep. 2, 1980, to Neil W. Allen, discloses a sea floor diverter, without the use of plastics, as in the instant invention.

U.S. Pat. No. 4,301,827, issued on Nov. 24, 1981, to Rajam R. Murthy and Billy J. Rice, discloses a guided-float accumulator suitable for use with a hydraulic system for an oil well blowout preventer, using reaction forces that oppose Bernoulli effect forces, but does not disclose the use of plastics, as in the instant invention.

U.S. Pat. No. 4,376,467, issued on Mar. 15, 1983, to Neil W. Allen, discloses a sea floor diverter, without the use of plastics, as in the instant invention.

U.S. Pat. No. 4,440,523, issued on Apr. 3, 1984, to Jerome H. Milgram and James Burgess, discloses a separating collector for subsea blowouts, but does not disclose the use of plastics, as in the instant invention.

U.S. Pat. No. 4,523,639 issued on Jun. 18, 1985, to Roland M. Howard, Jr., discloses ram-type blowout preventers, with a piston and a locking mechanism to hold the plate in the channel after the pipe has been cut, but does not disclose part made from plastic, as in the instant invention.

U.S. Pat. No. 4,568,220, issued on Feb. 4, 1986, to John J. Hickey, discloses a system for capping and/or controlling undersea oil or gas well blowouts, but without the use of plastics as in the instant invention.

U.S. Pat. No. 4,605,069, issued on Aug. 12, 1986, to McClafin et al., discloses a method for producing heavy, viscous crude oil, but does not disclose the use of plastics, as is the instant invention.

U.S. Pat. No. 4,619,284, issued on Oct. 28, 1986, to Jean-Jacques Delarue and Claude Ego, discloses a pyrotechnic valve that may either close an initially open pipe or open an initially closed pipe, but does not disclose the use of plastic parts, as in the instant invention.

U.S. Pat. No. 4,969,676, issued on Nov. 13, 1990 to Joseph L. LaMagna, discloses an air pressure pick-up tool using the Bernoulli effect, but does not disclose the use of plastics, as is the instant invention.

U.S. Pat. No. 5,012,854, issued on May 7, 1991, to John A. Bond, discloses a pressure release valve for a subsea blowout preventer that is a hydraulically operated, without making use of plastics, as in the instant invention.

U.S. Pat. No. 5,064,164, issued on Nov. 12, 1991, to Tri C. Le, discloses a blowout preventer with metal inserts resembling the plates in the instant invention, but does not disclose parts made from plastic, as in the instant invention.

U.S. Pat. No. 5,135,591, issued on Aug. 4, 1992, to Richard L. Vockel, Jr., Robert E. Myers and Ladson L. Fraser, discloses a process of making a phosphorescent fiber reinforced plastic article, but does not disclose its use in making a blowout preventer, as in the instant invention.

U.S. Pat. No. 5,156,212, issued on Oct. 20, 1992, to Thomas B. Bryant, discloses a method and system for controlling high pressure flow, such as in containment of oil and gas well fires, but does not disclose pistons whose movement is limited by flanges, as in the instant invention.

U.S. Pat. No. 5,199,496, issued on Apr. 6, 1993, to Clifford L. Redus and Peter L. Sigwardt, discloses a subsea pumping device incorporating a wellhead aspirator, using the Bernoulli effect, but does not disclose the use of plastics, as in the instant invention.

U.S. Pat. No. 5,735,502, issued on Apr. 7, 1998, to Bryce A. Levett and Mike C. Nicholson, discloses a blowout preventer with ram blocks resembling the plates in the instant invention, and is hydraulically actuated. The instant invention is distinguishable in that it has plastic parts.

U.S. Pat. No. 6,026,904, issued on Feb. 22, 2000, to James A. Burd and Kenneth J. Huber, discloses a method and apparatus for commingling and producing fluids from multiple production reservoirs, but it does not disclose the use of plastics, as is the instant invention.

U.S. Pat. No. 6,059,040, issued on May 9, 2000, to Leonid L. Levitan, Vasily V. Salygin and Vladimir D. Yurchenko, discloses a method and apparatus for the withdrawal of liquid from well bores, but not the use of plastics, as in the instant invention.

U.S. Pat. No. 6,119,779, issued on Sep. 19, 2000, to Larry Joe Gipson and Stephen Leon Carn, discloses a method and system for separating and disposing of solids from produced fluids, but it does not disclose the use of plastic valves and piping, as in the instant invention.

U.S. Pat. No. 6,354,568, issued on Mar. 12, 2002, to Alec Carruthers, discloses a sliding plate valve, but does not disclose the use of plastics, as in the instant invention.

U.S. Pat. No. 6,601,888, issued on Aug. 5, 2003, to Lon McIlwraith and Andrew Christie, discloses contactless handling of objects, using the Bernoulli effect, but the use of plastics, as in the instant invention.

U.S. Pat. No. 6,739,570, issued on May 25, 2004, to Hans-Paul Carlsen, discloses a valve element, which may be used for closing a channel in a blowout preventer, but does not disclose the use of plastics, as in the instant invention.

U.S. Pat. No. 7,243,713, issued on Jul. 17, 2007, to C. Steven Isaacks, discloses a shear/seal assembly for a ram-type blowout prevention system. The instant invention is distinguishable, in that it discloses the use of parts made from plastics.

U.S. Pat. No. 7,785,557, issued on Aug. 31, 2010, to George Gruner, David Hecht and Liangbing Hu, discloses a method of producing a graphene film as transparent and electrically conducing material, but does not disclose its use in a blowout preventer, as in the instant invention.

U.S. Pat. No. 7,987,903, issued on Aug. 2, 2011, to Jose Jorge Prado Garcia, discloses an apparatus and method for containing oil from a deep water well, but does not disclose the use of plastics, as in the instant invention.

U.S. Pat. No. 8,016,030, issued on Sep. 13, 2011, to Jose Jorge Prado Garcia, discloses an apparatus and method for containing oil from a deep water oil well, but does not disclose the use of plastics, as in the instant invention.

U.S. Pat. No. 9,010,182, issued on Apr. 21, 2015, to Matthew S. Glenn, discloses a rain gauge, which includes a tube with phosphorescent material, but does not disclose the use of tubes with phosphorescent material in blowout preventers, as in the instant invention.

U.S. Patent Application Publication No. 2009/0050828, published on Feb. 26, 2009, to Jeffrey Charles Edwards, discloses blowout preventers with a housing having a throughbore resembling the channel in the instant invention, which may be closed by a pair of opposed rams, but does not disclose the use of plastics, as in the instant invention.

U.S. Patent Application Publication No. 2010/0171331, published on Jul. 8, 2010, to Stefan Jonas and Lutz Redmann, discloses a Bernoulli gripper for holding two-dimensional components such as silicon-based wafers, but does not disclose the use of plastic valves and piping, as is the instant invention.

U.S. Patent Publication No. 2011/0143045, published on Jun. 16, 2011, invented by Vijayen S. Veerasamy, discloses large area deposition of graphene on substrates, and products including the same, but does not disclose its use in blowout preventers, as in the instant invention.

U.S. Patent Publication No. 2013/0309475, published on Nov. 21, 2013, invented by Vijayen S. Veerasamy, also discloses large area deposition of graphene on substrates, and products including the same, but again does not disclose its use in blowout preventers, as in the instant invention.

U.S. Patent Publication No. 2014/0144541, published on May 29, 2014, invented by André Luis Moreira De Carvalho and Nadia Khaled Zurba, discloses graphene-based steel tubes, pipes or risers, methods for the production thereof and the use thereof for conveying petroleum, gas and biofuels, but does not disclose graphene impregnated plastic tubes, pipes or risers, as in the instant invention.

U.S. Patent Publication. No. 2014/0147675, published on May 29, 2014, invented by Shu-Jen Han and Qing Cao, discloses a structure and method for a graphene-based apparatus, but does not disclose its use in blowout preventers, as in the instant invention.

U.S. Patent Publication. No. 2015/0099214, published on Apr. 9, 2015, invented by Nguyen C. Khe, Hieu Dinh and Dien Dinh, discloses a physically functionalized graphene hybrid composite and its applications, but does not disclose its use in blowout preventers, as in the instant invention.

British Patent No. 2 175 328, published on Nov. 26, 1986, to Richard Theodore Mitchell, discloses an oil well drilling apparatus, including a blowout preventer stack, without the use of plastic parts, as in the instant invention.

Canadian Patent No. 2 506 828, published on Oct. 29, 2006, inventors Dean Foote and Scott Delbridge, discloses a blowout preventer with rams that are hydraulically actuated, without the use of plastic parts, as in the instant invention.

Soviet Patent No. 1427057, published Sep. 30, 1988, inventors Y. U. A. Gavrilin, L. M. Torsunov and B. V. Venedictov, discloses a blowout preventer with a flat blocking gate, but does not disclose the use of plastic parts, as in the instant invention.

Chinese Patent Publication No. 103865205A, published on Jun. 18, 2014, invented by Ji Nun et. al., discloses high-strength plastic pipe made using graphene, but does not disclose its use in blowout preventers, as in the instant invention. (Only the English Abstract of this document is available in the Public Search Room in the headquarters of the U.S. Patent & Trademark Office.)

Chinese Patent Publication No. 104004252A, published on Aug. 27, 2014, invented by Chen Houzhong, discloses a method of preparing graphene-modified polyethylene aluminum-plastic composite tubing, but does not disclose its use in blowout preventers, as in the instant invention. (Only the English Abstract of this document is available in the Public Search Room in the headquarters of the U.S. Patent & Trademark Office.)

Chinese Patent Publication No. 104151696A, published on Nov. 19, 2014, invented by Chen Houzhong, discloses a method of preparing graphene-modified polypropylene steel-plastic composite pipe, but does not disclose its use in blowout preventers, as in the instant invention. (Only the English Abstract of this document is available in the Public Search Room in the headquarters of the U.S. Patent & Trademark Office.)

U.S. Pat. No. 8,205,678, issued on Jun. 26, 2012, U.S. Pat. No. 8,418,767, issued on Apr. 16, 2013, U.S. Pat. No. 8,555,979, issued on Oct. 15, 2013, and U.S. Pat. No. 8,651,189, issued on Feb. 18, 2014, all to Philip John Milanovich, the inventor and applicant herein, all disclose a blowout preventer with a Bernoulli effect suck-down valve. The instant invention is distinguishable, in that only it discloses the use of plastic valves and piping.

U.S. Pat. No. 8,316,872, issued on Nov. 27, 2012, U.S. Pat. No. 8,567,427, issued on Oct. 29, 2013, and U.S. Pat. No. 8,794,308, issued on Aug. 5, 2014, all to Philip John Milanovich, the inventor and applicant herein, disclose blowout preventers using plates propelled by explosive charges. The instant invention is distinguishable, in that only it discloses the use of plastic parts.

U.S. Pat. No. 8,794,333, issued on Aug. 5, 2014, to Philip John Milanovich, the inventor and applicant herein, discloses a blowout preventer that uses both plates propelled by explosive charges and a Bernoulli effect suck-down valve, but does not disclose the use of plastics, as in the instant invention.

None of the above inventions and patents, taken either singly or in combination, is seen to describe the instant invention as claimed.

SUMMARY OF THE INVENTION

The present invention is a blowout recovery valve, including a large frustoconical funnel or valve, made of metal or other suitable material. The large end of the funnel placed over a well pipe (or other pipe) through which oil (or natural gas or other fluid) is flowing out. The small end of the valve is connected to a return pipe. A high pressure (air separating) pipe with a smaller diameter is inserted into the well pipe. Air is pumped under high pressure through the high pressure pipe, separating the oil and forcing the oil that is not kept down in the well pipe by the pressure up through the return pipe. The funnel or valve is aligned and held in alignment by cylindrical positioning rings of varying diameters (that may also have varying heights and shapes). The funnel and valve are kept on the well pipe by one or more of the following: well pressure, a sleeve with a locking collar, positioning arms, turbines, propellers, and the Bernoulli effect, as well as pressure from the surrounding sea water. Sonar, or lights and cameras, may be used to locate the well pipe so that the funnel or valve can be attached to it. A first gasket at the top end of the channel prevents leaks. Channels and rotating turbines near the top of the valve, rotating propeller blades on or near the end of the high pressure (air separating) pipe, and pressure from the oil in the well pipe itself (typically having an upward pressure of 30,000 or more pounds per square inch—which may itself drive the turbines and propeller blades) accelerate the flow and increase the suction by increasing propeller and turbine speed (i.e., a ram jet effect), as well as reducing pressure and increasing the suction due to the Bernoulli effect. The turbines and rotating propellers may themselves be accelerated by the pressure from the well pipe, further increasing the Bernoulli effect. The suction due to the Bernoulli effect, the rotating propeller blades and stacked turbines results in the sucking down of the valve into the fluid flowing from the pipe, as the increased velocity of the oil acts like the thrust of a ram jet, forcing the funnel and valve down onto the well pipe. In underwater applications, the added pressure provided by the water to the outside of the funnel will also aid in the attachment of the funnel to the well pipe. At a depth of one mile below the surface of the sea, the water pressure is 2,300 to 2,500 pounds per square inch.

Neither U.S. Pat. No. 8,205,678, issued on Jun. 26, 2012 to the present Applicant, for a Blowout Preventer with a Bernoulli Effect Suck-Down Valve, nor any of Applicant's subsequent patents, disclosed the use of the pressure from the flow pipe to increase the propeller speed and turbine speed (the ram jet effect) as well as the Bernoulli effect.

The Applicant's first Continuation-In-Part, issued as U.S. Pat. No. 8,418,767 on Apr. 16, 2013, included the following additional features: 1. Jets by which the funnel may be moved into alignment with the well pipe. 2. Sensing devices on moveable arms. 3. A stopper that may be forced into the well pipe. 4. One-way valves in the stopper. 5. Stacked turbines in the return pipe. 6. A second gasket with pivoting overlapping plates.

Applicant's second Continuation-In-Part, issued as U.S. Pat. No. 8,555,979 on Oct. 15, 2013, included the following additional features: 1. Positioning arms by which the funnel and stopper may be moved into alignment with the well pipe. 2. Propellers at or near the end of the high pressure (air separating) pipe accelerate the flow of oil and increase the suck-down effect.

Applicant's U.S. Pat. No. 8,651,189, issued on Feb. 18, 2014, had the following new features, which distinguish it in a non-obvious manner from the above-mentioned prior applications of the inventor: 1. A sleeve, suitably dimensioned and configured to be placed over a portion of the well pipe adjacent to the open end of the well pipe, with the sleeve being connected to the return pipe. 2. A locking collar attached to the sleeve. 3. Cylindrical positioning rings attached to the high pressure pipe, that can fit inside the well pipe, and may have different diameters, heights and shapes, to help position the valve, funnel and sleeve onto the well pipe. 4. A sharp edge extending from the sleeve, by which irregularities in the well pipe can be cut. 5. Lasers or other cutting devices attached to extension arms, that can also cut irregularities in the well pipe. 6. The slope of the funnel can be changed. 7. The funnel and/or valve can be removed and raised to the surface with the aid of floats.

The present application is an original application, and does not claim priority from the inventor's prior nonprovisional applications, even though they are discussed herein.

The present invention is also of blowout preventers made from plastic, which is preferably enhanced with suitable materials, including graphene and/or flourescent material. Plastic can be infused with graphene, phosphorescent material or fibers, or other materials, and plastic can be fused to other material such as metal or glass. Valves today and valves and piping in the oil industry are presently made of cast iron. Valves made plastic, its derivatives and additives, could be color coded, would be stronger, lighter, more flexible, easier to use and handle, have a greater productive life, be less expensive, be less likely to fail, be safer, be more chemically and physically resistant, be more impact resistant, be abrasive resistant, easier to repair, more cost effective, made to phosphoresce, and be more thermally and electrically conductive. Plastic may be injected into a mold to the desired thickness—varying as per need and usage. Other methods that may be used to produce valves or piping made of plastic combined with graphene, phosphorescent material, or other materials, include coating, dipping, laminating, painting, spraying, powder-coating, or patching, or covering.

The present invention is furthermore a blowout recovery valve with a sleeve that is inserted into a well pipe or other opening, through which oil, natural gas or other fluid is flowing out. The sleeve may be made of metal, plastic, cement, or any other suitable material. If the sleeve is made of plastic, graphene, nylon or other material may be added to the plastic. It may include a large frustoconical funnel or valve, made of metal, plastic or other suitable material. The large end of the funnel is placed over the opening through which the fluid is flowing out. The small end of the funnel is connected to a return pipe. A high pressure (air separating) pipe with a smaller diameter may be inserted into the well pipe. Air is pumped under high pressure through the high pressure pipe, separating the oil and forcing the oil that is not kept down in the well pipe by the pressure up through the return pipe. The sleeve and funnel are aligned and held in alignment by cylindrical positioning rings of varying diameters (that may also have varying heights and shapes). The sleeve and funnel are kept on the well pipe by one or more of the following: an expanding ring with a locking mechanism, well pressure, positioning arms, turbines, propellers, and the Bernoulli effect, as well as pressure from the surrounding sea water. Sonar, or lights and cameras, may be used to locate the well pipe so that the sleeve or funnel can be attached to it. A first gasket at the top end of a channel may prevent leaks. Channels and rotating turbines within the sleeve, rotating propeller blades around the high pressure (air separating) pipe, and pressure from the oil in the well pipe itself (typically having an upward pressure of 30,000 or more pounds per square inch—which may itself drive the turbines and propeller blades) accelerate the flow and increase the suction by increasing propeller and turbine speed (i.e., a ram jet effect), as well as reducing pressure and increasing the suction due to the Bernoulli effect. The turbines and rotating propellers may themselves be accelerated by the pressure from the well pipe, further increasing the Bernoulli effect. The suction due to the Bernoulli effect, the rotating propeller blades and stacked turbines results in the sucking down of the valve into the fluid flowing from the pipe, as the increased velocity of the oil acts like the thrust of a ram jet, forcing the funnel down onto the well pipe. In underwater applications, the added pressure provided by the water to the outside of the funnel will also aid in the attachment of the funnel to the well pipe. At a depth of one mile below the surface of the sea, the water pressure is 2,300 to 2,500 pounds per square inch.

Neither U.S. Pat. No. 8,205,678, issued on Jun. 26, 2012 to the present Applicant, for a Blowout Preventer with a Bernoulli Effect Suck-Down Valve, nor any of Applicant's subsequent patents, disclosed the use of a sleeve placed inside a well pipe or other opening from which fluid is escaping.

The Applicant's first Continuation-In-Part, issued as U.S. Pat. No. 8,418,767 on Apr. 16, 2013, included the following additional features. 1. Jets by which the funnel may be moved into alignment with the well pipe. 2. Sensing devices on moveable arms. 3. A stopper that may be forced into the well pipe. 4. One-way valves in the stopper. 5. Stacked turbines in the return pipe. 6. A second gasket with pivoting overlapping plates.

Applicant's second Continuation-In-Part, issued as U.S. Pat. No. 8,555,979 on Oct. 15, 2013, included the following additional features. 1. Positioning arms by which the funnel and stopper may be moved into alignment with the well pipe. 2. Propellers at or near the end of the high pressure (air separating) pipe accelerate the flow of oil and increase the suck-down effect.

Applicant's U.S. Pat. No. 8,651,189, issued on Feb. 18, 2014, had the following new features, which distinguish it in a non-obvious manner from the above-mentioned prior applications of the inventor: 1. A sleeve, suitably dimensioned and configured to be placed over (not inside) a portion of the well pipe adjacent to the open end of the well pipe, with the sleeve being connected to the return pipe. 2. A locking collar attached to the sleeve. 3. Cylindrical positioning rings attached to the high pressure pipe, that can fit inside the well pipe, and may have different diameters, heights and shapes, to help position the valve, funnel and sleeve onto the well pipe. 4. A sharp edge extending from the sleeve, by which irregularities in the well pipe can be cut. 5. Lasers or other cutting devices attached to extension arms, that can also cut irregularities in the well pipe. 6. The slope of the funnel can be changed. 7. The funnel and/or valve can be removed and raised to the surface with the aid of floats.

The present application is an original application, and does not claim priority from the inventor's prior non-provisional applications, even though they are discussed herein.

Accordingly, it is a first object of the invention to provide a blowout recovery valve having a sleeve that is place inside a well pipe or other opening from which petroleum, natural gas, or other fluid is escaping.

Accordingly, it is a second object of the invention to provide blowout preventers made from plastic.

It is third object of the invention to provide blowout preventers made from plastic enhanced with graphene.

It is a fourth object of the invention to provide blowout preventers made from plastic enhanced with phosphorescent material.

It is a fifth object of the invention to provide blowout preventers made from plastics enhanced with other materials.

It is a sixth object of the invention to provide a blowout recovery valve that has moving parts.

It is a seventh object of the invention to provide a blowout recovery valve that has no moving parts.

It is an eighth object of the invention to provide a blowout recovery valve that is removable and recoverable.

It is a ninth object of the invention to provide a blowout recovery valve with a removable and recoverable funnel.

It is a tenth object of the invention to provide a blowout recovery valve that does not leave the well site.

It is an eleventh object of the invention to provide a blowout recovery valve that is usable in deep water, in shallow water, and on land.

It is a twelfth object of the invention to provide a blowout recovery valve that is safer to use than existing blowout recovery devices.

It is a thirteenth object of the invention to provide a blowout recovery valve that is more controllable.

It is a fourteenth object of the invention to provide a blowout recovery valve that is movable in all directions in three dimensions.

It is a fifteenth object of the invention to provide a blowout recovery valve that is more environmentally friendly and limits the environmental impact of blowouts.

It is an sixteenth object of the invention to provide a blowout recovery valve with a lock-on collar.

It is a seventeenth object of the invention to provide a blowout recovery valve with a collar is adjustable and removable.

It is a eighteenth object of the invention to provide a blowout recovery valve with considerably less mass and weight.

It is a nineteenth object of the invention to provide a blowout recovery valve with considerably less height and width.

It is a twentieth object of the invention to provide a blowout recovery valve that is easy to ship and handle.

It is a twenty-first object of the invention to provide a blowout recovery valve that is reusable.

It is a twenty-second object of the invention to align the funnel and valve using cylindrical positioning rings.

It is a twenty-third object of the invention to provide a blowout recovery valve that limits liability.

It is a twenty-fourth object of the invention to provide a blowout recovery valve that is more cost effective.

It is twenty-fifth object of the invention to provide a blowout recovery valve with a floatation system that can cause it to float to the surface of a body of water.

It is a twenty-sixth object of the invention to provide a blowout recovery valve that can be flattened out.

It is a twenty-seventh object of the invention to provide a blowout recovery valve with a jointed and seamed funnel.

It is a twenty-eighth object of the invention to provide a blowout recovery valve that uses well pressure to increase the ram jet effect as well as the Bernoulli effect.

It is a twenty-nineth object of the invention to prevent economic loss from oil well blowouts.

It is thirtieth object of the invention to prevent damage to the environment from any kind of fluid escaping from a pipe.

It is a thirty-first object of the invention is to prevent economic loss from any kind of fluid escaping from a pipe.

It is a thirty-second object of the invention to create a safer environment for any fluid carrying pipe or pipe-like structure.

It is a thirty-third object of the invention to provide a control or shutoff mechanism that can be reopened.

It is a thirty-fourth object of the invention to provide a control or shutoff mechanism that can be repeatedly opened and shut.

It is an thirty-fifth object of the invention to provide an apparatus and method that is compatible with other blowout preventers and flow regulators.

It is a thirty-sixth object of the invention to provide a flow regulator that is manageable in size, weight and configuration.

It is a thirty-seventh object of the invention to provide a blowout preventer and flow regulator that can be sized appropriately to its need and usage.

It is an thirty-eight object of the invention to provide a blowout preventer and flow regulator that can be used initially or retrofitted.

It is a thirty-ninth object of the invention to provide a blowout preventer and flow regulator that has an immediate response time, thus saving lives and investment.

It is a fortieth object of the invention to provide a blowout preventer and flow regulator that has a shorter activation time than the prior art.

It is a fortieth-first object of the invention to provide a blowout preventer and flow regulator using plates, wherein if some plates are defective, they can be drilled through, and it will still be effective because of a multiple plate design.

It is a forty-second object of the invention to provide a blowout preventer and flow regulator, wherein stacking of plates gives multiple options for control.

It is a forty-third object of the invention to provide a blowout preventer and flow regulator that is easy to install or replace.

It is a forty-fourth object of the invention to provide a means for fitting oil or gas wells with flow regulators to control and/or resume the flow of oil or gas.

It is a forty-fifth object of the invention to provide improved elements and arrangements thereof in an apparatus for the purposes described which relatively inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
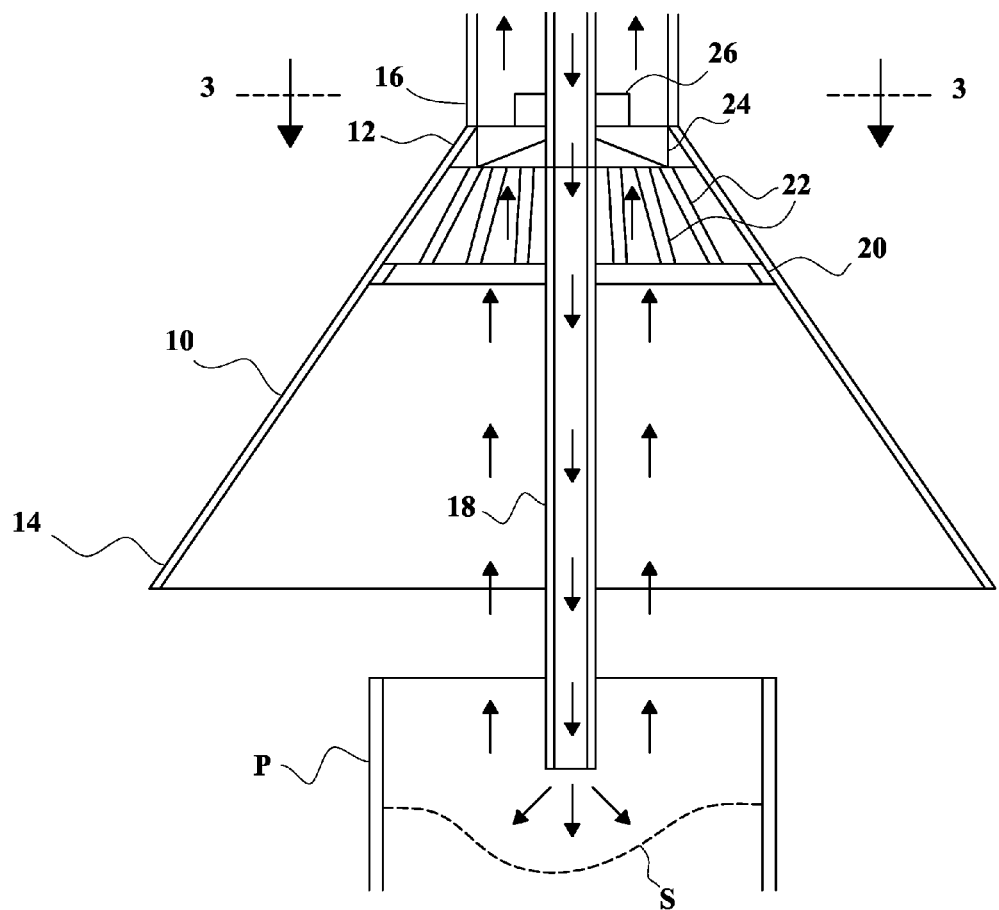
FIG. 1 is a vertical sectional view drawn along lines 1-1 of FIG. 3, showing the first preferred embodiment of the invention before the valve is sucked down onto the pipe from which the first fluid is escaping.

The present invention is a blowout recovery valve that may be used with oil or gas wells, under the sea or on land. The present invention is also of valves and piping made of plastic infused with graphene, phosphorescent material, or other enhancing material, and methods of constructing them. In particular, it is the use of such plastics in a blowout preventing and/or recovery valve that may be used with oil or gas wells, under the sea or on land, but the invention not limited to blowout recovery valves.

Use of Plastics

Oil valves and piping made of plastic enhanced with graphene and phosphorescent material results in valves and pipes that are stronger (graphene is 100 times as strong, and 10 times as impact resistant, as steel by weight), lighter, more resistant to chemical and physical erosion, and can be illuminated to show areas of wear and weakness without the need of physical removal of the valve and pipe for visual examination. Once illuminated, the valves and pipe phosphoresce, and any areas of erosion appear as dark areas (non-phosphorescent) allowing the inspector to determine the amount of damage or likely hood of failure and the need of replacement. Graphene enhanced plastic material are very electrical and thermally conductive. Their physical properties allow for measuring thickness electronically and thermally, once again determining if any physical damage has or is occurring to the valve and piping.

Graphene enhanced plastic would increase delamination resistance by 30%, fatigue resistance by 200%, and impact resistance by 15%. Graphene's extraordinary properties stem from the naturally strong sigma bond that links each carbon atom with its three (3) nearest neighbors in a single plane. This provides intense strength in tension and flexibility in bending, giving valves and piping greater versatility and safety. Plastics in general are more adaptable than are metals for 3D printing.

Composition: The plastic being injected would be of varying composition—that composition being more appropriate for the desired physical property of the valve and piping.

Multiple or Single Mold Injection: Valves and piping could be made by multiple mold injecting. First mold product, then move to a second mold to have a second layer of material molded to the first, etc. Example: Glass added to plastic.

There are countless numbers of materials that can be used in making plastics, but the primary material for the best mode of practicing the present invention is graphene.

Plastic Gear Materials:
1. GRAPHITE—15% TO 40%
2. PTFE—10%
3. PTFE+15% GRAPHITE+MOSA (UP TO 15%)

Plastic Mixtures of Some Types of Plastic Plus Graphene:
1. Composite+Fiber Matrex (air frames)
2. ZYLOM+GRAPHENE+NYLON
3. KEVLAR+GRAPHENE+NYLON
4. CELAZOLE+GRAPHENE+NYLON
  5. DERLIN+GRAPHENE+NYLON
6. ABS+GRAPHENE+NYLON
7. LEXAN+GRAPHENE+NYLON The 1988 SPI codes for plastics from the Society of the Plastic Industry ("SPI") used to show plastics that are recyclable:
SPI Code 1—POLYETHYLENE TEREPHTHALOTE
SPI Code 2—HIGH DENSITY—POLETHYLENE (HDPE)
SPI Code 3—POLYVINYL-CHLORIDE—(PVC)
SPI Code 4—LOW DENSITY—POLETHYLENE (LDPE)
SPI Code 5—POLYPROPYLENE—(P.P.)
SPI Code 6—POLYSLYRENE (P.S.) STYROFOAM PS
SPI Code 7—Miscellaneous POLYCARBONATE and POLYLACTIDES Color Coding Color coding of the graphene enhanced plastics with colored plastic and corresponding colored phosphorescent plastics can be used to define valve and pipe type, size, usage, strength, weight, chemical and physical resistance. This enhances safety, speed of application and use, thereby saving time and money, reducing liability, increasing safety and decreasing error.

Phosphorescence

All phosphorescent material would have to be illuminated naturally (by the sun) or by artificial illumination. Once charged (illuminated) the material could phosphoresce for up to eight hours. This will make it easier to diagnose and mitigate failure by visual examination. There will be no need to dismantle phosphorescent material for physical examination.

Graphene Coating

A graphene coating can be used to coat the inside of valves and piping and other surfaces with a coat of graphene and/or graphene enhanced material (such as plastic). Graphene is electrically and thermally conductive. These properties can be used to measure thickness and consistency, and thereby detect potential failure in advance.

Dipping

The part to be coated could be dipped into a bath of graphene or graphene enhanced plastic. This step could be repeated to accomplish the desired result.

Other Methods

Spraying, painting, powered coating with a graphene powered coated material, patching, etc.

Types of Plastic Forming Used in Valves and Piping

A. Machining
  1. 3-D Printing
B. Injection Molding
C. Thermoforming
D. Laminating
E. Plastic Fabrication Types of plastics used in the construction of valves and piping could be common plastic as well as special purpose plastic, desirable combinations or derivatives.

Types of Plastics

There are thousands of types of plastics:
1. Acetals
2. Acrylics
3. Amino Resins
4. Cellolosics (broad general classification)
5. Plastic composites=Epoxy+Fiber Material (Airplane frames are made of them.)

Plastics by themselves do not make good structural materials.

Strong Plastics

1. Zylon (two times as strong as Kevlar—not good in heat and humidity—but highest tensel strength)
2. Kevlar
3. Derlin—strong and good for injection molding
4. Derlin & Nylon
5. Carbon Fiber
6. Derlin+ABS
7. Derlin—glass reinforced
8. ABS—strong—must heat to mold (not flexible)
9. Lexan Highly Resistant Materials Polyurentones Polyamides Polymers—Reinforced With:
A) Glass
B) Carbon Fibers
Polybenzimidazol—Trade Name: Celazole Illustrations of the Use of Plastic Materials An example of an apparatus that may be constructed according to the present invention is a blowout recovery valve, including a large frustoconical funnel or valve, made of plastic infused with graphene, phosphorescent material or other suitable material.

Figure 3:
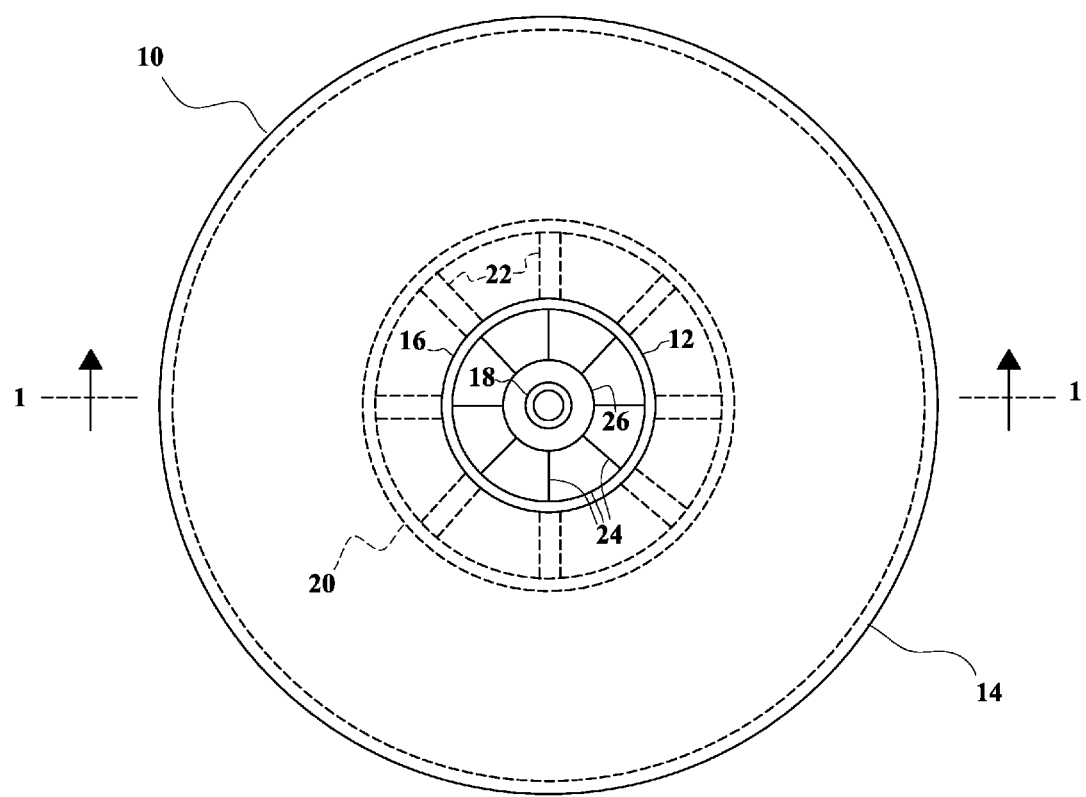
FIG. 3 is a horizontal sectional view drawn along lines 3-3 of FIG. 1, showing the first preferred embodiment of the invention.

The following are the features in the original patent application Ser. No. 12/960,495, filed on Dec. 4, 2010, now U.S. Pat. No. 8,205,678, issued on Jun. 26, 2012, having parts that may be made of enhanced plastic, as embodiments of the instant invention:

FIG. 1 is a vertical sectional view drawn along lines 1-1 of FIG. 3, showing the first preferred embodiment of the invention before the funnel 10 is sucked down onto the pipe P (which may be a well pipe or riser) from which a first fluid (such as petroleum) is escaping. The funnel has a hollow frustoconical shape, and has a smaller end 12 and a larger end 14 that is suitably dimensioned and configured to be placed over the pipe. A return pipe 16 is connected to the smaller end of the funnel. A high pressure pipe 18 passes through the return pipe and the funnel, and is suitably dimensioned and configured to be inserted into the pipe P. A second fluid (such as air) is pumped through the high pressure pipe at a pressure greater than that of the first fluid, causing the first fluid to be separated by the second fluid in a space S adjacent to an end of the high pressure pipe that has been inserted into the pipe through which the first fluid is escaping. A portion of the first fluid that is not held back by the greater pressure of the second fluid will flow through the valve and the return pipe at an accelerated velocity, but at a reduced pressure due to the Bernoulli effect, thus helping to suck the valve down onto the pipe P. The funnel, return pipe and high pressure pipe may all be made of plastic enhanced with graphene, flourescent or other material.

Figure 2:
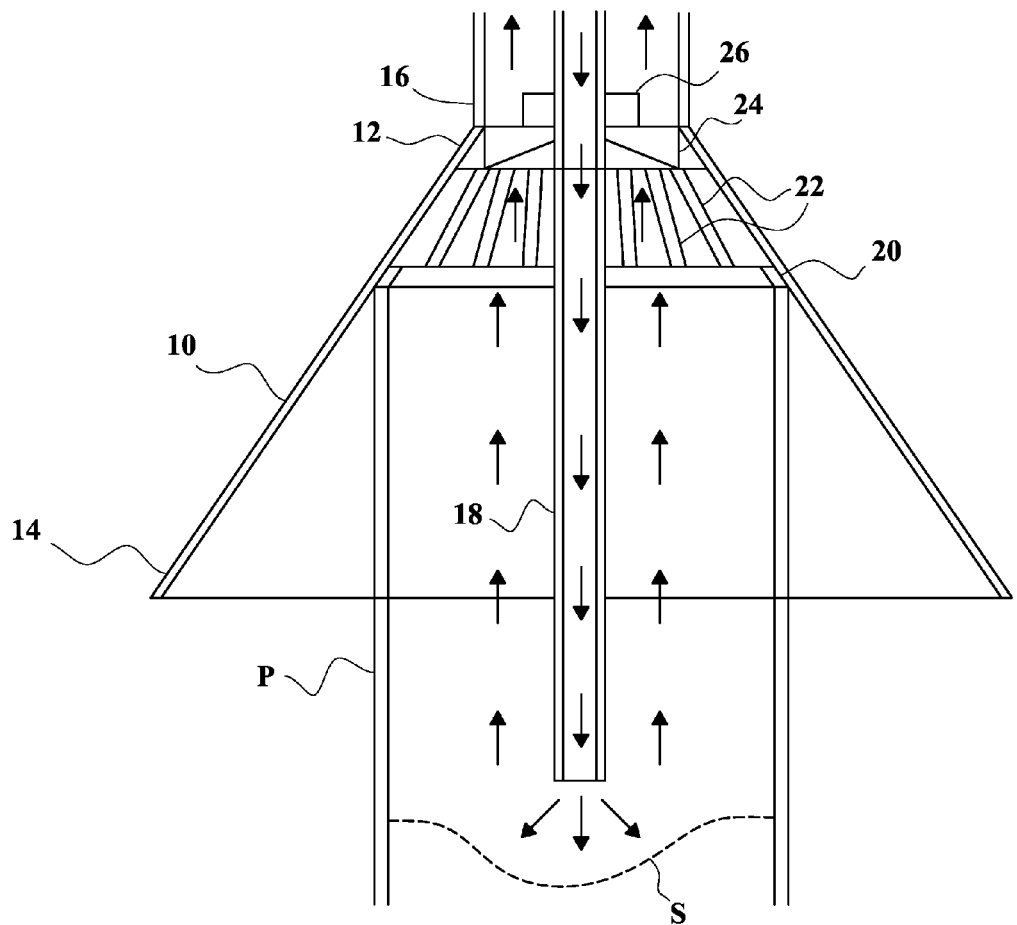
FIG. 2 is a vertical sectional view drawn along lines 1-1 of FIG. 3, showing the first preferred embodiment of the invention after the valve is sucked down onto the pipe from which the first fluid was escaping.

FIG. 2 is a vertical sectional view drawn along lines 1-1 of FIG. 3, showing the first preferred embodiment of the invention after the valve is sucked down onto the pipe P from which the first fluid was escaping. A first gasket 20 within the valve prevents the first and second fluids from leaking out between the valve and the pipe P. Inside the valve, adjacent to its smaller end, there are channels 22 to further accelerate the flow of the first and second fluids toward the return pipe. (The channels may be small pipes.) Adjacent to the smaller end of the valve there is turbine comprising blades 24 driven by motor 26, that can rotate to further accelerate the flow of the first and second fluids through the return pipe. FIG. 3 is a horizontal sectional view drawn along lines 3-3 of FIG. 1, showing the first preferred embodiment of the invention.

Figure 4:
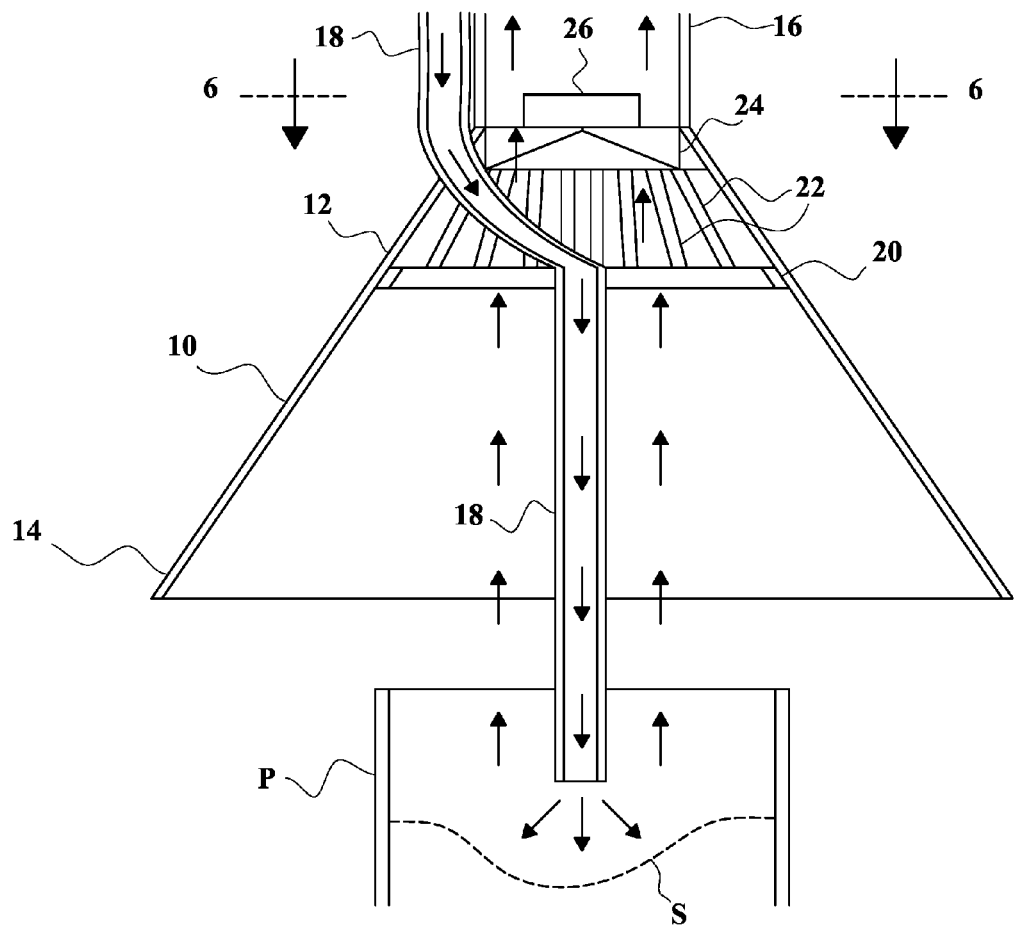
FIG. 4 is a vertical sectional view drawn along lines 4-4 of FIG. 6, showing the second preferred embodiment of the invention before the valve is sucked down onto the pipe from which the first fluid is escaping.
Figure 5:
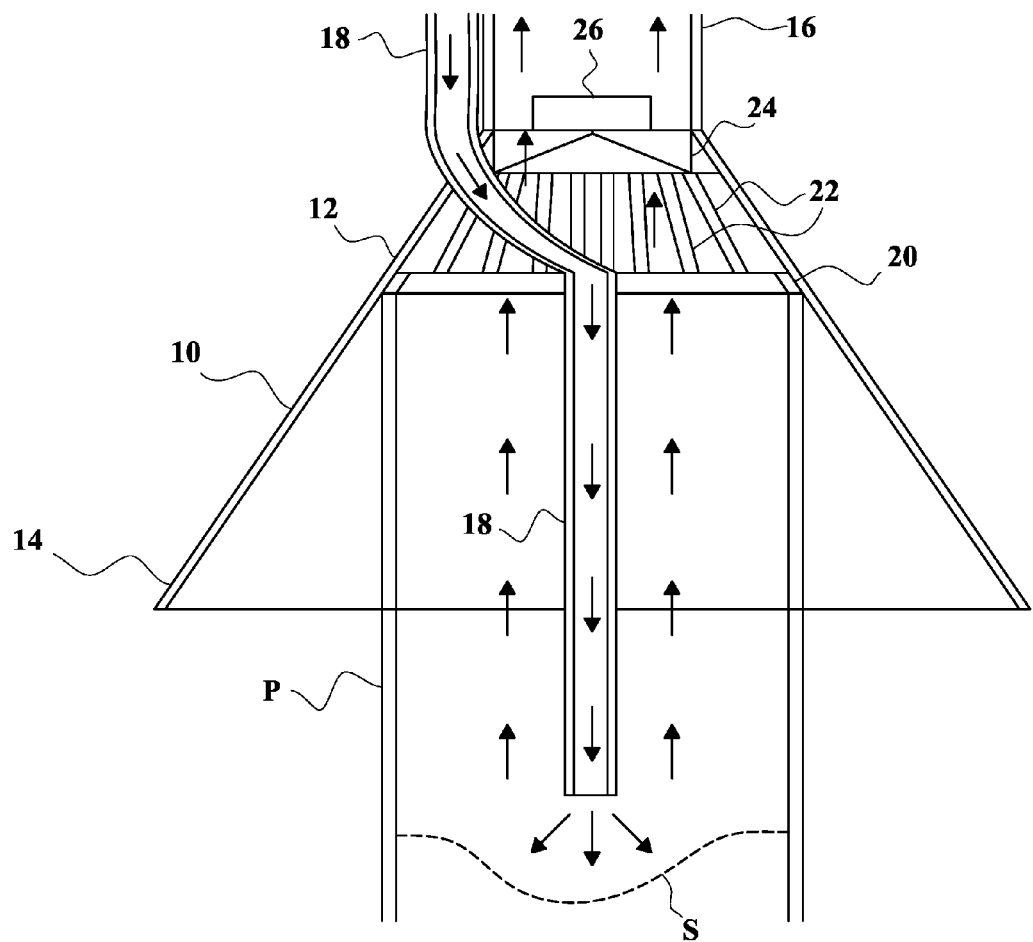
FIG. 5 is a vertical sectional view drawn along lines 4-4 of FIG. 6, showing the second preferred embodiment of the invention after the valve is sucked down onto the pipe from which the first fluid was escaping.
Figure 6:
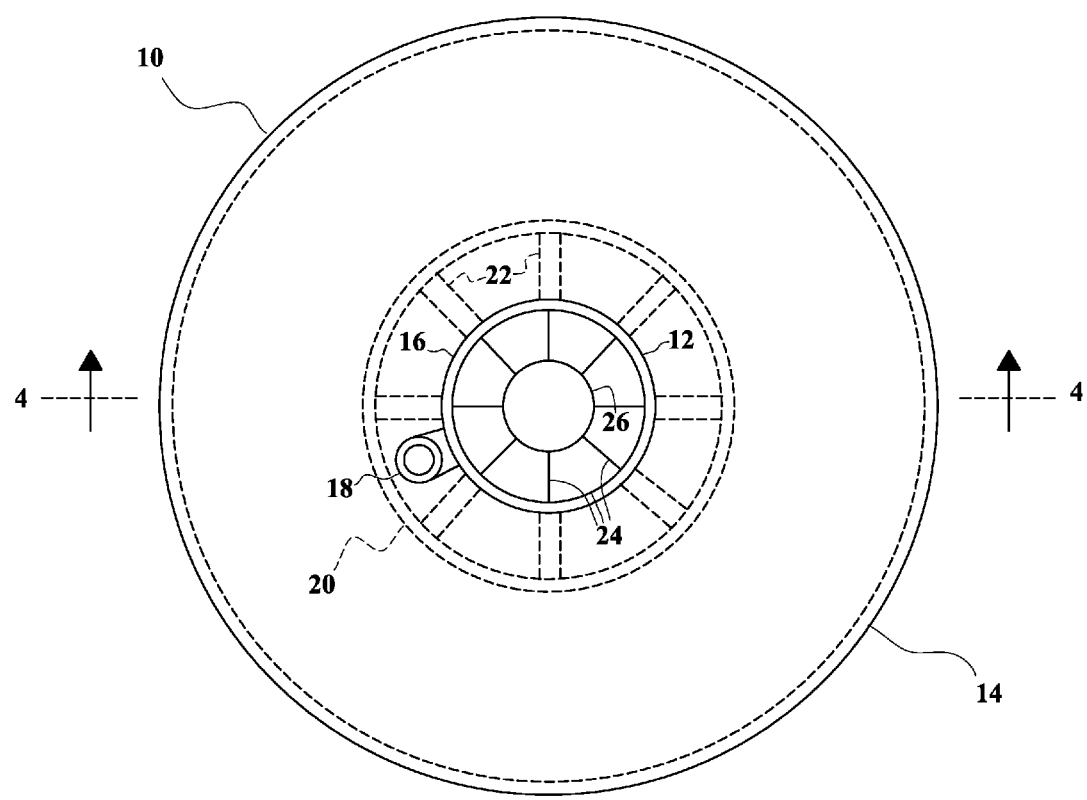
FIG. 6 is a horizontal sectional view drawn along lines 6-6 of FIG. 4, showing the second preferred embodiment of the invention.

FIG. 4 is a vertical sectional view drawn along lines 4-4 of FIG. 6, showing the second preferred embodiment of the invention before the valve is sucked down onto the pipe from which the first fluid is escaping, which is the same as the first preferred embodiment, except that the high pressure pipe 18 is in an alternative position, passing outside the return pipe 16 and through a side of the valve 10. FIG. 5 is a vertical sectional view drawn along lines 4-4 of FIG. 6, showing the second preferred embodiment of the invention after the valve is sucked down onto the pipe from which the first fluid was escaping. FIG. 6 is a horizontal sectional view drawn along lines 6-6 of FIG. 4, showing the second preferred embodiment of the invention.

Figure 7:
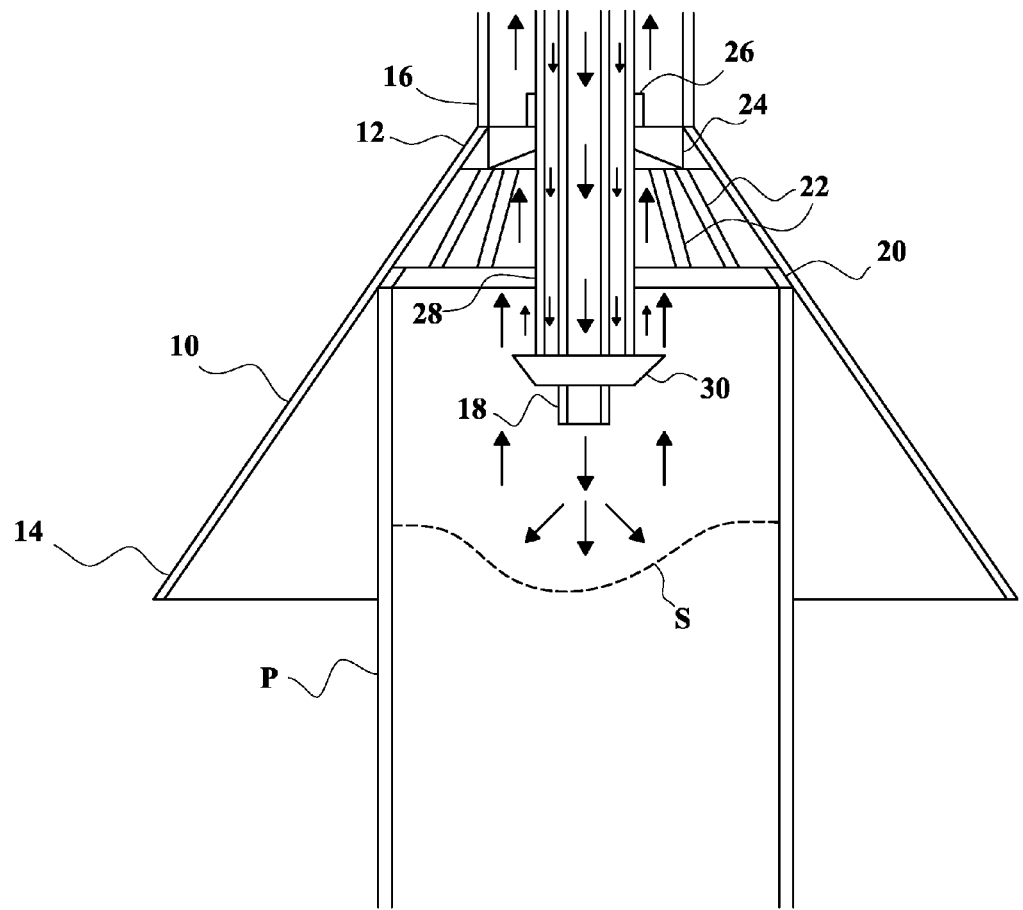
FIG. 7 is a vertical sectional view of the third preferred embodiment of the invention.

FIG. 7 is a vertical sectional view of the third preferred embodiment of the invention, in which there is a secondary air supply 28 with valve 30, that can be used to keep the blades 24 turning. The high pressure pipe 18 is shown retracted back up into the valve, which is also a means of keeping the blades turning.

Figure 8:
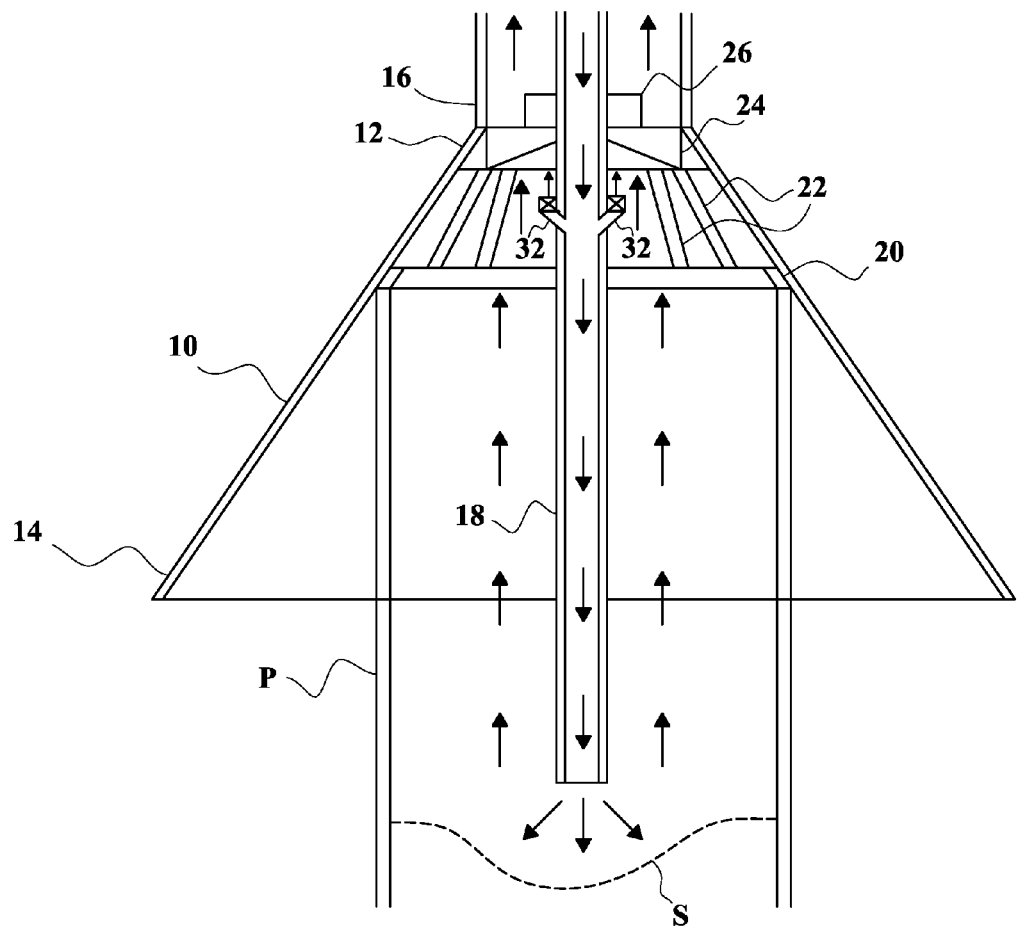
FIG. 8 is a vertical sectional view of the fourth preferred embodiment of the invention.

FIG. 8 is a vertical sectional view of the fourth preferred embodiment of the invention, in which there are valves 32 in the high pressure pipe 18 just below the blades 24 that can keep the blades turning. Note that the valve can be sucked down both by pressure from the well, and by pressure from outside sources (that supply air to the high pressure pipe or a secondary air supply or electricity or fuel to the motor 26.)

The following were the new features in the first Continuation-In-Part, patent application Ser. No. 13/533,964, filed on Jun. 26, 2012, now U.S. Pat. No. 8,418,767, issued on Apr. 16, 2013 which is a fifth preferred embodiment of the invention, shown in FIGS. 9-13:

1. Jets 34 (shown in FIGS. 9, 10 and 11) on an exterior surface of the valve 10, through which a second fluid may be released to move the valve into alignment with the pipe P through which the first fluid is escaping. The second fluid is supplied to the jets through a second high pressure pipe 36 with branches 37, and the jets each have a plurality of nozzles 38 that point in different directions. The second fluid will usually be air, and the air may be supplied through a compressed air pipe. (Alternatively, electric motors may be used to move the valve.)

2. Sensing devices 40 selected from the group comprising lights and cameras, sonar, and global positioning system devices, on movable arms 42 (shown in FIGS. 9, 10 and 11) that can be extended from the valve, by which the position of the valve relative to the pipe through which the first fluid is escaping can be determined, so that it can be moved into alignment with said pipe using the jets (or motors). The arms may be moved between an extended position (shown in solid lines) and retracted position (shown in broken lines). The arms will generally be in an extended position when the sensing devices are used. There may be two arms, each moved by a motor 44, than can each rotate 180 degrees, giving 360 degree coverage of the surrounding area.

3. A stopper or plug 46 (shown in FIGS. 9 and 10) surrounding a portion of the high pressure pipe 18 inside the valve, the stopper having an upper portion 48 with a diameter that is the same as the interior diameter of the pipe through which the first fluid is escaping, and a sloping lower portion 50, and a piston 52 that can push the stopper down into the pipe though which the first fluid is escaping. The stopper or plug may be made of plastic, which may be suitably enhanced. The lower portion must be smaller than the diameter of the pipe P, so that it can enter the pipe to a sufficient distance to close off the flow of the first fluid. The sloping or tapered shape of the lower portion may help in positioning the valve and stopper onto pipe P, as well as helping to seal off the flow of the first fluid. The high pressure pipe must, of course, have a smaller diameter that the pipe through with the first fluid is escaping. The piston may be moved by an explosive charge, hydraulics compressed air, electricity, springs, or any other suitable means. The stopper increases the Bernoulli effect by its shape and position in the valve. One-way locks 54 may prevent the stopper from being destroyed by the flow of the first fluid and pressure.

4. One-way valves 56, (shown in FIGS. 9 and 10) through which the second fluid can be released through a portion of the high pressure pipe inside the valve, to increase the Bernoulli effect, while preventing the first fluid from escaping. The one -way valves pass through the walls of the high pressure pipe and the stopper. The one-way valves allow the second fluid (e.g., air) to enter the pipe through which the first fluid. (e.g., oil) is flowing, and stop the flow of the first fluid once the stopper is activated.

5. A plurality of turbines 57 (shown in FIGS. 9 and 10) in the return pipe 16 to accelerate the flow of the first fluid The entire system, including the turbines, may be powered by air, electrical-wire, an electrical power pack, springs, or other suitable means. The turbines are stacked in the return pipe to increase suction.

6. A second gasket 58 (shown in FIGS. 9-11, and in detail in FIGS. 12 and 13) at the larger end of the valve, the gasket having a circular rim 60 from which extend overlapping plates 62 pivotally attached to the rim, wherein the plates can be simultaneously rotated from an open position (shown in FIGS. 9 and 12), in which they do not block the valve from being placed over the pipe from which the first fluid is escaping, to a closed position (shown in FIGS. 10 and 13), in which they contact said pipe and prevent the first fluid from escaping to the surrounding space. The gasket may be opened and closed by a draw string, a spring control spool powered by a battery pack, or any other suitable mechanism. The plates may be pivotally connected to the circular rim by springs or other suitable means. The gasket and its plates may be made of plastic, which may be suitably enhanced.

Figure 14:
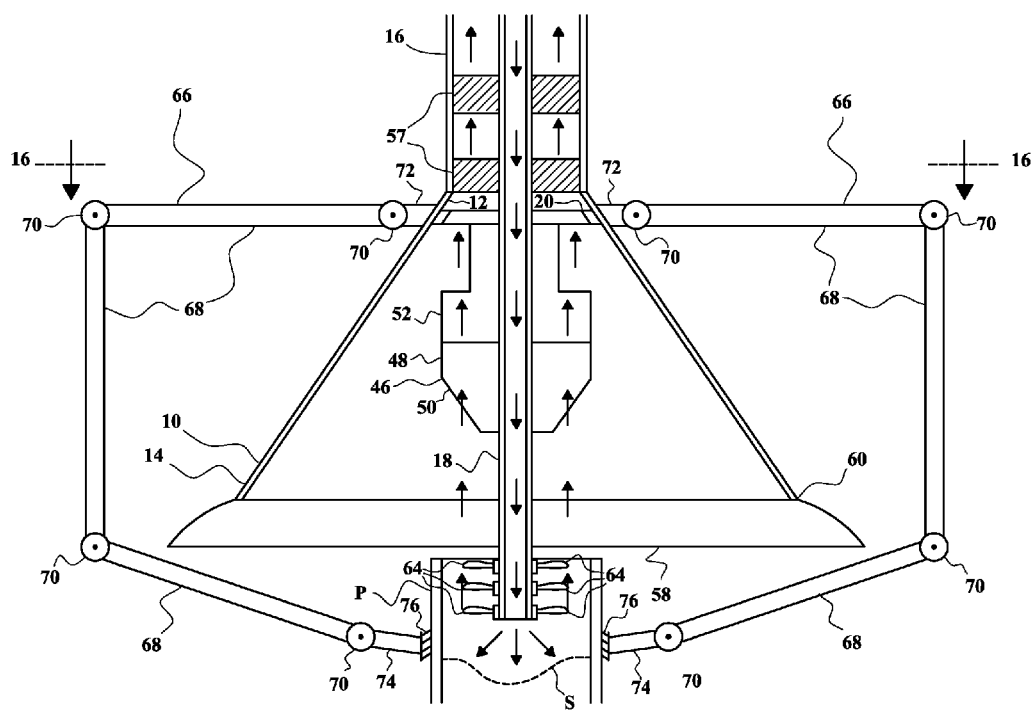
FIG. 14 is a vertical sectional view drawn along lines 14-14 of FIG. 16, showing the sixth preferred embodiment of the invention before the valve is sucked down onto the pipe from which the first fluid is escaping.
Figure 15:
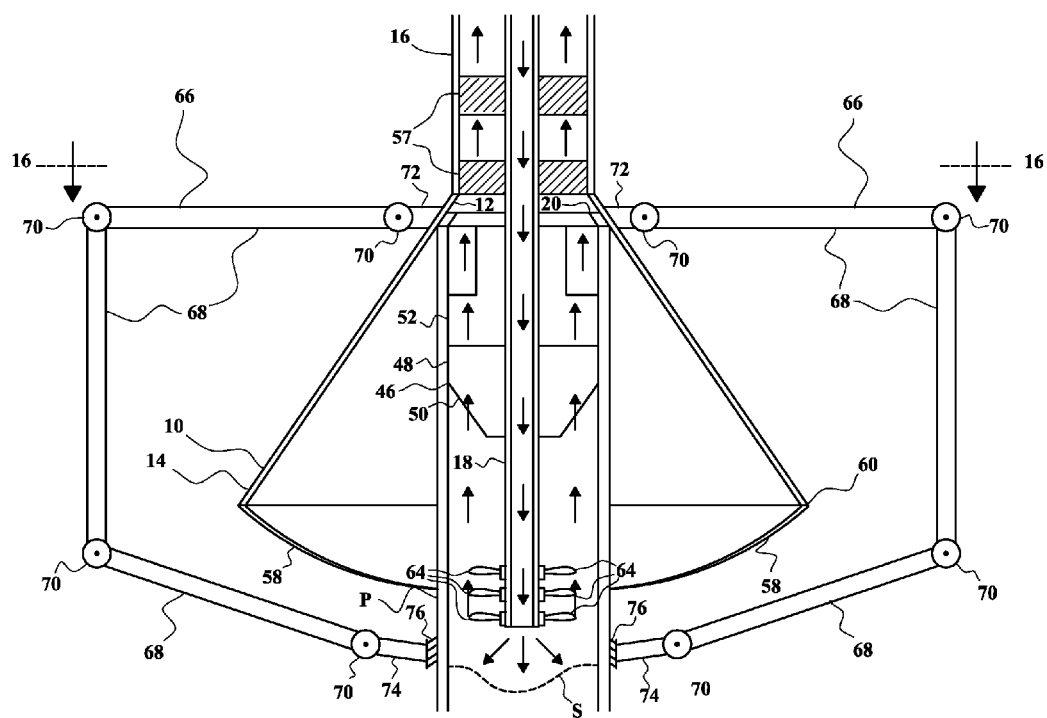
FIG. 15 is a vertical sectional view drawn along lines 14-14 of FIG. 16, showing the sixth preferred embodiment of the invention after the valve is sucked down onto the pipe from which the first fluid was escaping.
Figure 16:
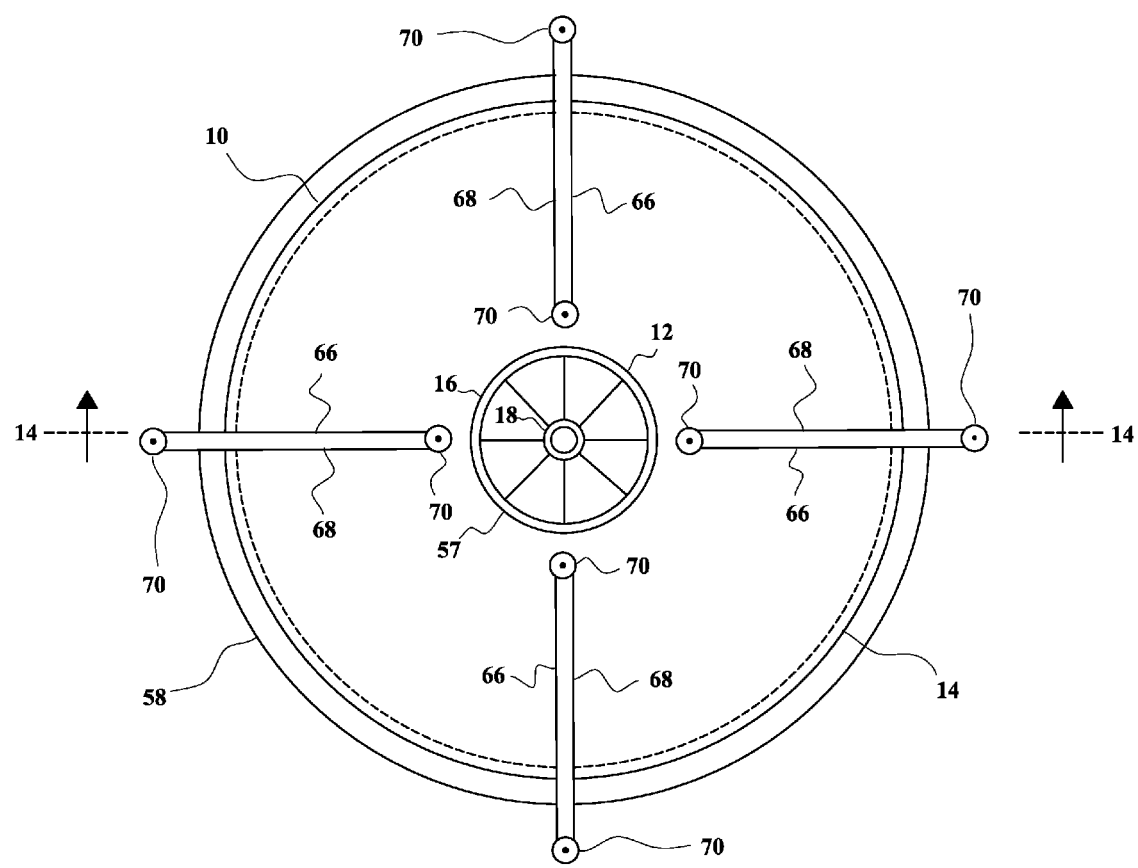
FIG. 16 is a horizontal sectional view drawn along lines 16-16 of FIG. 13, showing the sixth preferred embodiment of the invention.

The following were the new features in the second Continuation-In-Part, patent application Ser. No. 13/837,065, filed on Mar. 15, 2013, now U.S. Pat. No. 8,555,979, issued on Oct. 15, 2013, which is a sixth preferred embodiment of the invention, shown in FIGS. 14-16:

1. Positioning arms 66 extending from the valve, said positioning arms being able to move the valve into alignment with the pipe through which the first fluid is escaping, and then to hold it in place. The positioning arms each have a plurality of segments 68, and the segments are connected by motor driven joints 70 by which they can be moved. The positioning arms each have an inner segment 72 attached to the valve. The positioning arms each have an outer segment 74 with a gripping surface 76. The tapering shape of the stopper may also aid the correct positioning of the valve and stopper onto the pipe P by the positioning arms. Once they are in position, the second gasket 58 can be closed around pipe P, as shown FIG. 15.

2. Propellers 64 on or near the end of the high pressure air separating) pipe, that can rotate to accelerate flow of the first fluid into the turbines 57, giving the system a ram jet effect, that works in combination with the Bernoulli effect. The propellers may also help move the stopper into the pipe through which the first fluid is escaping, and help keep the stopper in place.

Figure 9:
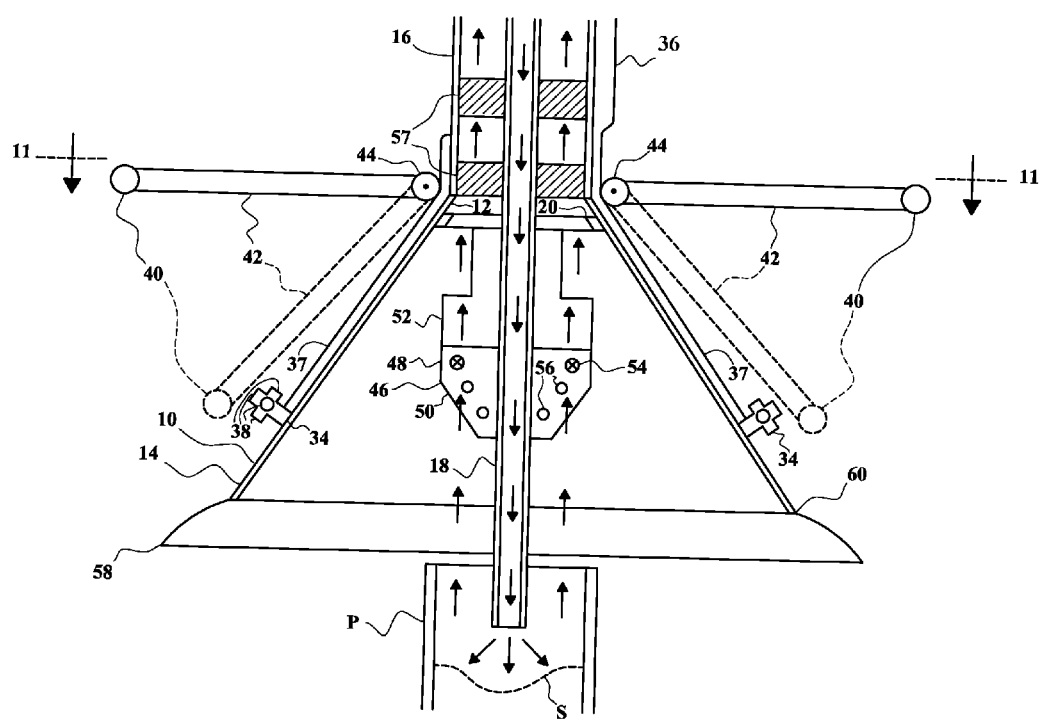
FIG. 9 is a vertical sectional view drawn along lines 9-9 of FIG. 3, showing the fifth preferred embodiment of the invention before the valve sucked down onto the pipe from which the first fluid is escaping.
Figure 10:
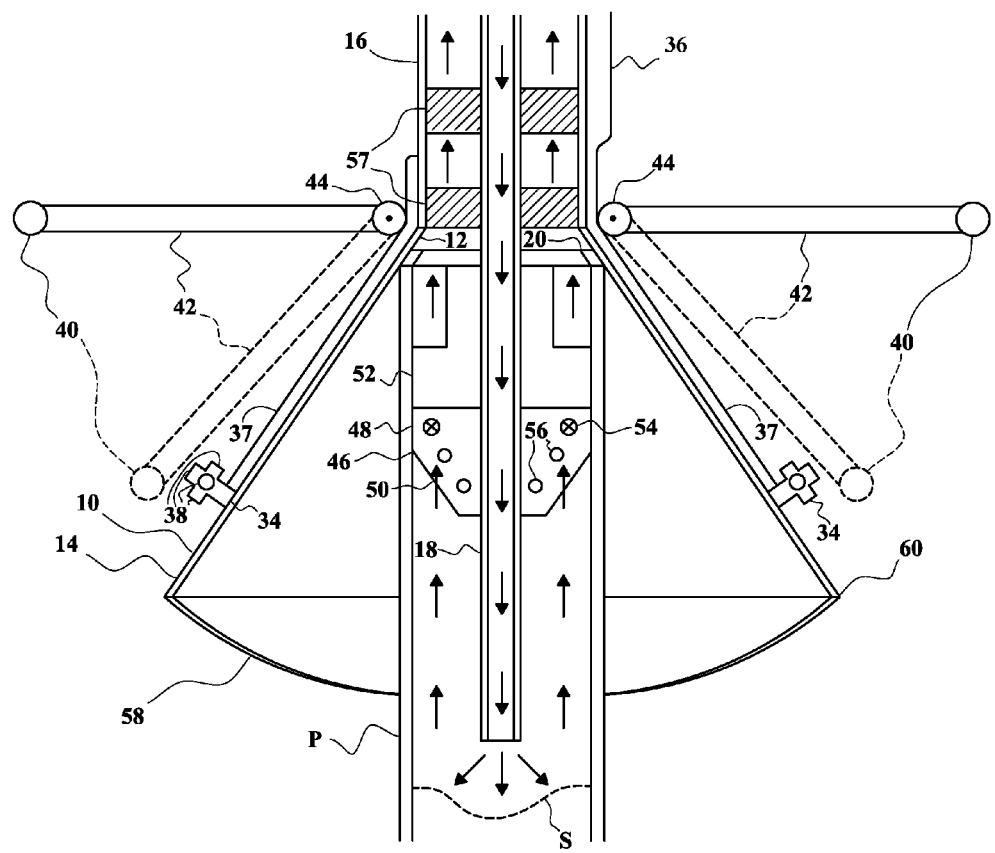
FIG. 10 is a vertical sectional view drawn along lines 9-9 of FIG. 3, showing the fifth preferred embodiment of the invention after the valve is sucked down onto the pipe from which the first fluid was escaping.
Figure 11:
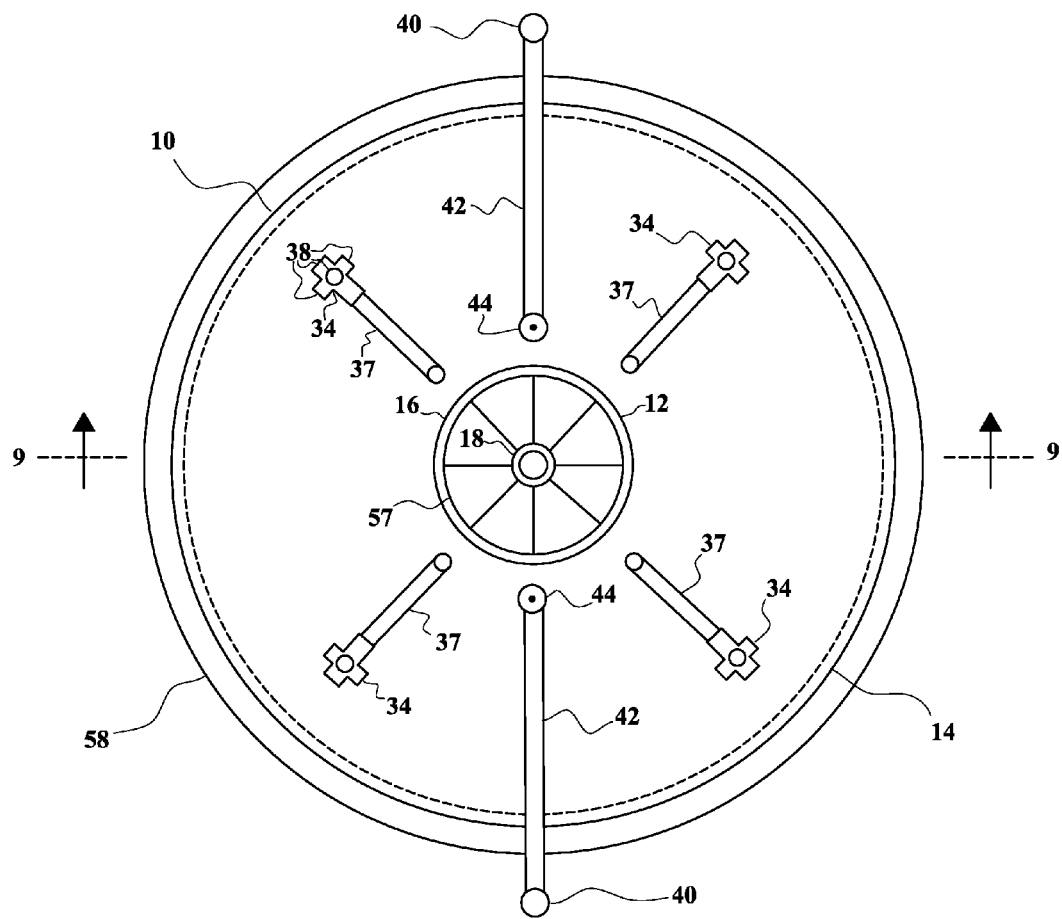
FIG. 11 is a horizontal sectional view drawn along lines 11-11 of FIG. 1, showing the fifth preferred embodiment of the invention.
Figure 12:
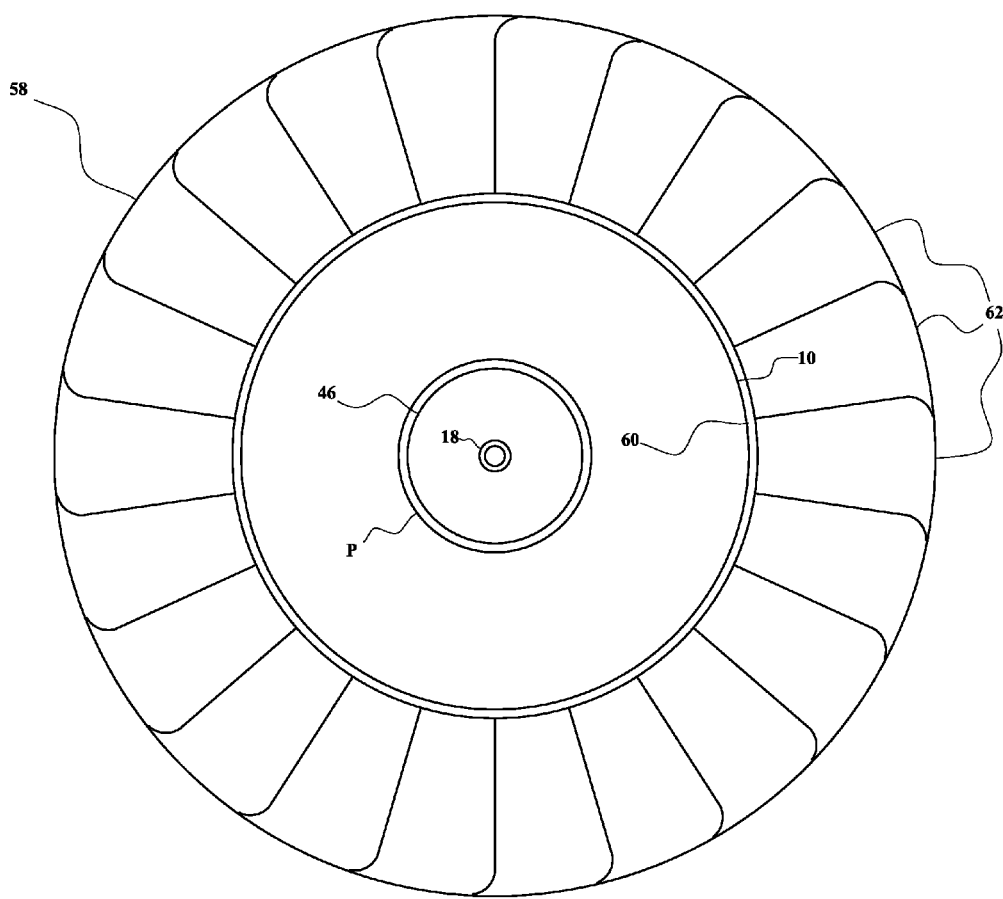
FIG. 12 is a detail view of the second gasket of the fifth preferred embodiment of the invention in an open position.
Figure 13:
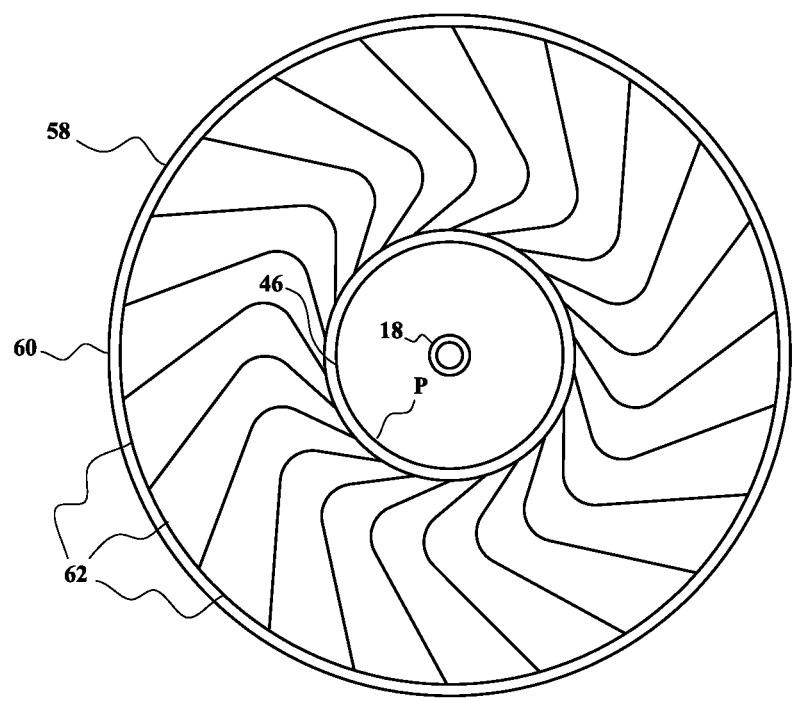
FIG. 13 is a detail view of the second gasket of the fifth preferred embodiment of the invention in a closed position.

3. Sensing devices (40 as shown in FIGS. 9, 10 and 11) selected from the group comprising lights and cameras, sonar, and global positioning system devices, can be attached to the positioning arms, by which the position of the valve relative to the pipe through which the first fluid is escaping can be determined, so that it can be moved into alignment with said pipe. The various parts of the invention may be made of either rigid or flexible materials.

The following were the new features in patent application Ser. No. 13/933,128, filed on Jul. 7, 2013, issued as U.S. Pat. No. 8,651,189 on Feb. 18, 2014, which was filed as an original patent application without claiming priority from the above -mentioned applications, and which is a seventh preferred embodiment of the invention, shown in FIGS. 17-26:

1. Sleeve for Well Pipe

Figure 17:
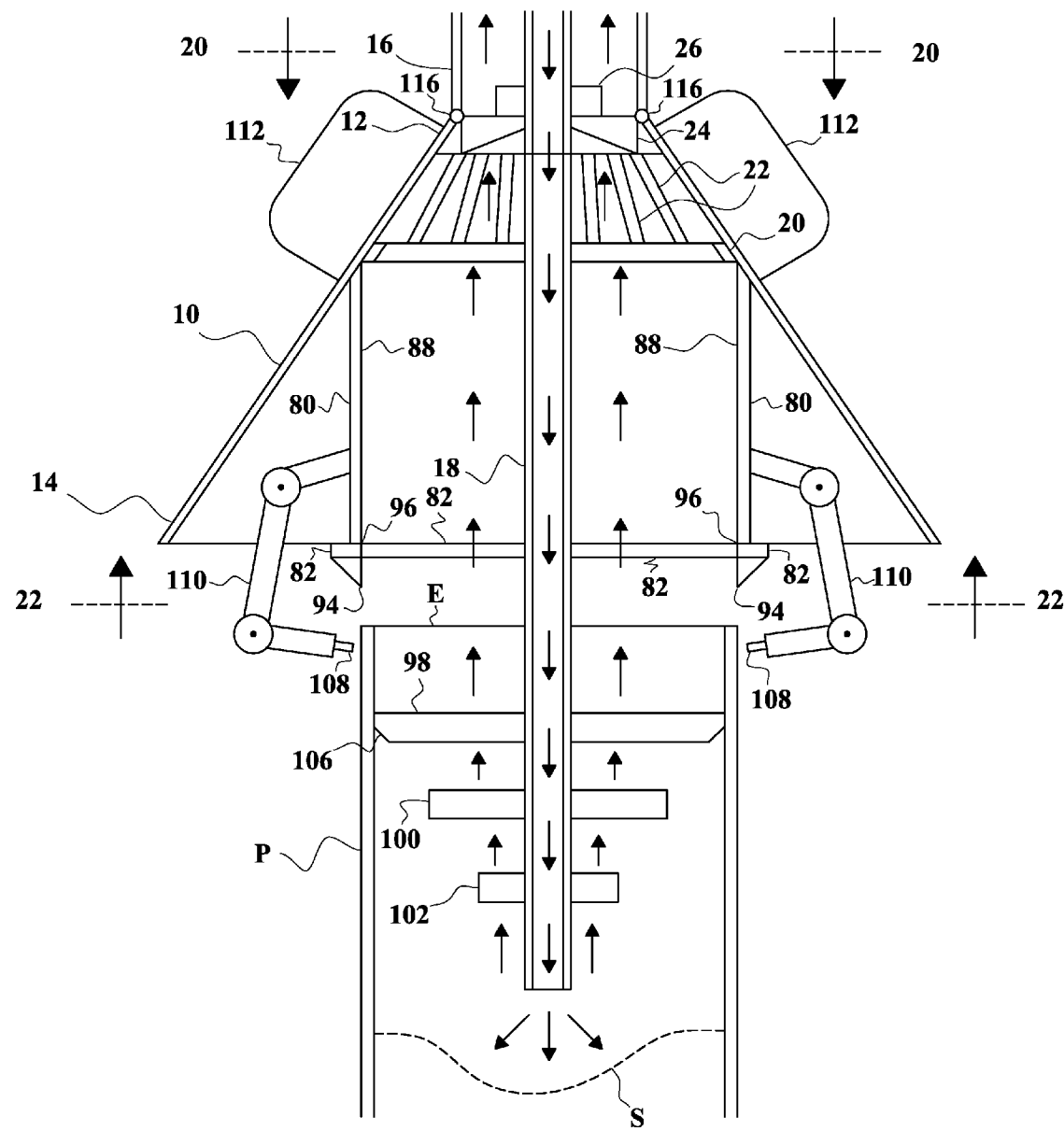
FIG. 17 is a vertical sectional view drawn along lines 17-17 of FIG. 20, showing the seventh preferred embodiment of the invention before the valve and sleeve are lowered down onto the well pipe.
Figure 18:
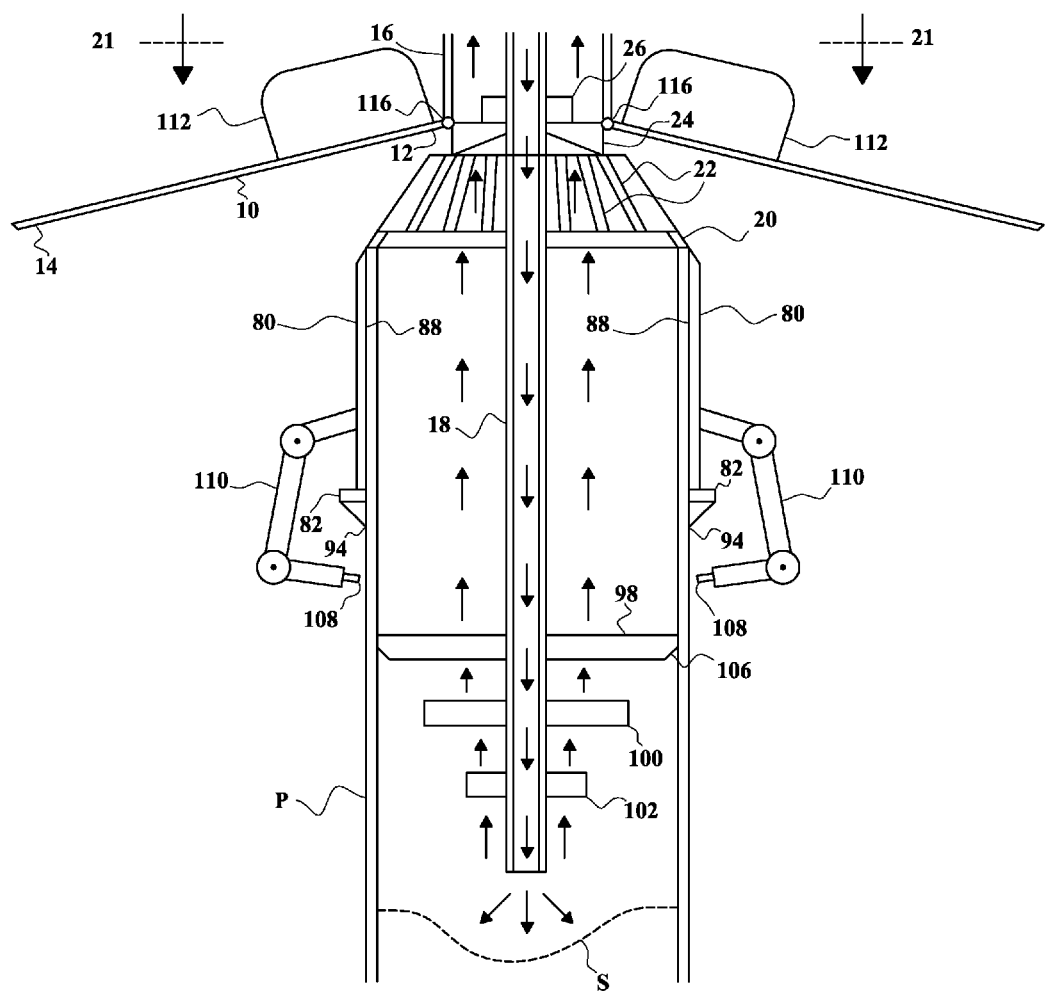
FIG. 18 is a vertical sectional view, showing the seventh preferred embodiment of the invention after the valve and sleeve are lowered down onto the well pipe.
Figure 19:
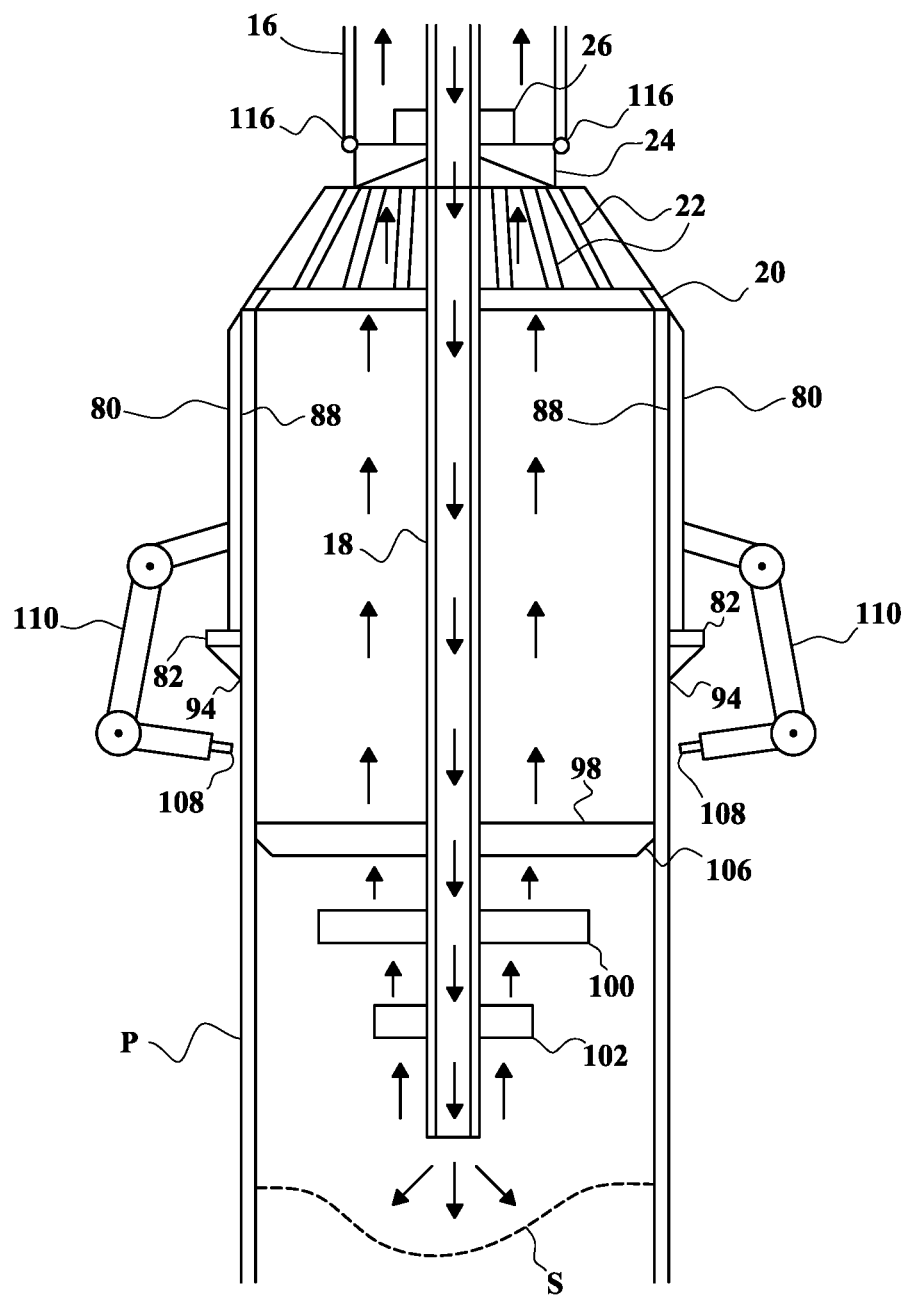
FIG. 19 is a vertical sectional, showing the seventh preferred embodiment of the invention after the valve and sleeve are lowered down onto the well pipe, and the funnel has been removed.
Figure 20:
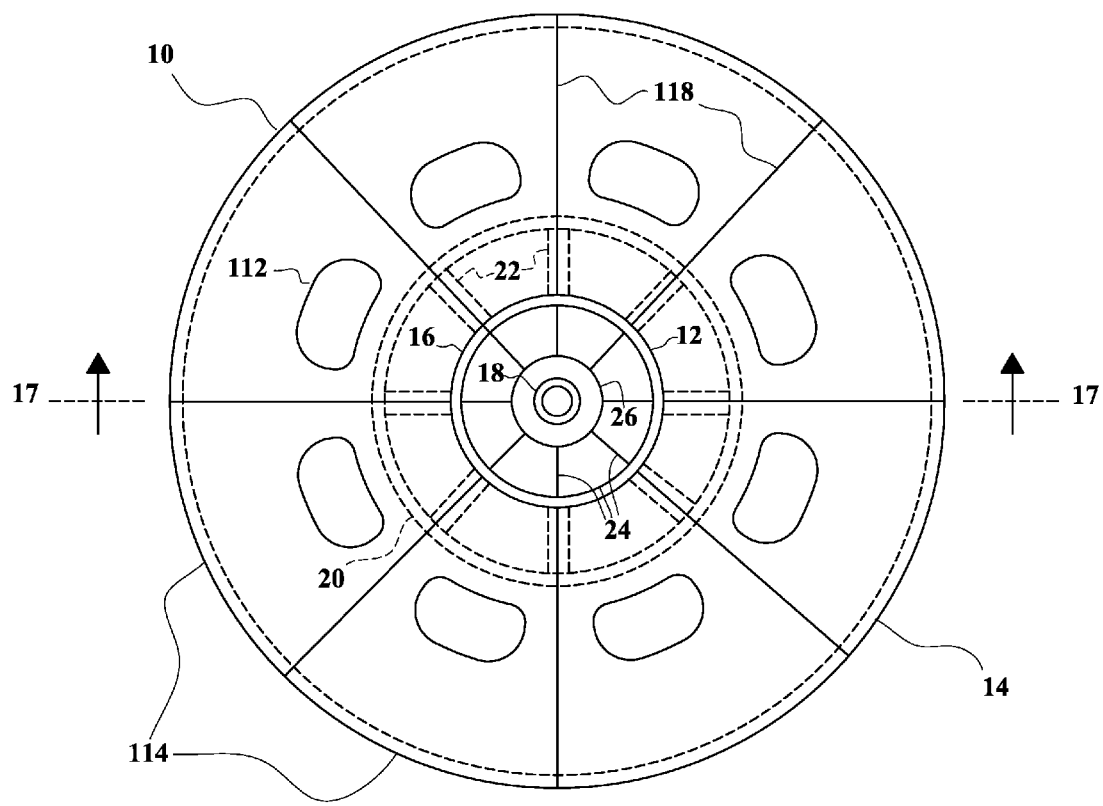
FIG. 20 is a horizontal sectional view drawn along lines 20-20 of FIG. 17, showing the seventh preferred embodiment of the invention, with the funnel in a lowered position.
Figure 21:
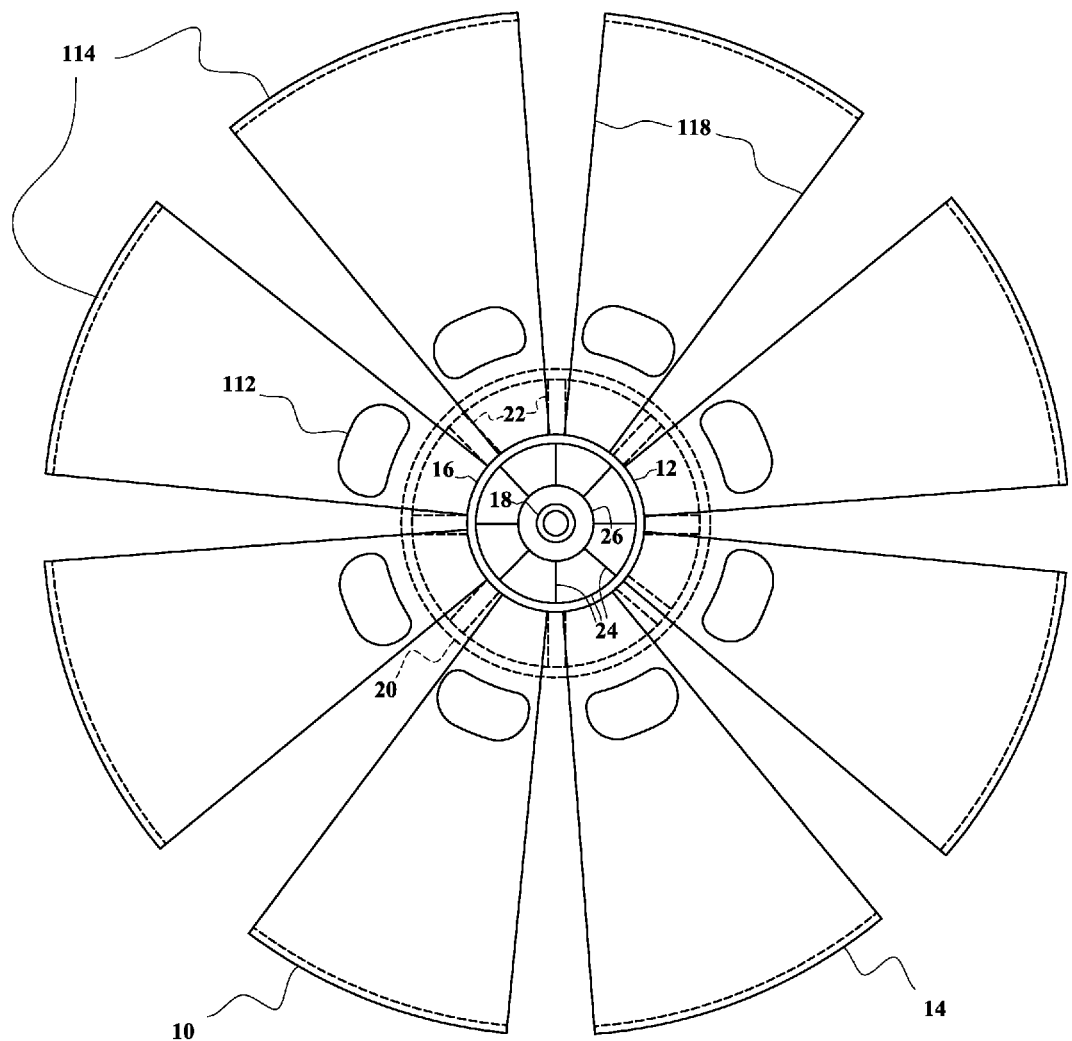
FIG. 21 is a horizontal sectional view drawn along lines 21-21 of FIG. 18, showing the seventh preferred embodiment of the invention, with the funnel in a raised position.

A sleeve (80 in FIGS. 17 and 18), is suitably dimensioned and configured to be placed over a portion of the well pipe P adjacent to the open end E of the well pipe, with the sleeve being connected to the return pipe 16. FIG. 17 shows the sleeve above the well pipe before it is placed over it. FIG. 18 shows the sleeve surrounding the top portion of the well pipe. A portion of the first fluid (e.g., oil) that is not held back by the greater pressure of the second fluid (e.g., air) will flow through the sleeve and then the return pipe. The sleeve may have two or more telescoping segments, or may be in one piece without moving parts. The sleeve may be made of a rigid material with a fixed diameter, or of a flexible material with a variable diameter.

Figure 22:
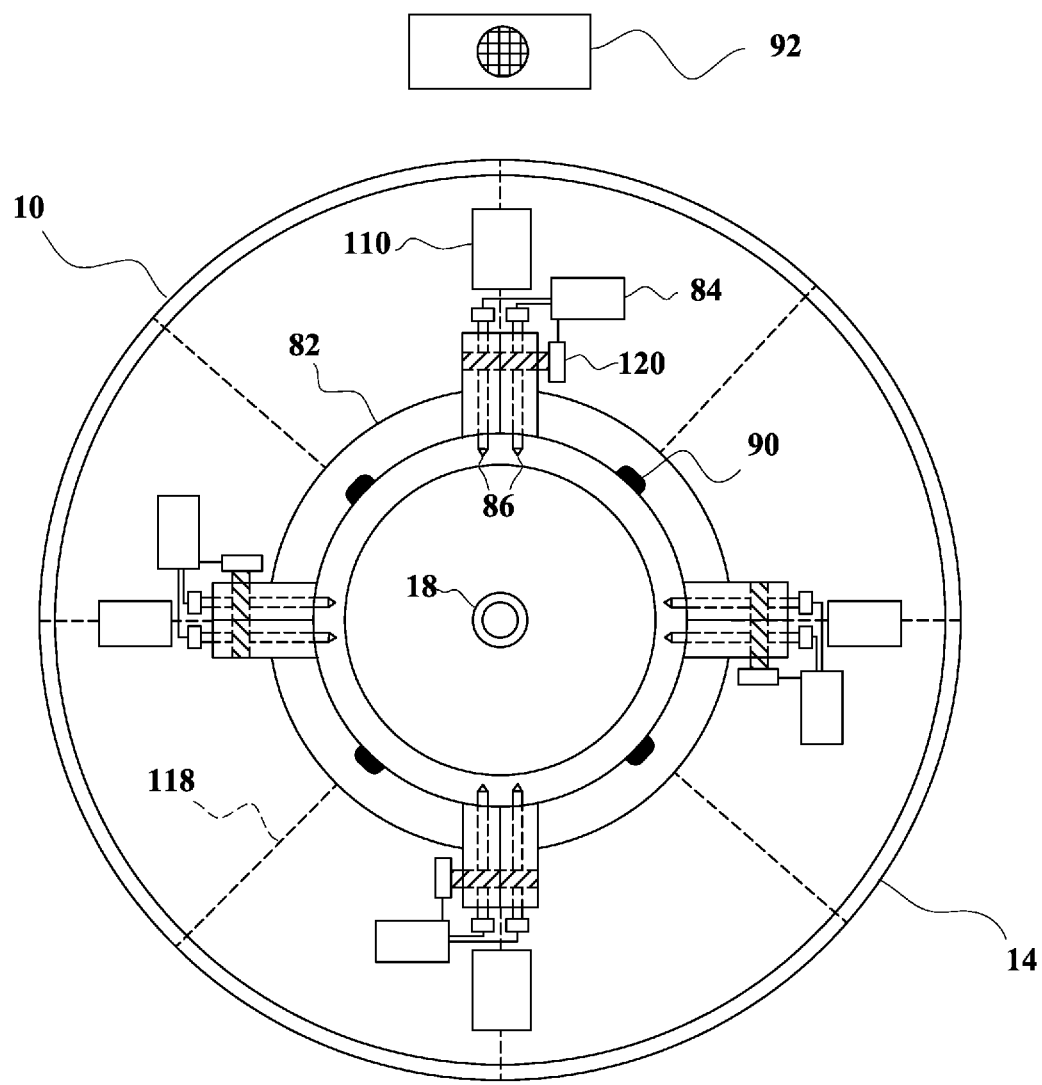
FIG. 22 is a horizontal sectional view drawn along lines 22-22 of FIG. 17, showing the seventh preferred embodiment of the invention.

A locking collar 82, attached to the sleeve, can lock the sleeve around the portion of the well pipe adjacent to the open end of the well pipe. As shown in FIG. 22, a power source 84 for locking the locking collar using bolts 120 can apply sufficient force to pierce the well pipe and lock the locking collar onto the well pipe using attachment members 86, without causing the well pipe to collapse. Preferably, the sleeve and the locking collar are generally cylindrical. The attachment members preferably are evenly spaced around the locking collar. Preferably, the sleeve has an interior surface 88 that can grip an exterior surface of the well pipe. Preferably, there are one or more pressure sensors (90 in FIG. 22) and an alerting system 92 that is activated when the pressure sensors detect excessive pressure of the sleeve against the well pipe, to prevent the well pipe from being collapsed. The connection between the sensors and the alerting system may be wired or wireless. Alerts may be audible, visible, etc. Preferably, a sharp edge 94 extends from a lower rim 96 of the sleeve, by which irregularities in the well pipe can be cut.

2. Positioning Rings

Figure 23:
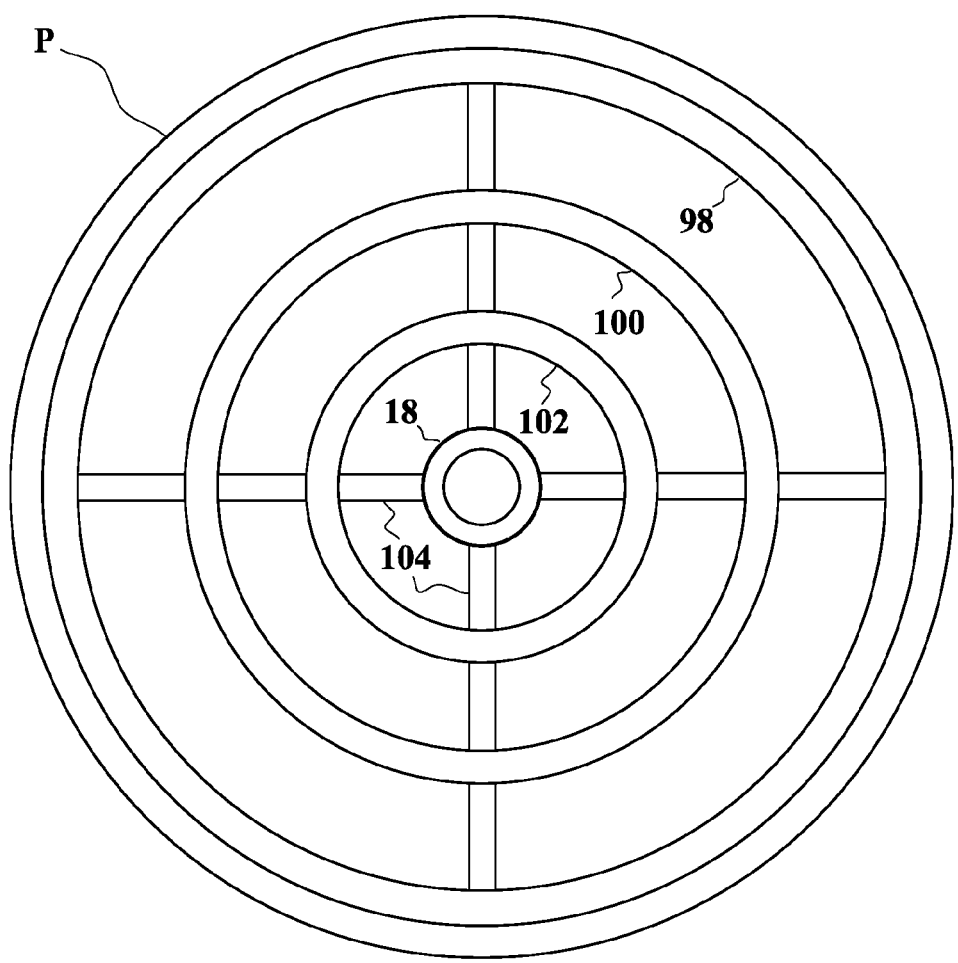
FIG. 23 is a top detail view of the well pipe with the cylindrical positioning rings inserted, in the seventh preferred embodiments of the invention.
Figure 24:
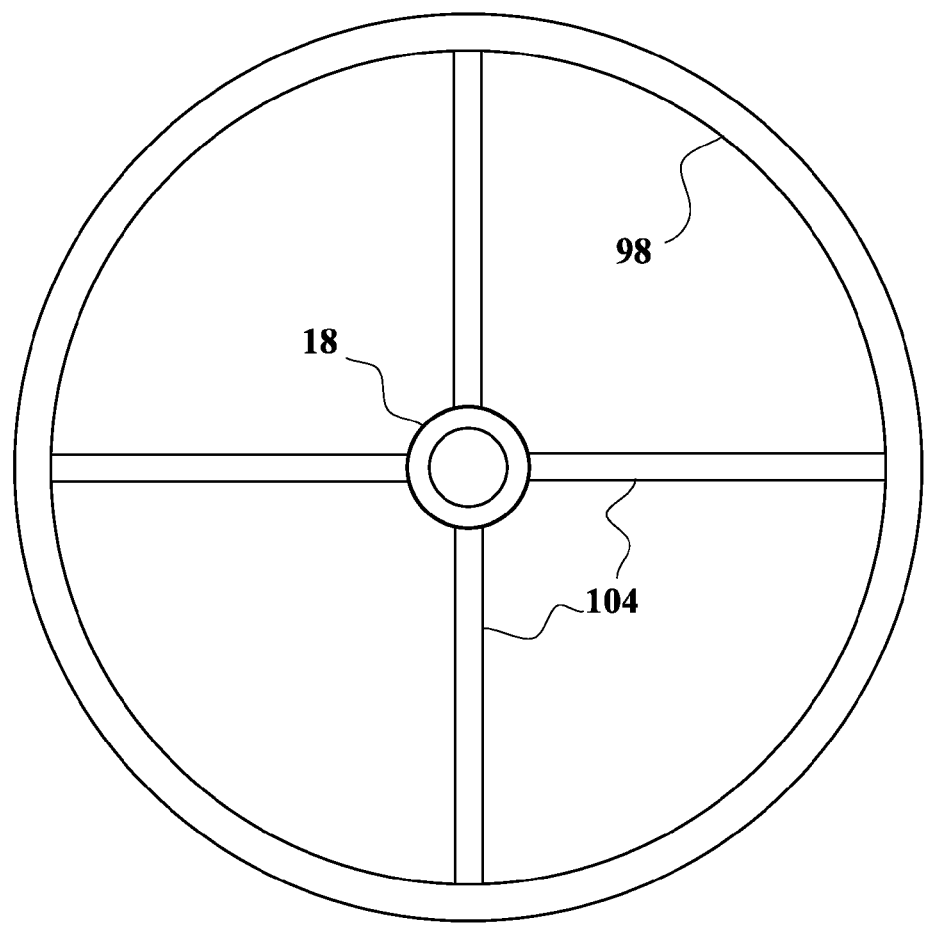
FIG. 24 is a top detail view of the largest positioning ring, in the seventh preferred embodiment of the invention.
Figure 25:
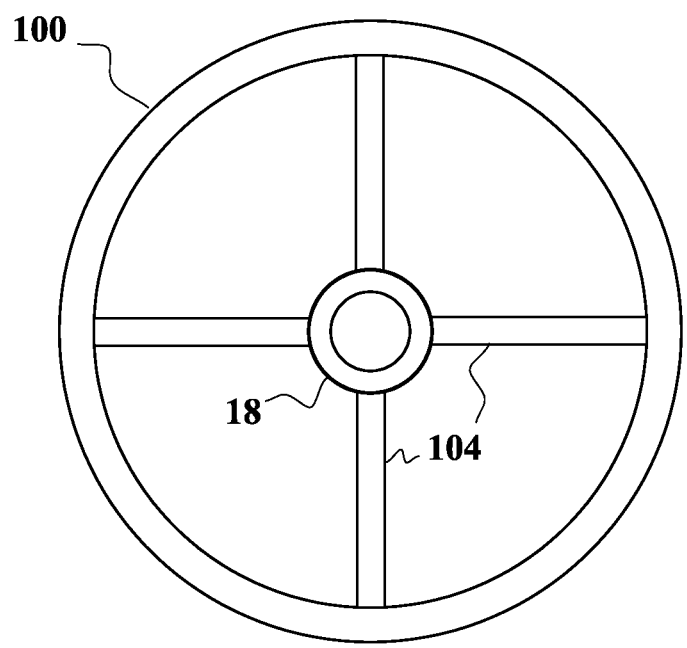
FIG. 25 is a top detail view of the middle positioning ring, in the seventh preferred embodiment of the invention.
Figure 26:
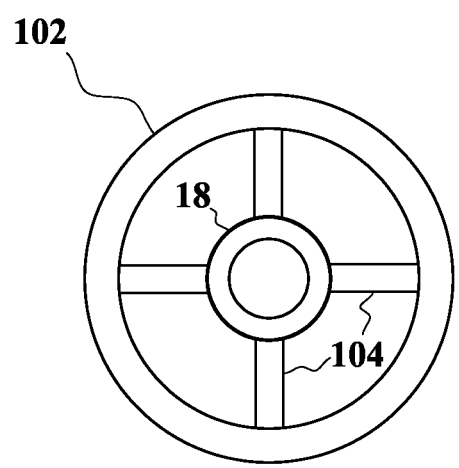
FIG. 26 is a top detail view of the smallest positioning ring, in the seventh preferred embodiment of the invention.

One or more positioning rings 98, 100 and 102 are attached to the high pressure pipe, that can fit inside the well pipe P. Preferably, there are a plurality of the positioning rings, that are attached by arms (104 in FIGS. 23-26) to the high pressure pipe, with the diameters of the rings increasing with their distance from an open end of the high pressure pipe. Preferably the positioning rings are generally cylindrical. The positioning ring 98 at the greatest distance from the open end of the high pressure pipe has a beveled lower rim (106 in FIGS. 17-19). This ring preferably has an outside diameter at or just under the inside diameter of the well pipe. The main purpose of the positioning rings is to make it easier to correctly position the funnel and sleeve over the well pipe, but they can also contribute to the Bernoulli effect. FIG. 23 shows all of the rings positioned inside the well pipe P. FIGS. 24-26 show each of the rings separately. (There may be a different number of positioning rings from what is shown in the drawings.)

3. Cutting Devices

One or more cutting devices 108 are attached to one or more extension arms 110, that can cut the well pipe. Preferably, the extension arms are moveable, and the cutting devices can rotate around the well pipe. The cutting devices may be lasers, electric saws, pneumatic or hydraulic cutters, or any other suitable means for neatly cutting the well pipe, so that bent or ruptured portions of the well pipe can be removed, to allow the invention to be attached to an intact portion of the well pipe.

4. Funnel is Adjustable and Removable

The funnel is preferably (1) adjustable, (2) removable, and (3) ventable. It is ventable to allow more control of the valve in placement and removal. The pressure could be so great as to blow the funnel off the pipe before the Bernouli effect could be started. The fluid entering the return pipe (which will usually have a smaller diameter than the well pipe) needs to get flowing to create a Bernoulli effect. Controlled venting allows this to occur.

The slope between the smaller end 12 and the larger end 14 of the funnel 10 can be adjusted. The funnel is shown in a lowered position in FIGS. 17 and 20, and in a raised position in FIGS. 18 and 21. (The possible positions of the funnel are not limited to the two positions shown.) The funnel is comprised of leaves (114 in FIGS. 20 and 21) that are pivotally connected by joints (116 in FIGS. 17 and 18) to the return pipe 16. The seams 118 are closed when the funnel is in a lowered position (as in FIG. 20) and separated with the funnel is in a raised position (as in FIG. 21). The funnel can be removed and raised to the surface of a body of liquid with the aid of floats 112 attached to the funnel. The leaves may be released from the joints by mechanical means, by an explosive charge, or by any other suitable means. The funnel can be reused after it is separated. The floats may be permanently buoyant, or inflated when needed.

A new feature in Provisional Patent Application 62/289,326, which was filed on Jan. 31, 2016 by the present inventor as an original patent application without claiming priority from the above-mentioned applications, is that well pressure may be used to power valve moving parts, propellers, turbines, the funnel, cutters and grinders, orientation jets, as well as increase the Bernoulli effect, and to accelerate the rotation of the turbine and propellers to further increase the ram jet effect as well as the Bernoulli effect, thus acting like a ram jet to suck the valve down onto the well pipe. This newly disclosed feature, which was not mentioned in Applicant's prior patent applications, may be used in any of the above-mentioned embodiments of the invention.

Another new feature in the present application is that valve gates and filters may be opened and closed. The propellers may be powered by electricity, hydraulics, pneumatics, or other suitable means. A centrifuge and separators may be used with the valve. Robotic devices may be attached to the valve by arms or tethers. Light and light-generating devices may be used with the valve for illumination. Cameras and power generating devices for the cameras may be combined with the valve. Pressure and flow control devices may be incorporated into the valve. Gaskets may be opened and closed. Valve motors may be used to move the valve in any direction, and to position it for placement or removal. There may be means for activating flotation collars or devices. Power grinding devices may be attached, for grinding cement (or other substances) for placement of the sleeve. There may be means to power sleeve movement into place (extrusion) and its removal (retraction). There may be means to power sleeve attachment and detachment, including pipe penetrating connection and disconnection. There may be means to power valve stopper placement (to shut down the well) and removal. There may be means to power funnel flattening and contracting, and to power removal of the valve.

Figure 27:
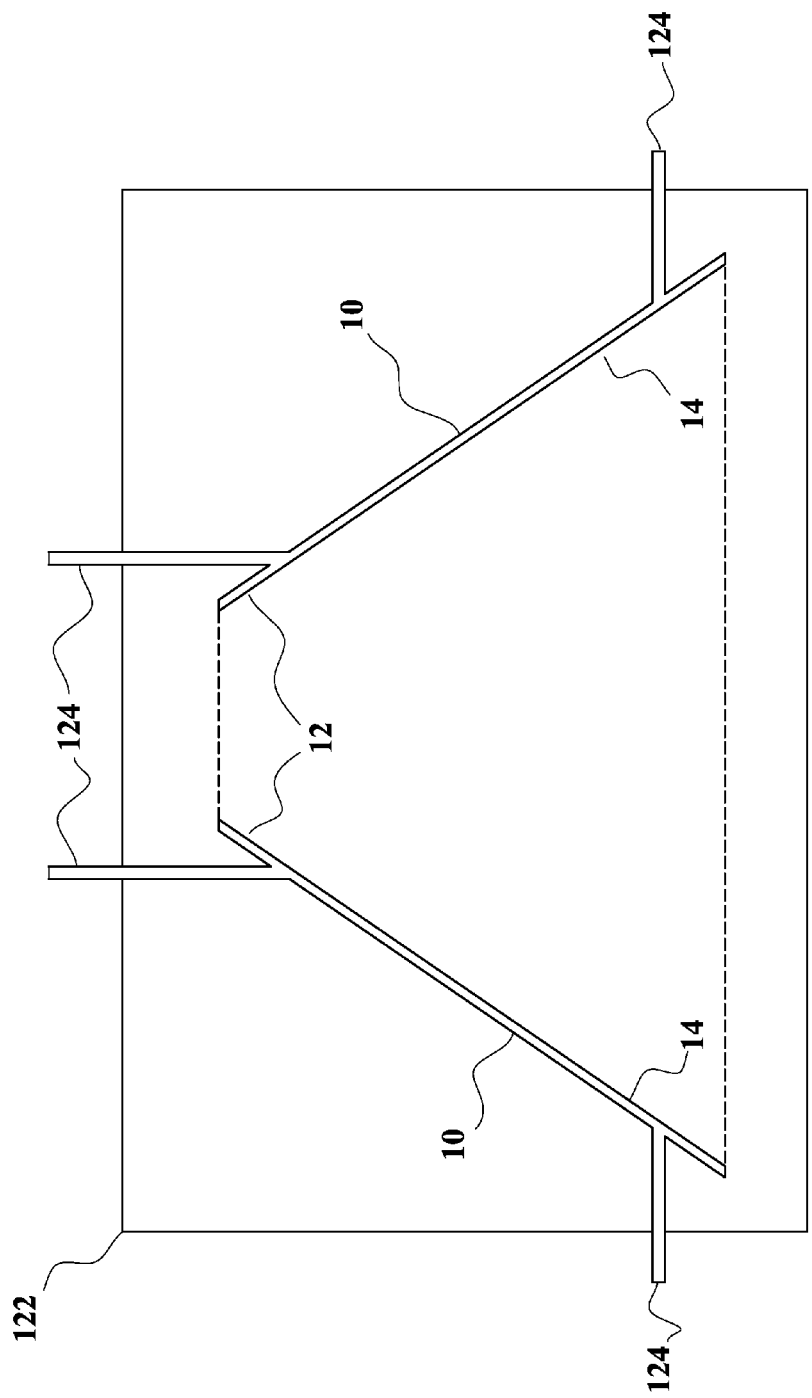
FIG. 27 is a sectional view of a mold for the funnel in the first through seventh preferred embodiments of the invention.

The following drawings show the use of plastic injection molds in making parts of the present invention:

FIG. 27 is a sectional view of a mold 122 for the funnel 10, showing injection ports 124 near the smaller end 12 and the larger end 14 of the funnel.

Figure 28:
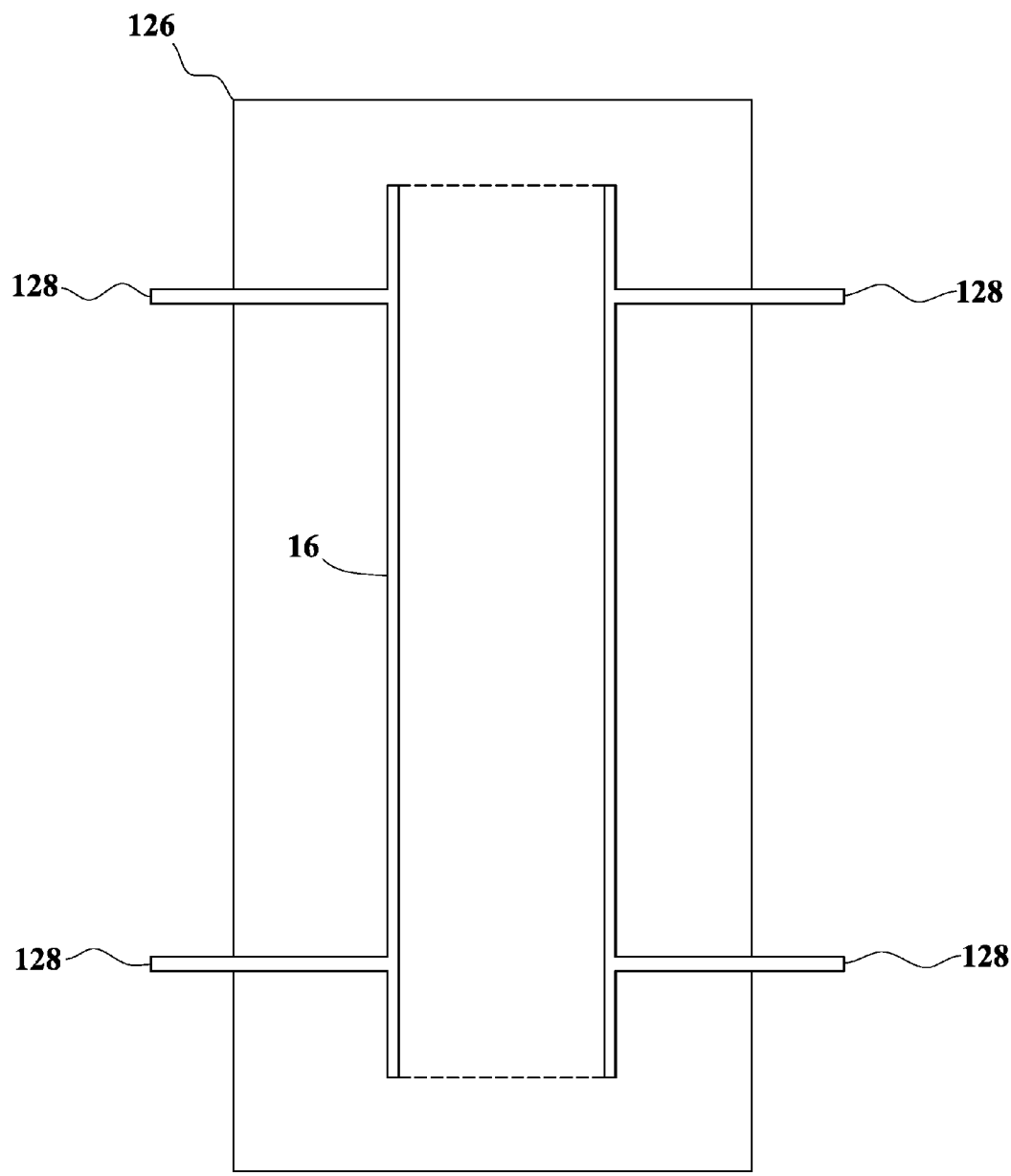
FIG. 28 is a sectional view of a mold for the return pipe in the first through seventh preferred embodiments of the invention.

FIG. 28 is a sectional view of a mold 126 for the return pipe 16, showing injection ports 128.

Figure 29:
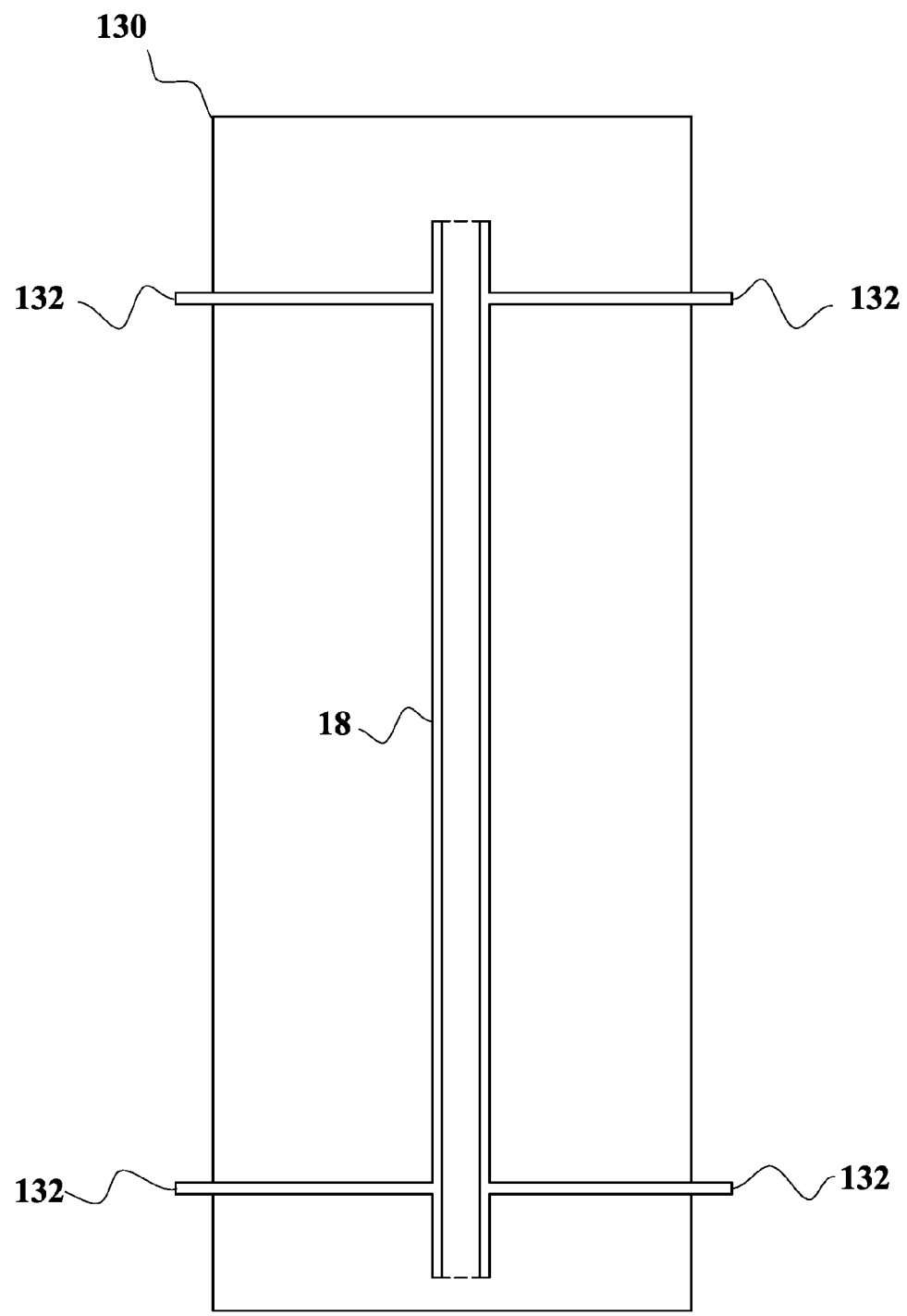
FIG. 29 is a sectional view of a mold for the high pressure pipe in the first through seventh preferred embodiments of the invention.

FIG. 29 is a sectional view of a mold 130 for the high pressure pipe 18, showing injection ports 132.

The invention also encompasses a method of recovering from blowouts, including the steps of:

(a) placing a larger end of a funnel adjacent to an open end of a well pipe through which a first fluid is escaping, the funnel having a smaller end that is connected to a return pipe;

(b) moving the funnel into alignment with the well pipe, with the aid of one or more positioning rings attached to the high pressure pipe, that can fit inside the well pipe;

(c) fastening a sleeve over a portion of the well pipe adjacent to the open end of the well pipe, said sleeve being connected to the return pipe;

(d) locking the sleeve around the pipe from which the first fluid is escaping, using a locking collar attached to the sleeve;

(e) inserting a high pressure pipe into the well pipe;

(f) pumping the second fluid, at a higher pressure than that of the first fluid, through the high pressure pipe into the well pipe;

(g) separating the first fluid by the second fluid in a space adjacent to an end of the high pressure pipe that has been inserted into the well pipe; and (h) accelerating a portion of the first fluid that is not held back by the greater pressure of the second fluid, causing it to flow through the sleeve and the return pipe at an increased velocity, but at a reduced pressure due to the Bernoulli effect, thus supplying suction that helps to move the funnel down onto the well pipe;

(i) wherein the Bernoulli effect is increased by the pressure of the first fluid; and (j) the pressure of the first fluid accelerates devices that accelerate it, further increasing the ram jet effect as well as the Bernoulli effect.

Steps (b), (c) and (d) are optional. Steps (f) and (g) may not apply when the pressure of the first fluid is used to increase the speed (or velocity) of the propellers and turbines.

Another example of an apparatus that may be constructed according to the present invention is a blowout preventer with one or more explosively actuated plates made or enhanced plastic with metal cutting edges.

Figure 30:
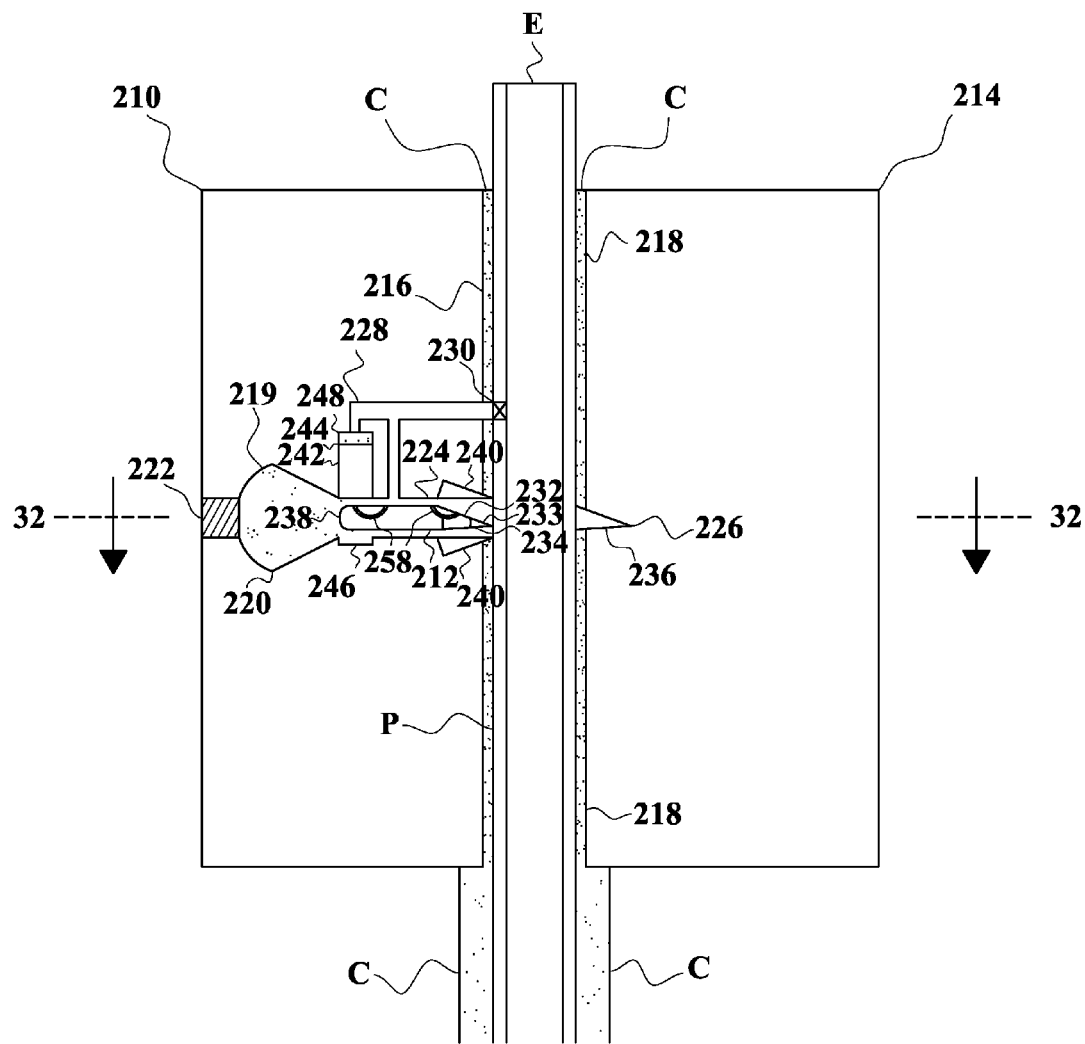
FIG. 30 is a vertical sectional view drawn along lines 30-30 of FIG. 32 of the eighth preferred embodiment of the invention, showing the position of the plate before the explosive charge has been fired.
Figure 32:
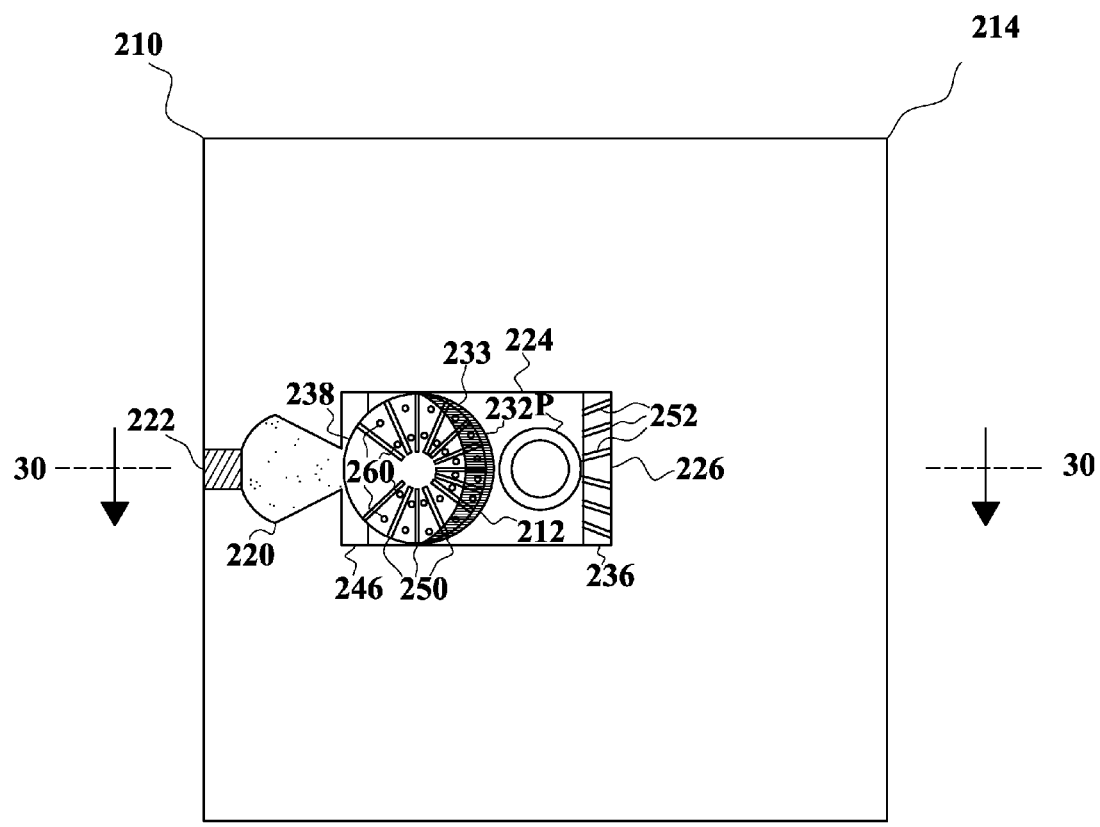
FIG. 32 is a horizontal sectional view drawn along lines 32-32 of FIG. 30 of the eighth preferred embodiment of the invention, showing the position of the plate before the explosive charge has been fired.

FIG. 30 is a vertical sectional view drawn along lines 30-30 of FIG. 32 of the eighth preferred embodiment of the invention 210, showing the position of the plate 212 before the explosive charge has been fired. The block 214 has a cylindrical channel 216 with ends 218 configured so that it can be inserted over the open end E of pipe P through which fluid (such as petroleum or natural gas) can escape. (The pipe may be a well pipe or riser, undersea or on land.) An explosive charge 219 in chamber 220 when fired will propel the plate across the channel to block the flow of fluid. A receiver/ignitor 222 ignites the explosive charge when it receives a radio, electrical, sonic or other signal to do so. When the charge is fired, the plate will move in passage 224 with far end 226. Vents 228 will allow gases from the charge to escape through one-way valves 230 into the pipe above the plate. The upper edge 232 of the side of the plate facing the pipe is inclined and reinforced with metal 233, so that it can cut through the walls of the pipe, and to enable fluid to escape upward in the pipe. The lower edge 234 of the side of the plate facing the pipe is slightly inclined and also reinforces with metal 233, and the lower edge 236 of the far end of the passage is also slightly inclined, to insure that the plate can move through the passage and close off the pipe even if the edge of the plate and the far end of the passage become slightly misaligned. The edge 238 of the plate facing the charge is blunt or rounded, so that the plate will be propelled by the charge. Plate reversal stops 240 are above and below the plate before the charge is fired. A back flow preventer 242 is above the plate before the charge is fired, in the back flow preventer passage 244 with lower end 246 below the plate. There is a back flow preventer charge 248 in the back flow preventer passage above the back flow preventer before the charge 219 is fired. When the block is placed over and around the pipe, cement C is placed over the pipe and the side of the block into which the pipe is inserted, and allowed to harden, to create a tight seal and prevent fluids (such as seawater or oil) from leaking in or out. Any other suitable means may be substituted for cement to seal any space between the pipe and channel and retain the block on the pipe. The block is made of metal, concrete, or other suitable material.

Figure 31:
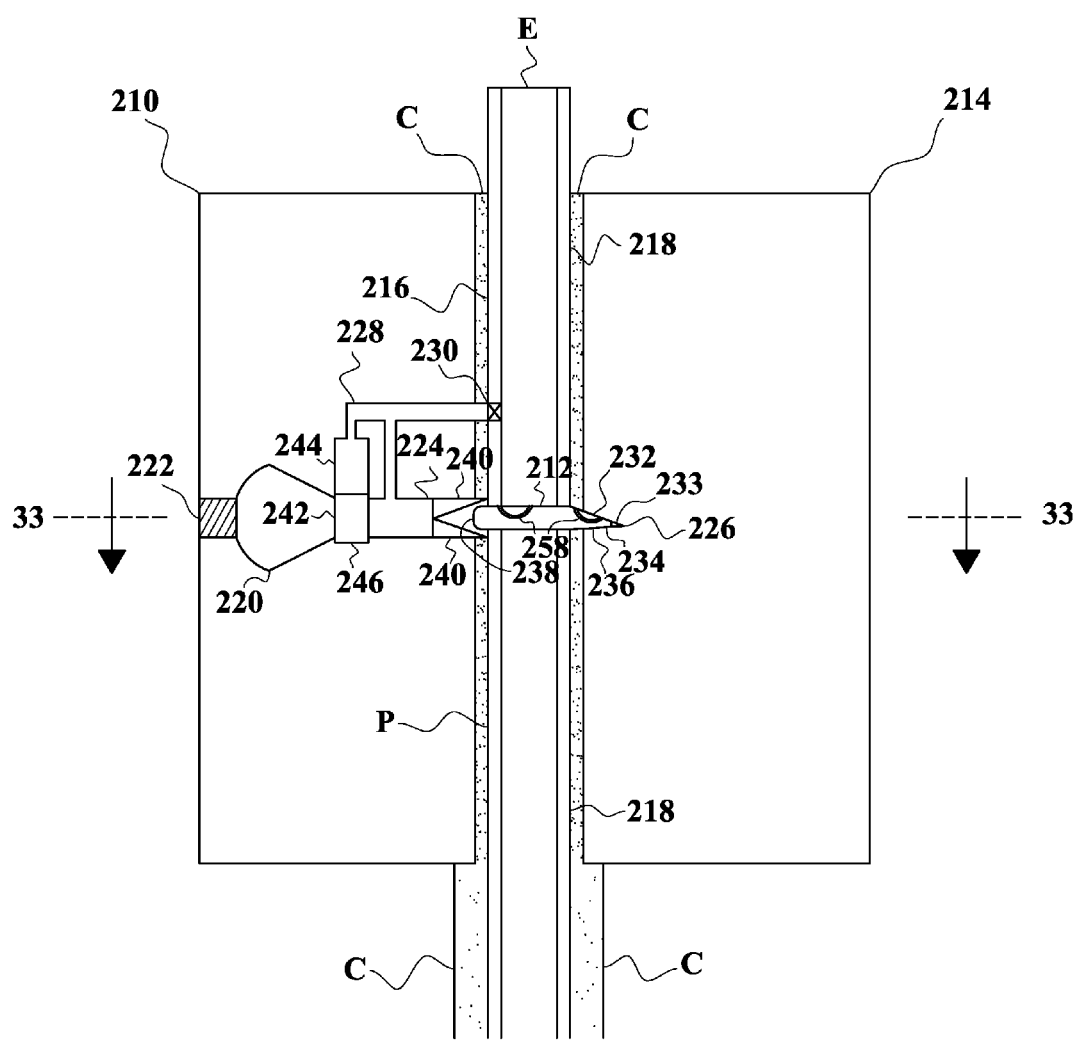
FIG. 31 is a vertical sectional view drawn along lines 31-31 of FIG. 33 of the eighth preferred embodiment of the invention, showing the position of the plate after the explosive charge has been fired.
Figure 33:
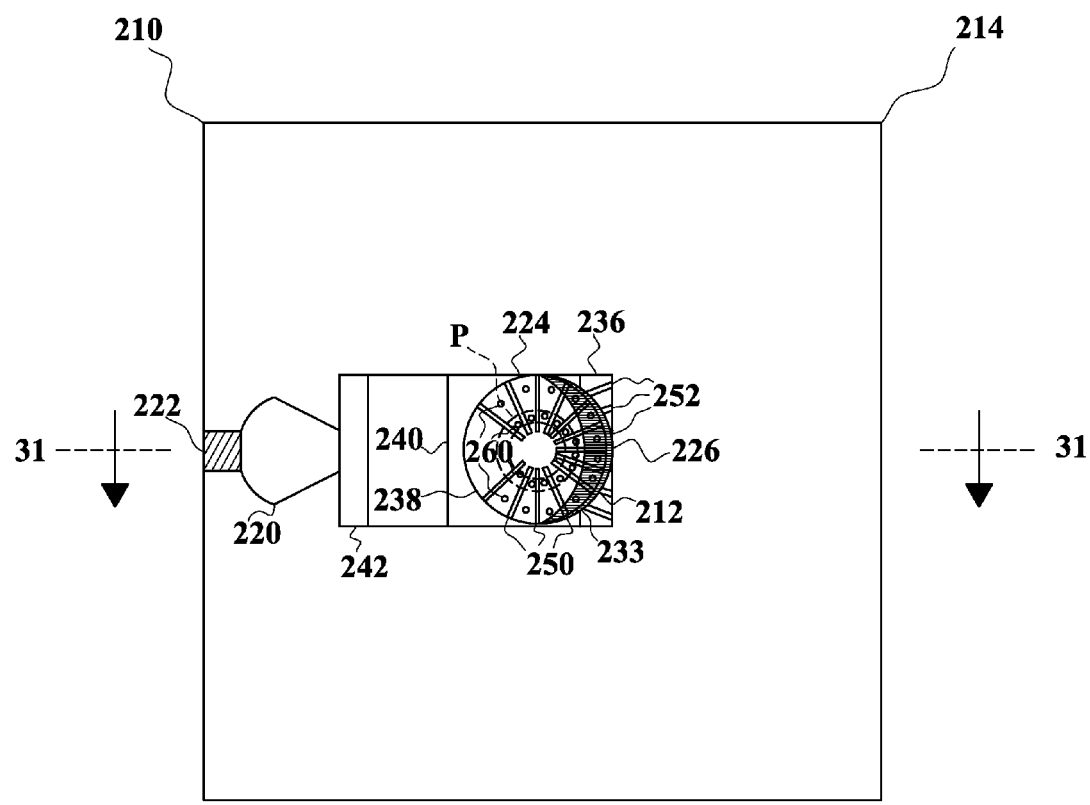
FIG. 33 is a horizontal sectional view drawn along lines 33-33 of FIG. 32 of the eighth preferred embodiment of the invention, showing the position of the plate after the explosive charge has been fired.

FIG. 31 is a vertical sectional view drawn along lines 31-31 of FIG. 33 of the eighth preferred embodiment of the invention, showing the position of the plate 212 after the explosive charge has been fired. The far end 226 of the passage 224 prevents the plate from moving too far and bypassing the channel. The inclination of the lower edge 234 of the plate should match the inclination of the lower surface 236 of the far end of the passage, to more effectively prevent the escape of fluid. The upper edge 232 and lower edge 234 of the plate form a knife-like blade that is a male element, while the upper and lower surfaces of the end of the passage form a female element, that matingly engage to create tight seal that prevents fluid from escaping. The plate reversal stops 240 move into the passage and prevent the plate from moving back, locking it in place. The plate reversal stops may be actuated by springs that are released by a trigger mechanism or motion detector when the plate passes, by a timer after the charge is fired, or by any other suitable means. (Alternatively, other locking mechanisms may be used to keep the plate in place.) The charge above the back flow preventer is fired after the charge in chamber 220, and propels the back flow preventer 242 through its passage 244 until it rests against far end 246, thus sealing the passage behind the plate and preventing fluid from escaping. A locking pin or other suitable mechanism may keep the back flow preventer in place. The charge above the back flow preventer may be fired in response to a trigger mechanism or motion detector when the plate passes, by a timer after the main charge is fired, or by any other suitable means. Gases from the charge ignited above the back flow preventer can escape through vents 228. Tunnels 258 passing through upper portions of the plates enable some of the fluid to escape from near edges of the plates to near the centers of the plates into the pipe, above that plates that are blocking its flow. The bottoms of the plates are solid, with no tunnels.

FIG. 32 is a horizontal sectional view drawn along lines 32-32 of FIG. 30 of the eighth preferred embodiment of the invention, showing the position of the plate before the explosive charge has been fired. Grooves or channels 250 radiate outward from the center of the upper surface of the plate 212, except on the side of the plate facing the charge. There are also grooves or channels 252 in the far end of the passage. Openings 260 at opposite ends of the tunnels though the upper portion of the disk are also shown.

FIG. 33 is a horizontal sectional view drawn along lines 33-33 of FIG. 31 of he eighth preferred embodiment of the invention, showing the position of the plate after the explosive charge has been fired. It can be seen that the plate 212 is circular and has a somewhat larger diameter than the cylindrical pipe P, so that it can effectively seal the pipe and stop the flow of fluid. The grooves or channels 250 in the plate enable fluid to escape into the interior of the pipe above the plate as the pipe cut and blocked off by the plate. The grooves and tunnels prevent fluid in the passage from impeding movement of the plate, to ensure unobstructed closure so that it can cut off the flow in the pipe. The grooves and tunnels do not go all the way to the leading edge of the plate, to ensure a seal with the end of the passage. The plate is preferably made of hardened metal (or hardened plastic with a metal cutting edge), which is thick and hard enough to cut through the pipe and stop the flow, but thin and soft enough that it can be drilled through to reopen an oil or gas well.

There may be a plurality of plates in a single block. There may be a plurality of blocks used on a single pipe or well. This arrangement may be referred to as a "Christmas tree". This will allow the blowout preventer to be used multiple times to prevent multiple blowouts, as it may not be necessary to fire all of the plates to stop a blowout, and the plates that have been fired may be drilled through to reopen the well, while leaving the unfired plates in their original positions for future use.

Figure 34:
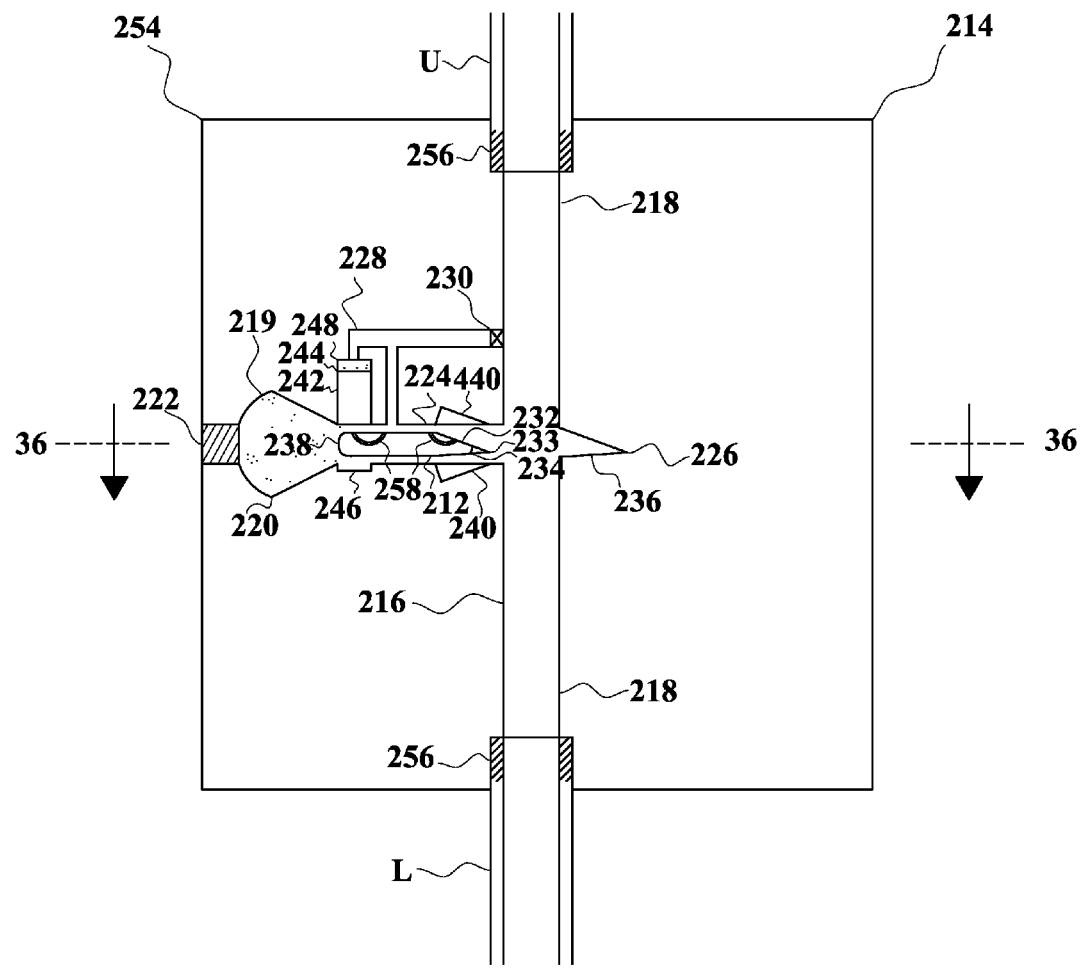
FIG. 34 is a vertical sectional view drawn along lines 34-34 of FIG. 37 of the ninth preferred embodiment of the invention, showing the position of the plate before the explosive charge has been fired.
Figure 36:
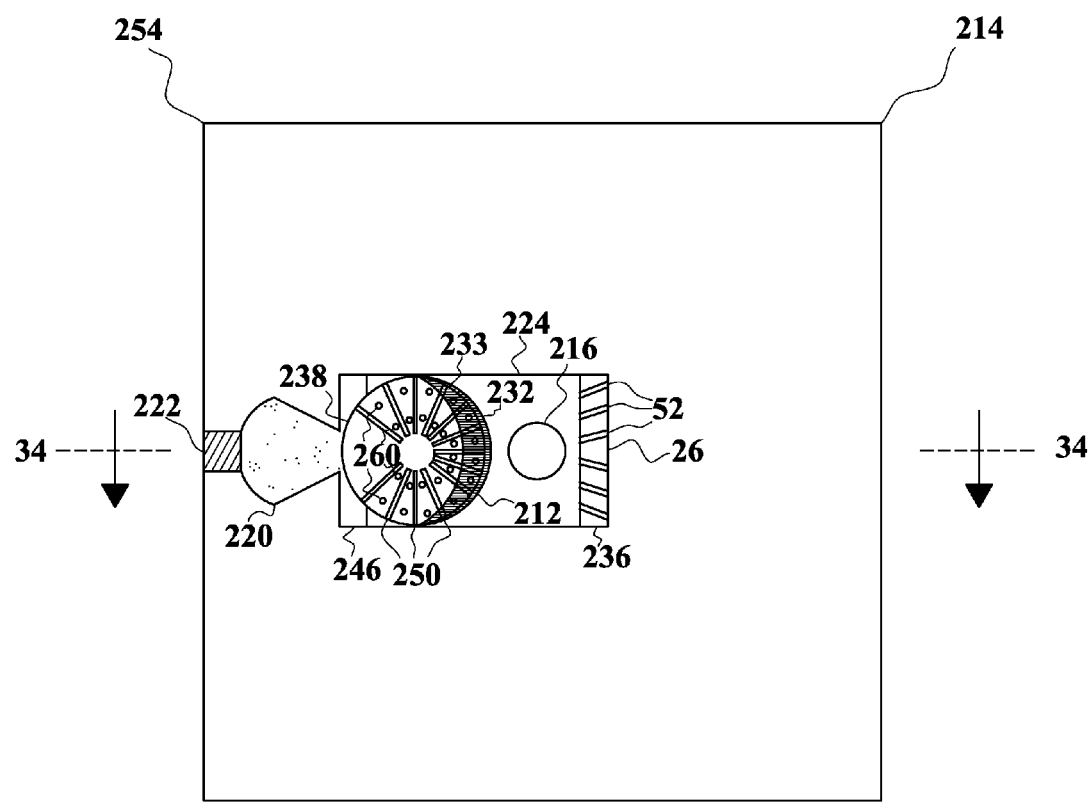
FIG. 36 is a horizontal sectional view drawn along lines 36-36 of FIG. 34 of the ninth preferred embodiment of the invention, showing the position of the plate before the explosive charge has been fired.

FIG. 34 is a vertical sectional view drawn along lines 34-34 of FIG. 36 of the ninth preferred embodiment of the invention 254, showing the position of the plate before the explosive charge has been fired. The ninth preferred embodiment is the same as the eighth preferred embodiment, except that there is no pipe going through the block, and cement is not used. The block 214 is screwed over the lower pipe L, and the upper pipe U is screwed into the block, using screw threads 256. The fluid flows directly through the channel 16 between the lower pipe and the upper pipe. The lower pipe may be well pipe. The upper pipe may be a riser.

Figure 35:
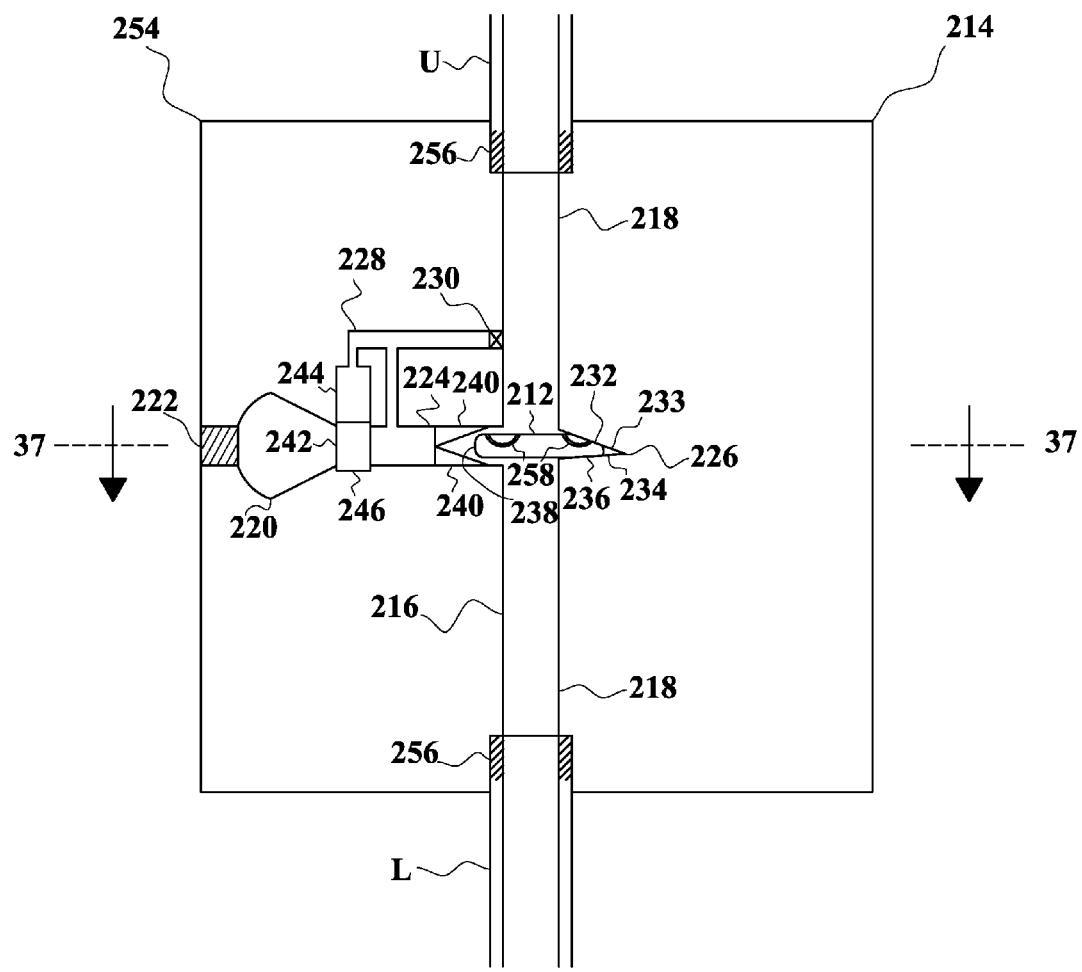
FIG. 35 is a vertical sectional view drawn along lines 35-35 of FIG. 37 of the ninth preferred embodiment of the invention, showing the position of the plate after the explosive charge has been fired.
Figure 37:
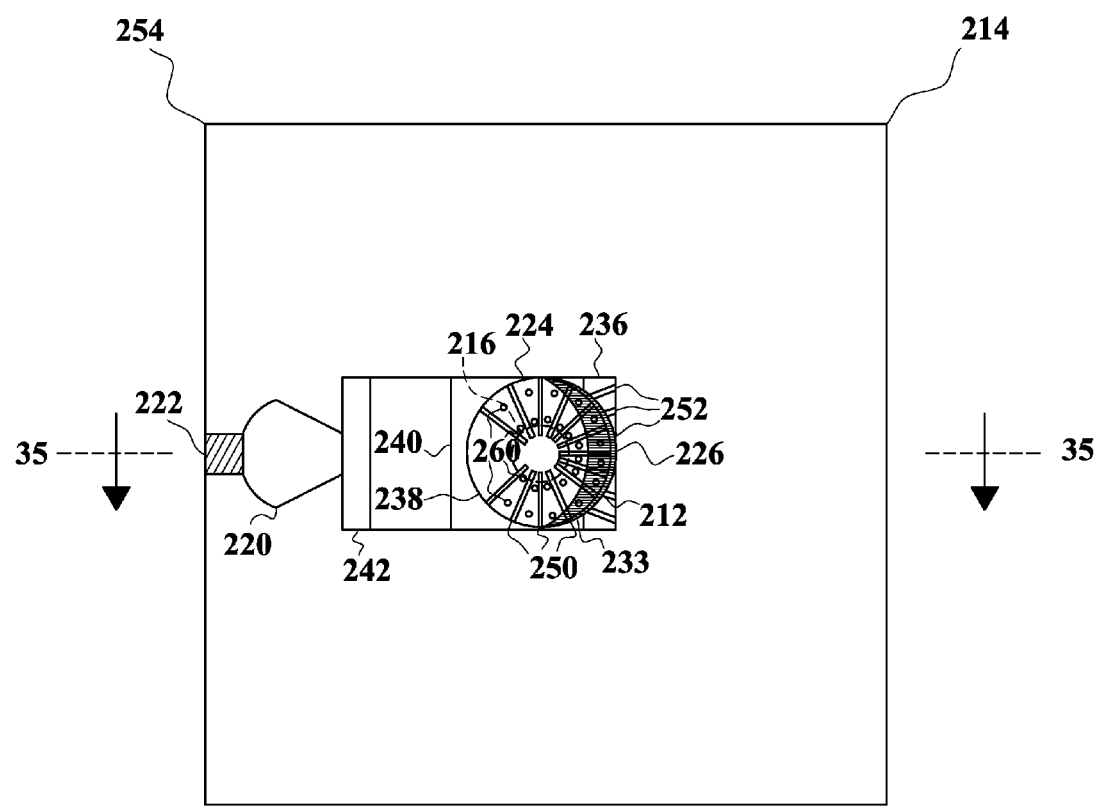
FIG. 37 is a horizontal sectional view drawn along lines 37-37 of FIG. 35 of the ninth preferred embodiment of the invention, showing the position of the plate after the explosive charge has been fired.

FIG. 35 is a vertical sectional view drawn along lines 35-35 of FIG. 37 of the ninth preferred embodiment of the invention, showing the position. of the plate after the explosive charge has been fired. The plate does not need to cut through a pipe, but blocks the channel directly. As it does not need to cut through the pipe, the plate may be thinner than in the first preferred embodiment, which will make it easier to drill through to reopen the well.

FIG. 36 is a horizontal sectional view drawn along lines 36-36 of FIG. 34 of the ninth preferred embodiment of the invention, showing the position of the plate before the explosive charge has been fired. FIG. 37 is a horizontal sectional view drawn along lines 37-37 of FIG. 35 of the ninth preferred embodiment of the invention, showing the position of the plate after the explosive charge has been fired.

Figure 38:
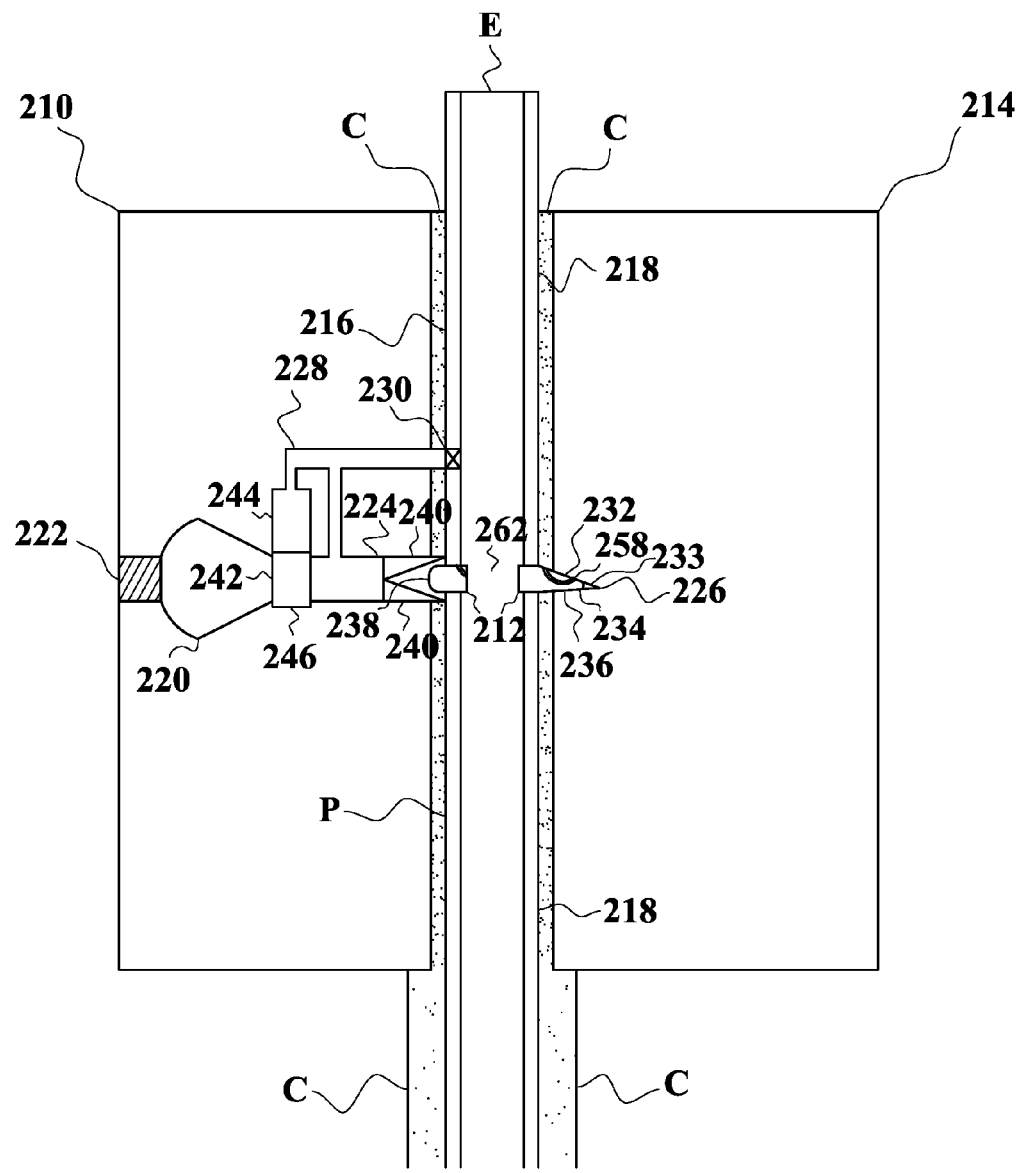
FIG. 38 is a vertical sectional view of the eighth preferred embodiment of the invention, showing the plate after it has been drilled through to reopen the pipe.
Figure 39:
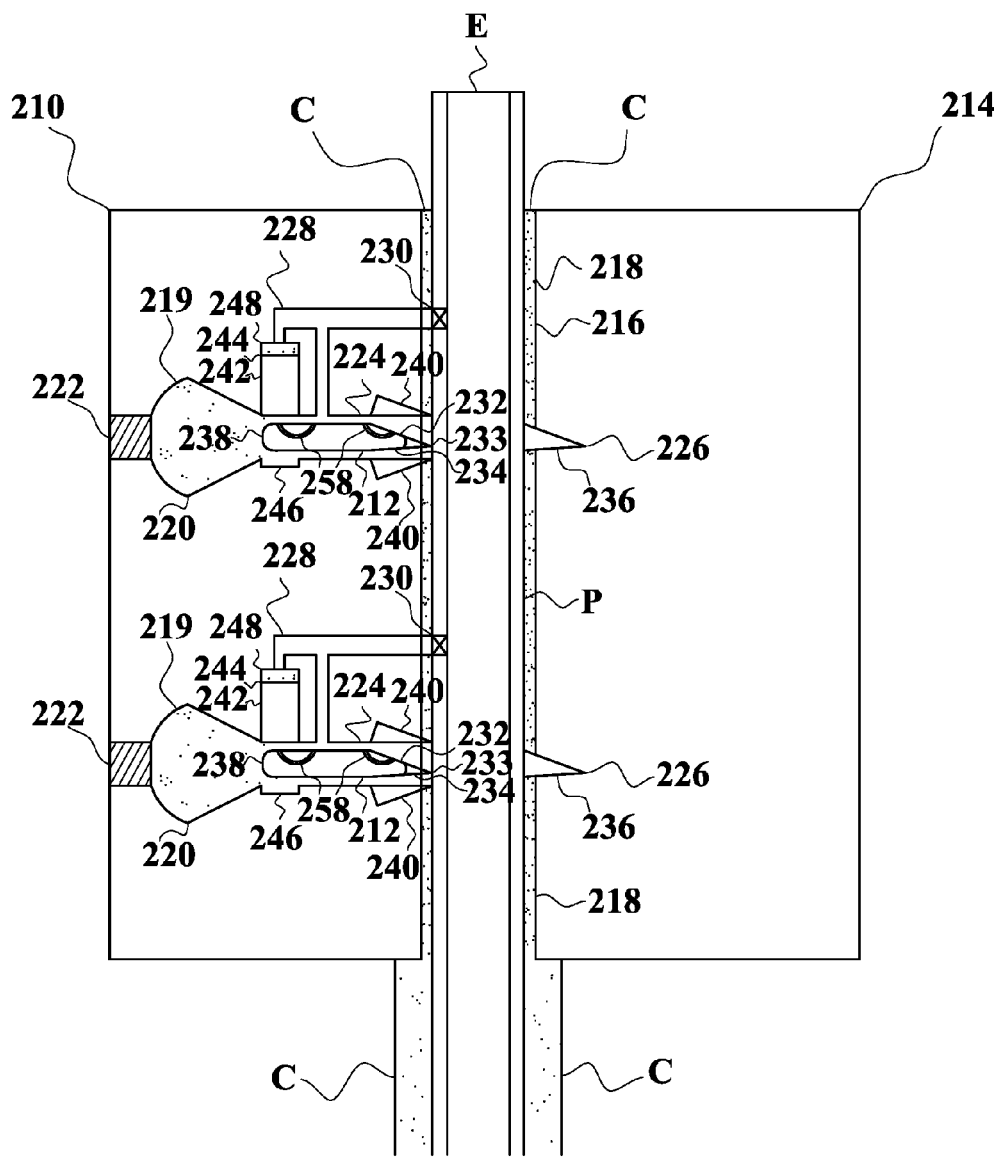
FIG. 39 a vertical sectional view of the eighth preferred embodiment of the invention, showing a block with two plates.
Figure 40:
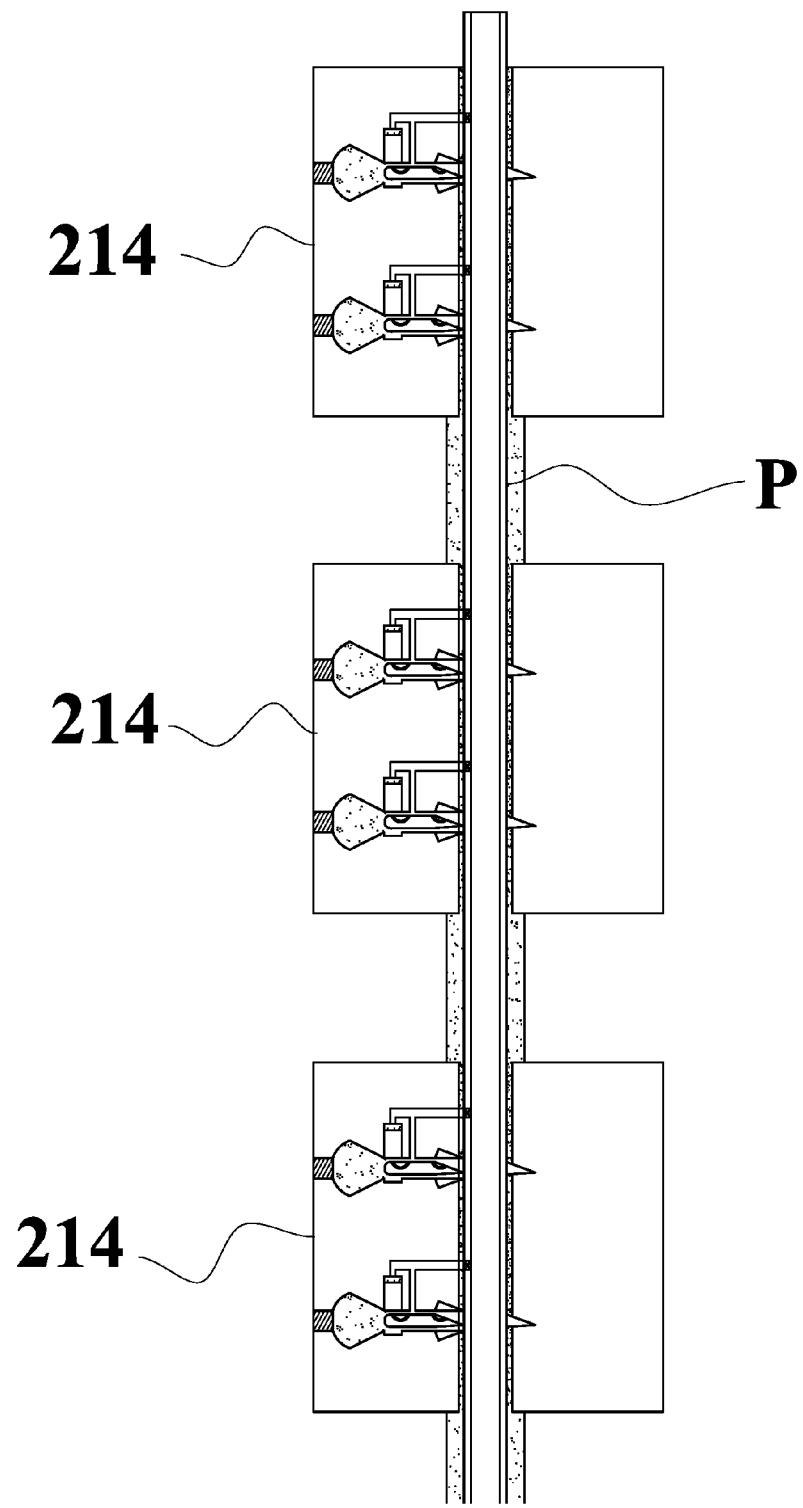
FIG. 40 is a vertical sectional view of the eighth preferred embodiment of the invention, showing three blocks on a pipe.

FIG. 38 is a vertical sectional view of the eighth preferred embodiment of the invention, showing the plate after it has been drilled through to reopen the pipe. FIG. 39 is a vertical sectional view of the eighty preferred embodiment of the invention, showing a block with two plates. FIG. 40 is a vertical sectional view of the first preferred embodiment of the invention, showing three blocks on a pipe. There may be similar arrangements for the second preferred embodiment of the invention.

Figure 41:
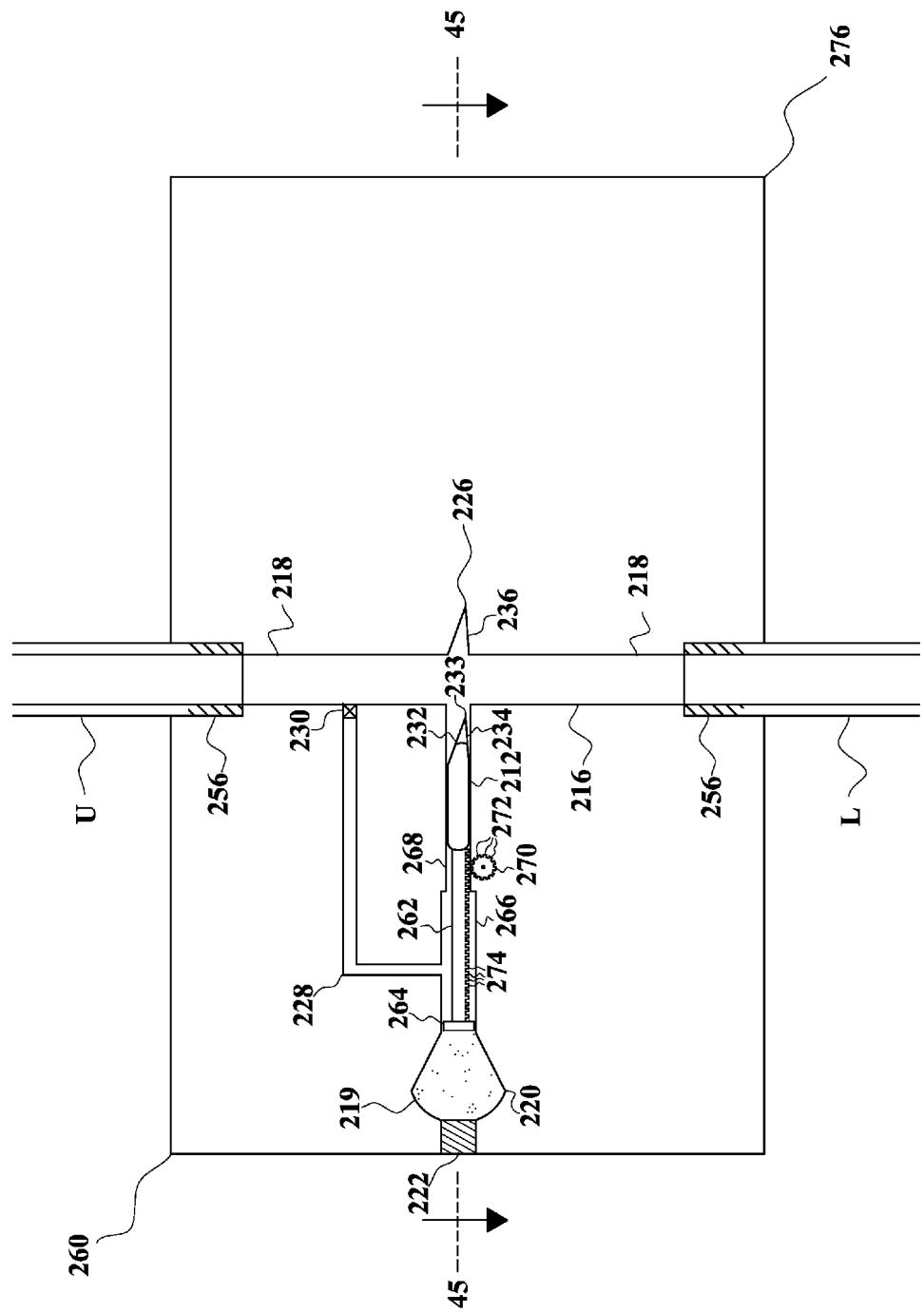
FIG. 41 is a vertical sectional view drawn along lines 41-41 of FIG. 45 of the tenth preferred embodiment of the invention, showing the position of the plate before any explosive charge has been fired.
Figure 45:
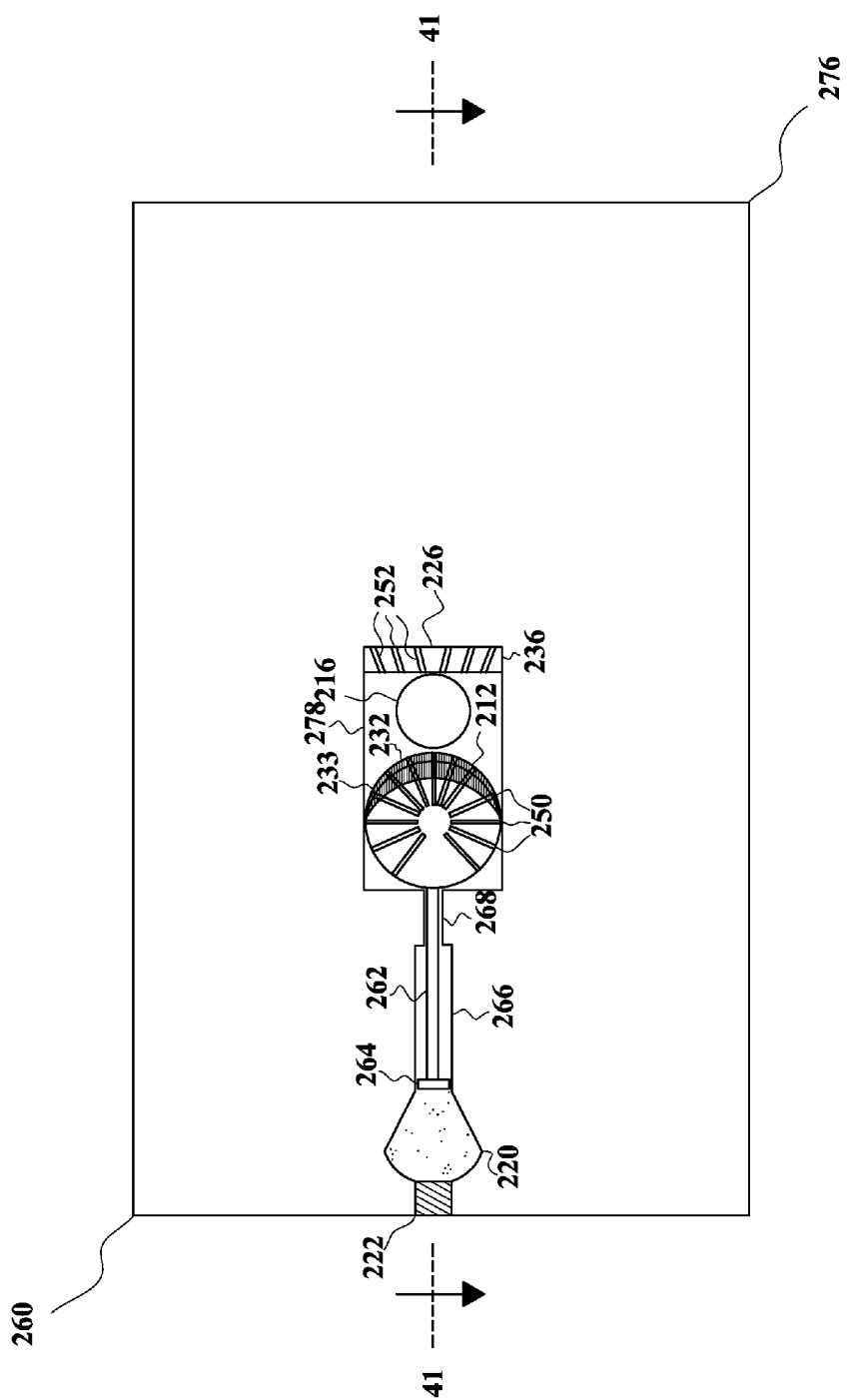
FIG. 45 is a horizontal sectional view drawn along lines 45-45 of FIG. 41 of the tenth preferred embodiment of the invention, showing the position of the plate before any explosive charge has been fired.

FIG. 41 is a vertical sectional view drawn along lines 41-41 of FIG. 45 of the tenth preferred embodiment of the invention 260, showing the position of the plate 212 before the explosive charge 219 in the chamber 220 has been fired by the receiver/ignitor 222. The receiver/ignitor may be activated by radio waves, laser, sound, electricity, or any other suitable means. A piston 262 ending in a flange 264 is attached to the plate 212. The piston is propelled by the explosive charge and propels the plate. (Alternatively, the piston and plate may be propelled by hydraulic, pneumatic, mechanical or electrical means, or by any other suitable means.) The piston and plate move in a passage having a wider portion 266 and a narrower portion 268. The flange prevents the end of the piston from moving into the narrow portion of the passage, thus limiting the movement of the plate to which the piston is attached. (As before, the movement of the plate may also be limited by the upper front edge 232 and lower front edge 234 engaging the female element 226, with sloping lower edge 236, on the opposite side of the channel 216.) The gear 270 has teeth 272 that can engage teeth 274 on the underside of the piston, to move the plate completely or partially out from the channel 216. (The gear may also be used as an alternative to the explosive charge, to move the plate completely or partially into the channel. Alternatively, the plates can be drilled through to reopen the channel, as in FIG. 38.) The block 276 is connected to an upper pipe U and a lower pipe L. Oil, gas or other fluid can flow through channel 216. There may be screw threads 56 on the pipes near ends 218 of the channel. As before, gases produced when the explosive charge is ignited can pass through vent 228 and one-way valve 230 into the channel.

Figure 42:
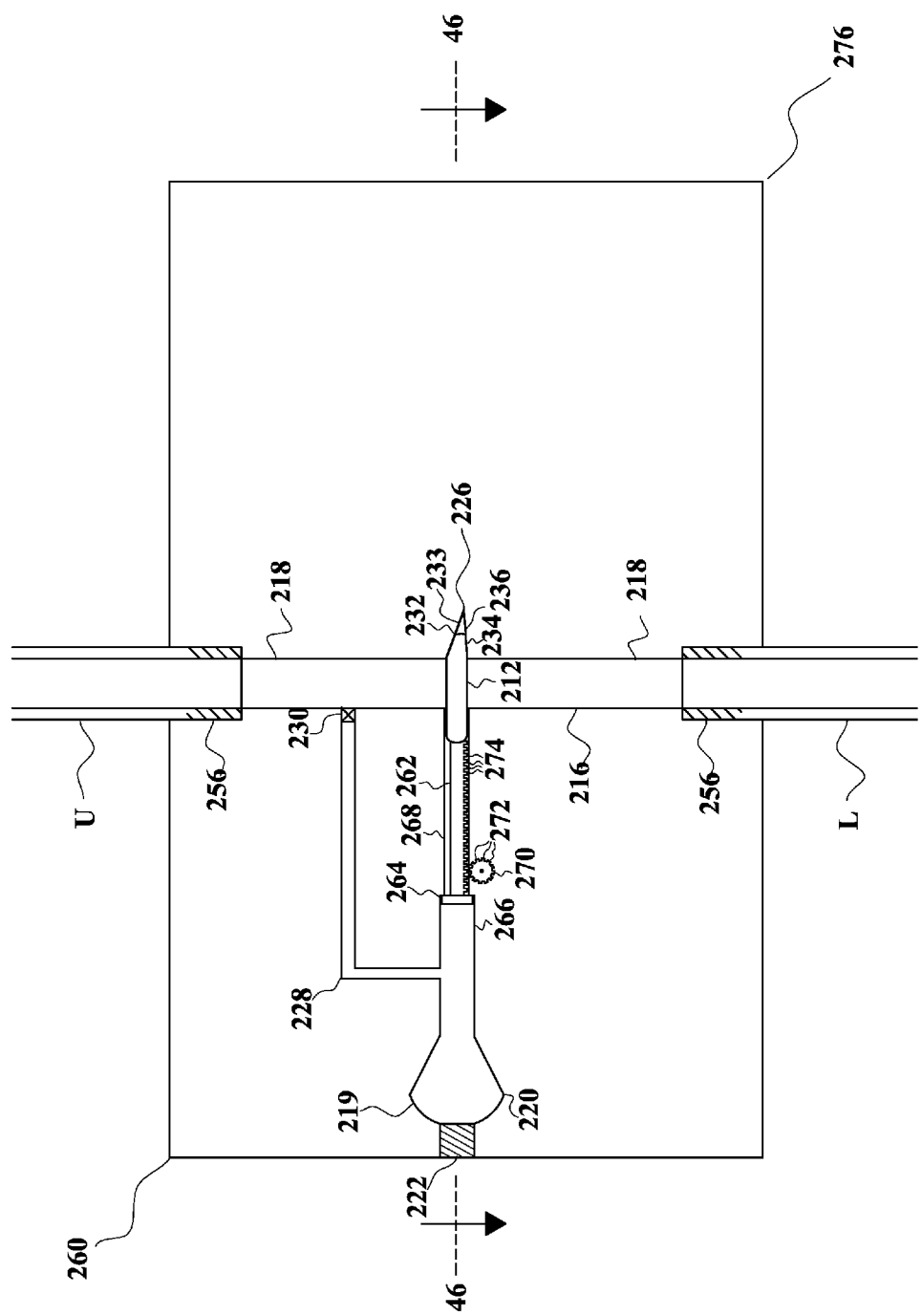
FIG. 42 is a vertical sectional view drawn along lines 42-42 of FIG. 46 of the tenth preferred embodiment of the invention, showing the position of the plate after the explosive charge for the piston has been fired.
Figure 43:
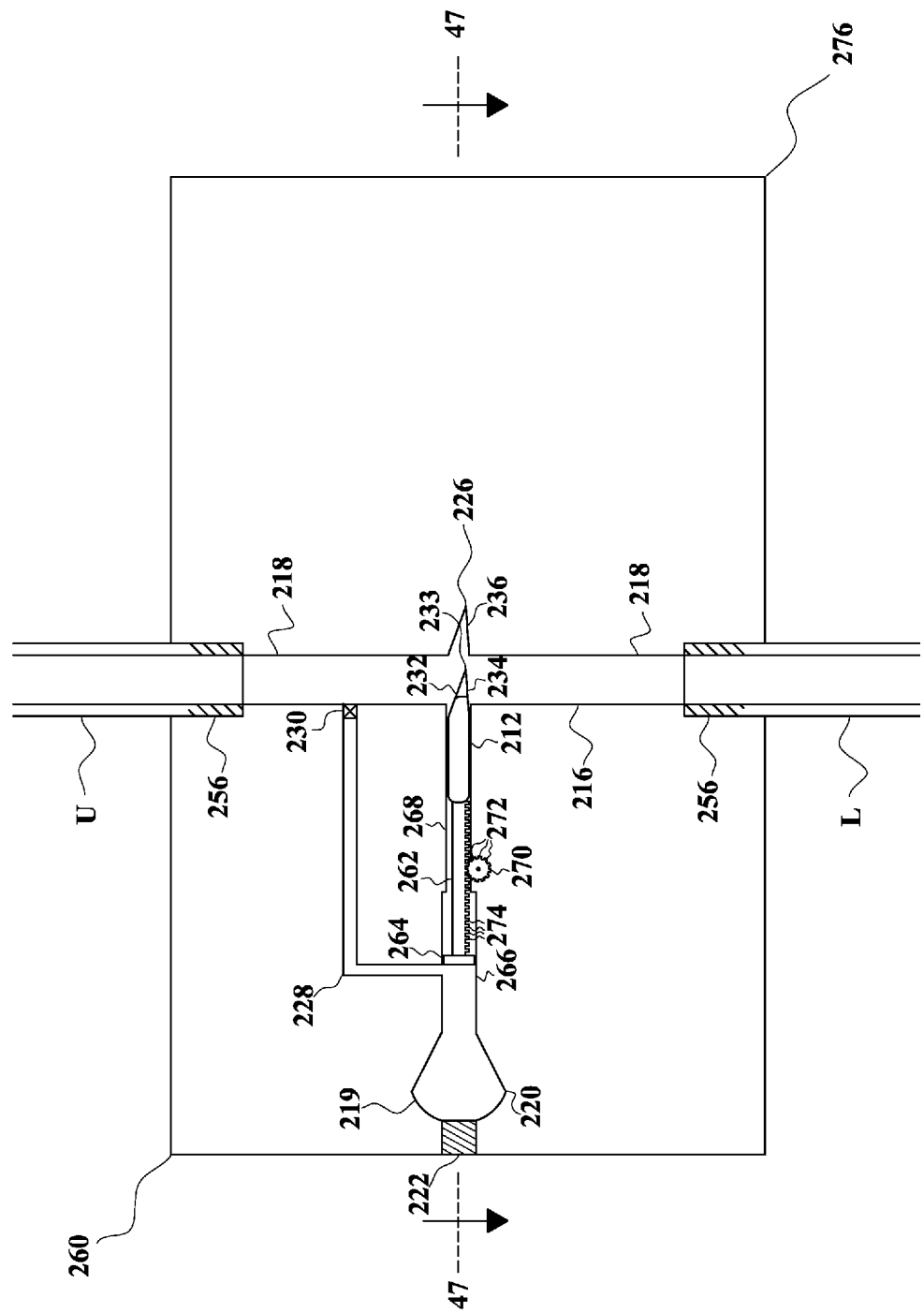
FIG. 43 is a vertical sectional view drawn along lines 43-43 of FIG. 47 of the tenth preferred embodiment of the invention, showing the position of the plate after it has been retracted to cover two-thirds of the channel.
Figure 44:
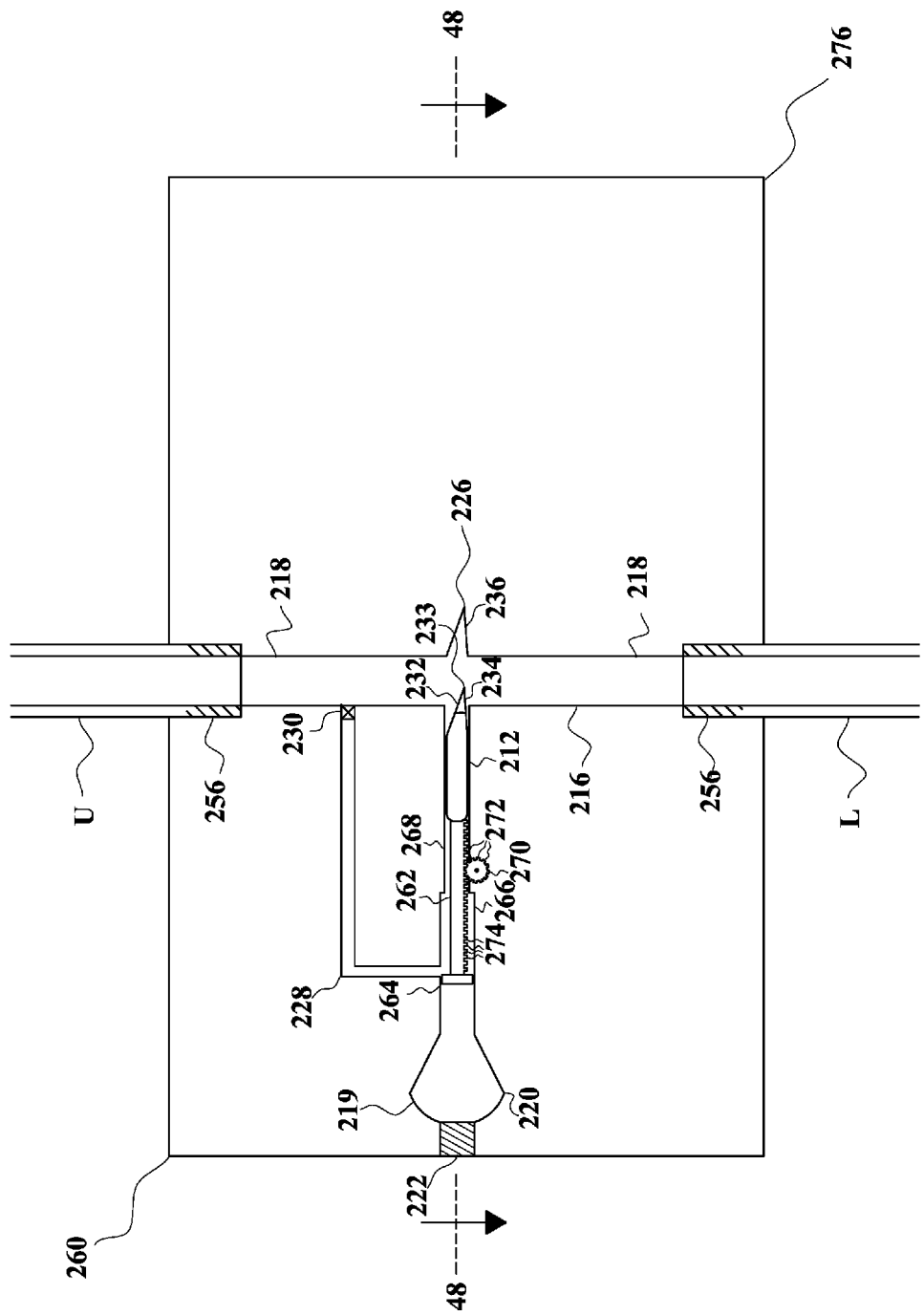
FIG. 44 is a vertical sectional view drawn along lines 44-44 of FIG. 48 of the tenth preferred embodiment of the invention, showing the position of the plate after it has been retracted to cover one-third of the channel.
Figure 46:
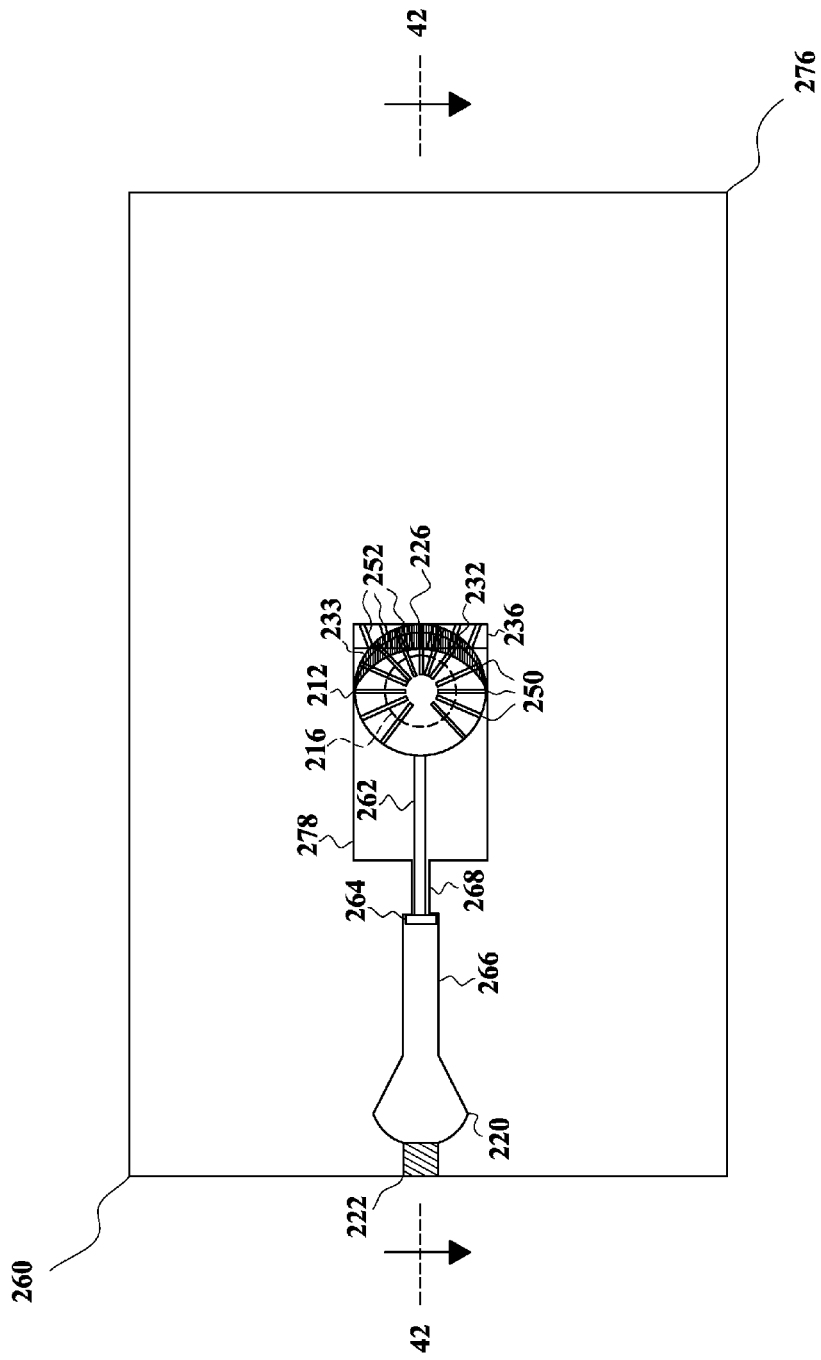
FIG. 46 is a horizontal sectional view drawn along lines 46-46 of FIG. 42 of the tenth preferred embodiment of the invention, showing the position of the plate after the explosive charge for the piston has been fired.

FIG. 42 a vertical sectional view drawn along lines 42-42 of FIG. 46 of the tenth preferred embodiment of the invention, showing the position of the plate after the explosive charge for the piston has been fired, in which it is completely blocking the channel to prevent any fluid from passing through it. FIG. 43 is a vertical sectional view drawn along lines 43-43 of FIG. 47 of the tenth preferred embodiment of the invention, showing the position of the plate after it has been retracted to cover two-thirds of the channel, thus reducing and regulating the flow of oil or other fluid, but not completely blocking it. FIG. 44 is a vertical sectional view drawn along lines 44-44 of FIG. 48 of the tenth preferred embodiment of the invention, showing the position of the plate after it has been retracted to cover one-third of the channel, allowing greater flow, but still reducing it. The gear may be rotated by a motor or other suitable means. The gear may be lowered so as not to impede the movement of the piston and plate when the explosive charge is fired, and raised to mesh with the teeth in the piston.

Figure 47:
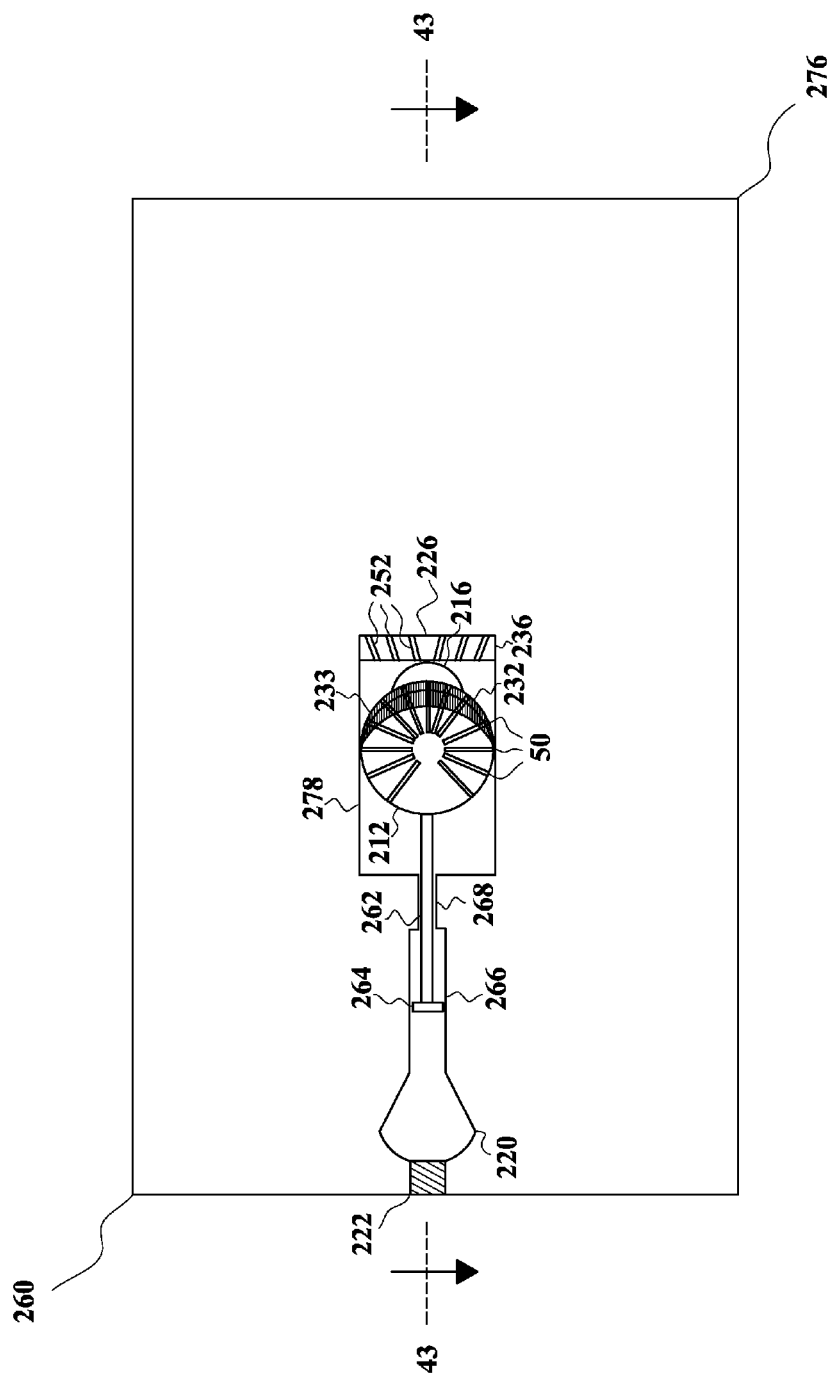
FIG. 47 is a horizontal sectional view drawn along lines 47-47 of FIG. 43 of the tenth preferred embodiment of the invention, showing the position of the plate after it has been retracted to cover two-thirds of the channel.
Figure 48:
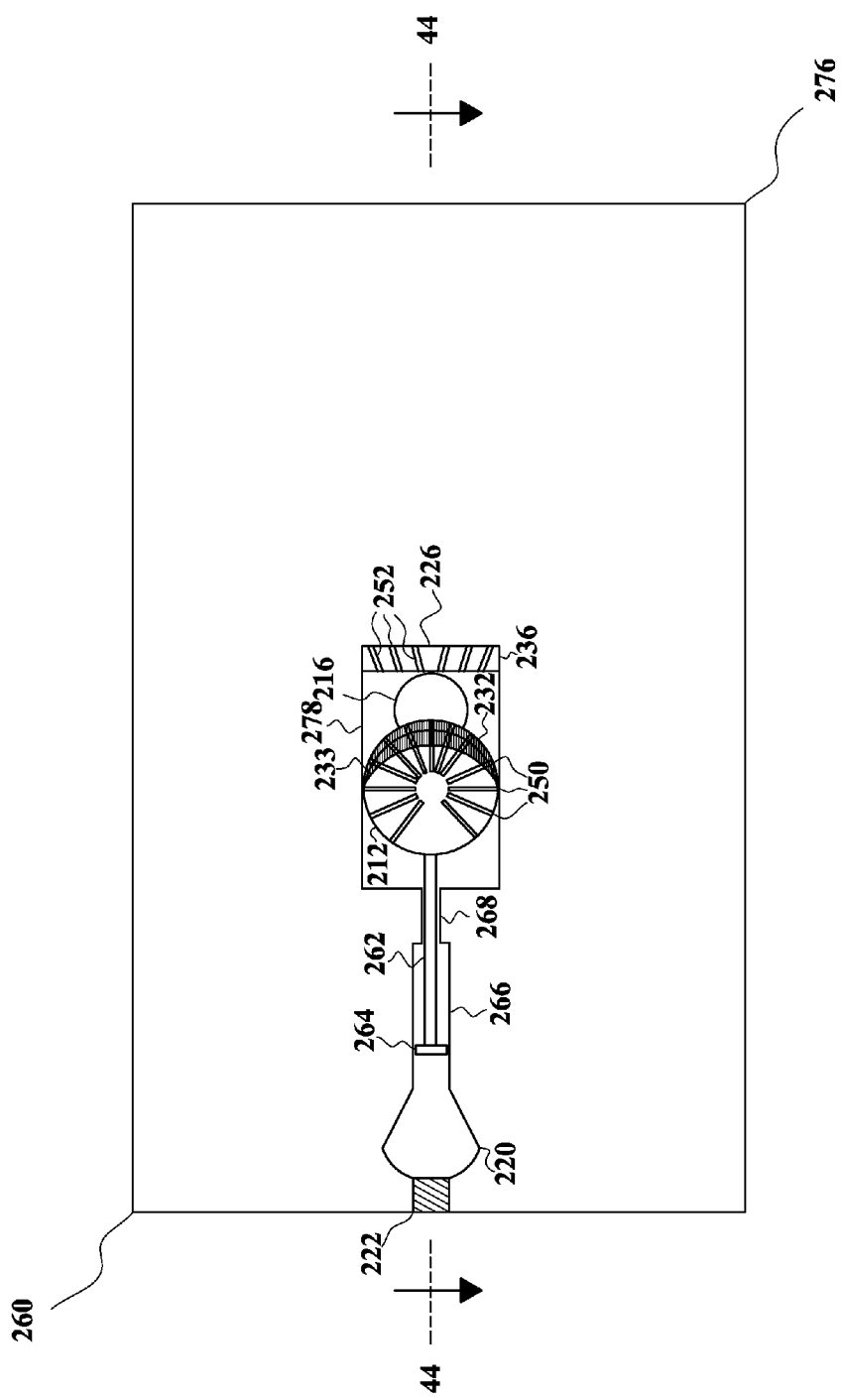
FIG. 48 is a horizontal sectional view drawn along lines 48-48 of FIG. 44 of the tenth preferred embodiment of the invention, showing the position of the plate after it has been retracted to cover one-third of the channel.

FIG. 45 is a horizontal sectional view drawn along lines 45-45 of FIG. 41 of the tenth preferred embodiment of the invention, showing the position of the plate before any explosive charge has been fired. The portion of the passage 278 in which the plate moves may be wider horizontally, even it is the same height vertically as the portion of the narrower passage 268 in which only the piston moves. As before, grooves 250 in the plate and grooves 252 in the female element allow fluid to escape so that it does not impede the movement of the plate. FIG. 46 is a horizontal sectional view drawn along lines 46-46 of FIG. 42 of the tenth preferred embodiment of the invention, showing the position of the plate after the explosive charge for the piston has been fired. FIG. 47 is a horizontal sectional view drawn along lines 47-47 of FIG. 43 of the tenth preferred embodiment of the invention, showing the position of the plate after it has been retracted to cover two-thirds of the channel. FIG. 48 is a horizontal sectional view drawn along lines 48-48 of FIG. 44 of the tenth preferred embodiment of the invention, showing the position of the plate after it has been retracted to cover one-third of the channel.

Figure 49:
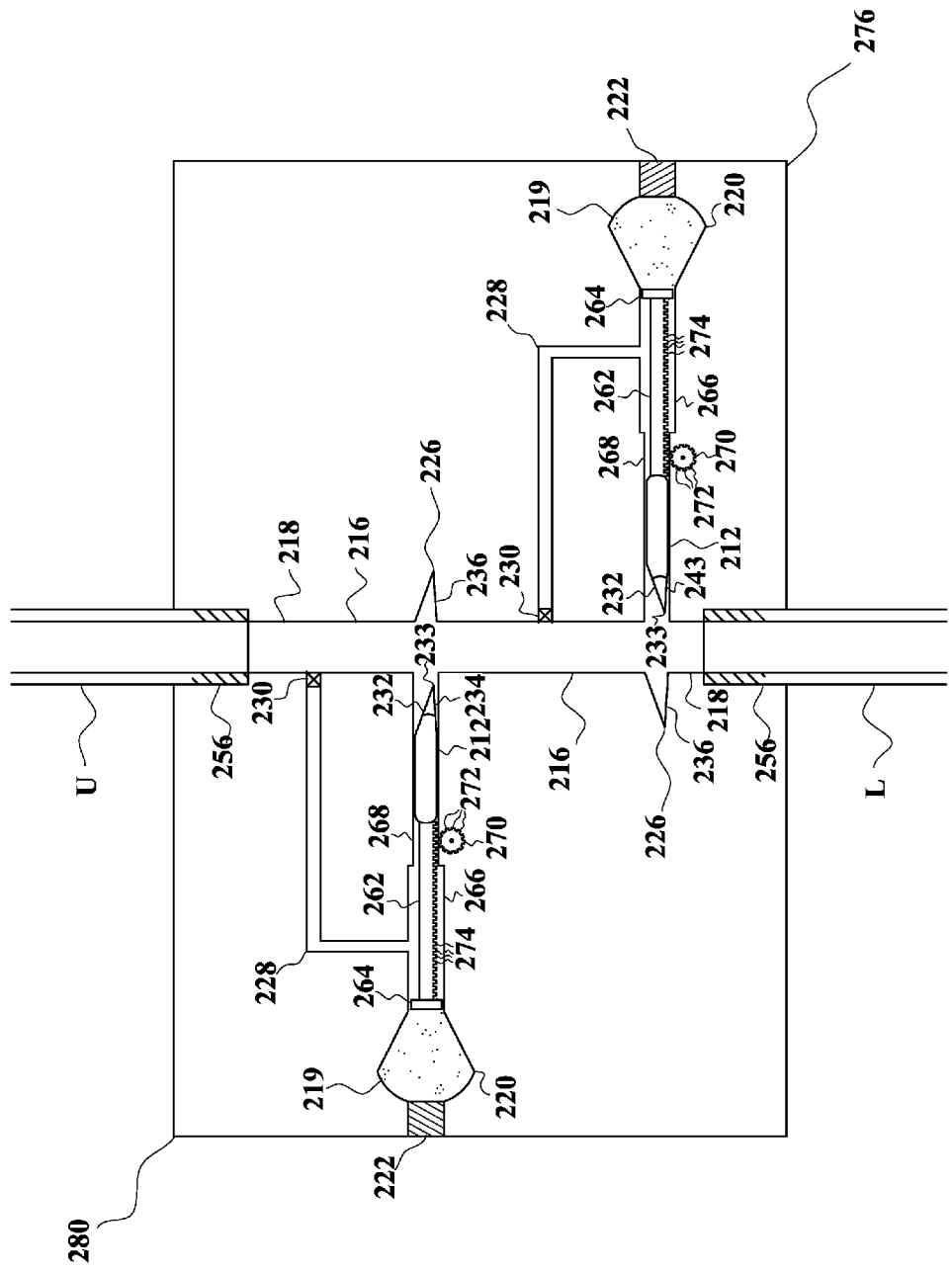
FIG. 49 is a vertical sectional view of the tenth preferred embodiment of the invention, showing a block with two plates.

FIG. 49 a vertical sectional view of the ten preferred embodiment of the invention, showing a block with two plates, that will enter the channel from different directions when the explosive charges are fired. Blocks may also have three or more plates. Plates may enter the channel from any number of different directions. Two or more pistons may be attached to each plate. The distance that pistons move the plates may be varied by the length of the pistons and/or the lengths of the wider and narrower portions of the passages. When there is more than one piston attached to a plate, the other pistons and their charges may serve as backups if a charge fails.

Figure 50:
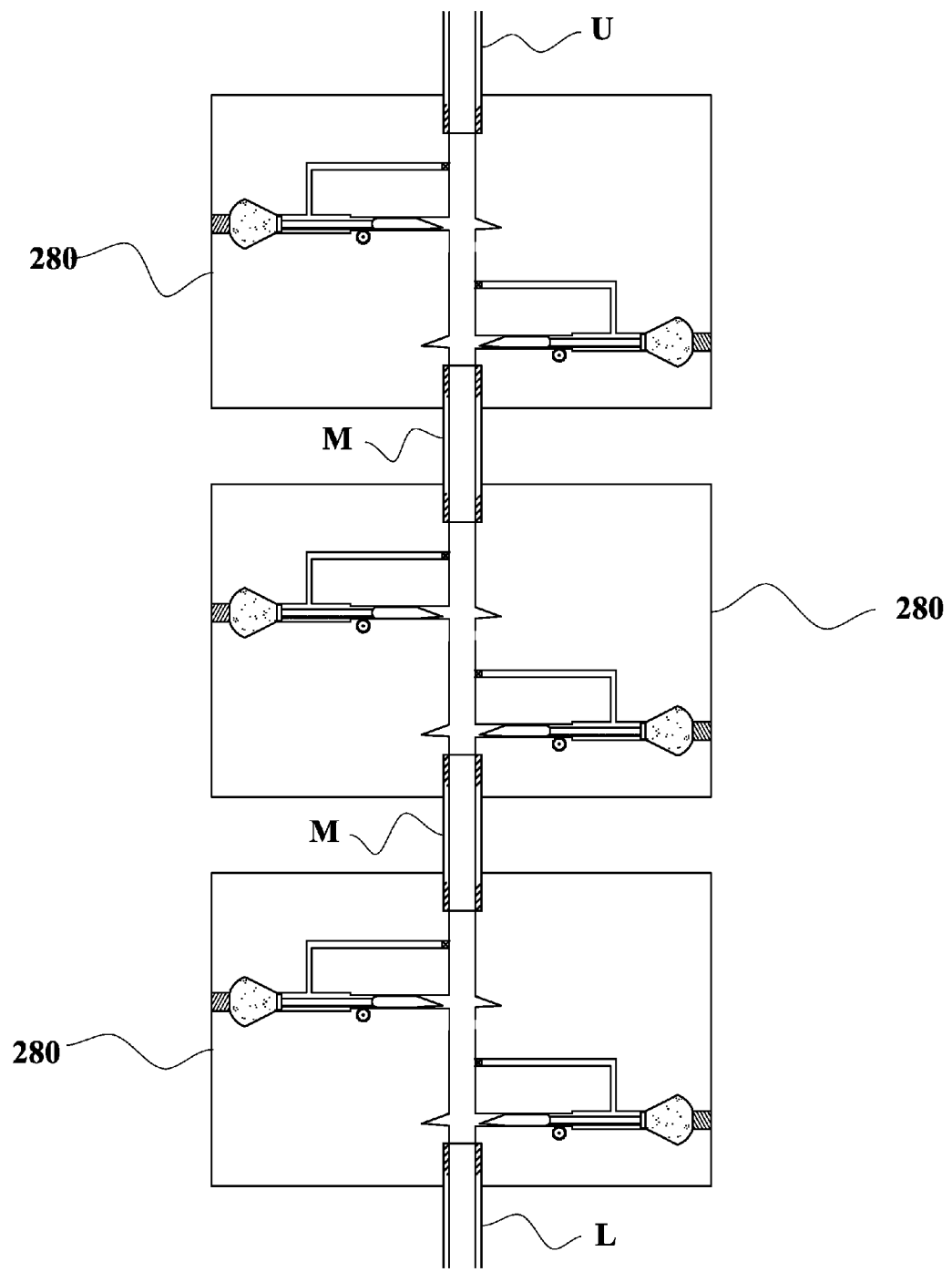
FIG. 50 is a vertical sectional view of the tenth preferred embodiment of the invention, showing three blocks connected by pipes.

FIG. 50 is a vertical sectional view of the tenth preferred embodiment of the invention, showing three blocks 80 connected to upper pipe U, middle pipes M, and lower pipe L. Any number of the blocks may be stacked in a "Christmas tree". The blocks may be directly attached without middle pipes. There may be no upper pipe. Alternatively, a well pipe may pass through the channel, in which case the plate must be capable of cutting through it.

Which plates have been activated may be indicated by displayed numbers, colors or indentations. The invention may be monitored visually on site or remotely by television, radio, wired connections, or any other suitable means. The movement of the gears and pistons may be measured and calibrated. The plates and pistons may be made of metal, high impact plastic or glass, or any other suitable material (perhaps with a metal cutting edge). The invention may be placed anywhere in the flow line. Multiple apparatus of the invention may be placed in series or in parallel. A black flow preventer and tunnels in the plates may be used with the third preferred embodiment, as in the first and second preferred embodiment.

The present invention also comprises a method of preventing blowouts and regulating flow, comprising the steps of:

placing one or more blocks around portions of a pipe through which fluid can flow, with each block having a channel that surrounds the pipe, and with each block having one or more plates that are initially to one side of the channel, one or more pistons attached to each plate, and an explosive charge for each piston, that when fired, can propel the plate to which the piston is attached across the channel to reduce the flow of the fluid;

retaining the blocks on the pipe; and firing one or more of the explosive charges, causing one or more of the pistons to move through passages in the blocks for each of the pistons.

The present invention may comprise further steps of moving the plates partially or completely out from (or into) the channel, using gears having teeth that can engage teeth on the pistons.

New Features Disclosed in Provisional Patent
Application No. 62/289,326, Filed on Jan. 31, 2016

The eleventh preferred embodiment of the invention is a method of placing a problem-solving correction device into an open end of pipe or other opening through which petroleum, natural gas, or other fluid escaping, to correct, solve and repair the problem. The fluid may be escaping due to a failure caused by a split, rupture, fracture and/or displacement. The present invention is designed to work in high pressure areas, where conventional methods of putting material into a pipe or other opening are not effective, because of high pressure. It will transport the needed correction material to the site of the blowout, so that the problem can be solved, and the leakage stopped. Lights, cameras and sleeves (made of metal, plastic, rubber, composites or other suitable materials) are transported to the site by the apparatus of the present invention. The apparatus may be powered by well pressure, by electrical power, or have other power sources.

Figure 51:
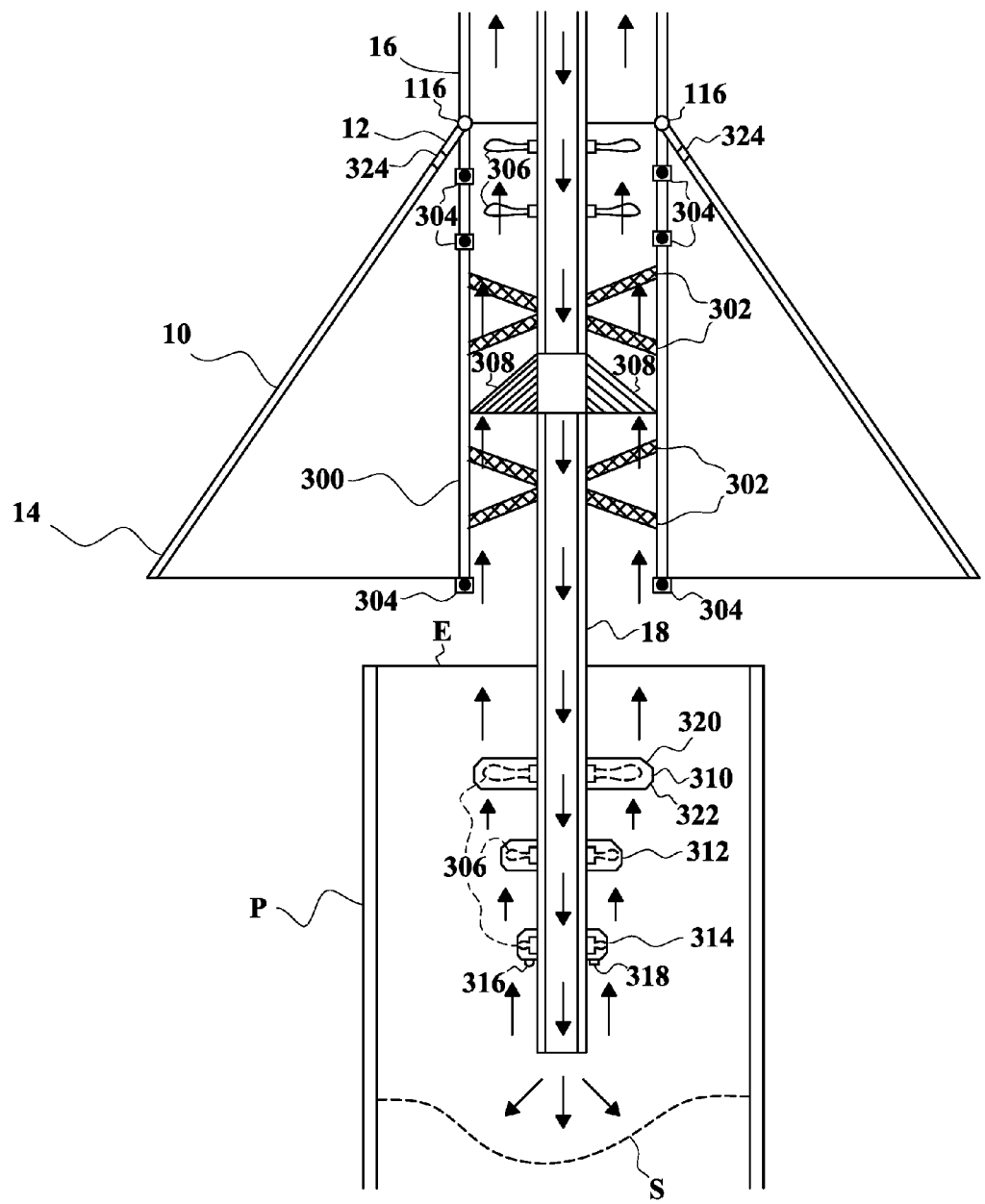
FIG. 51 is a vertical sectional view, showing the eleventh preferred embodiment of the invention before the valve and sleeve are lowered down onto the well pipe.
Figure 52:
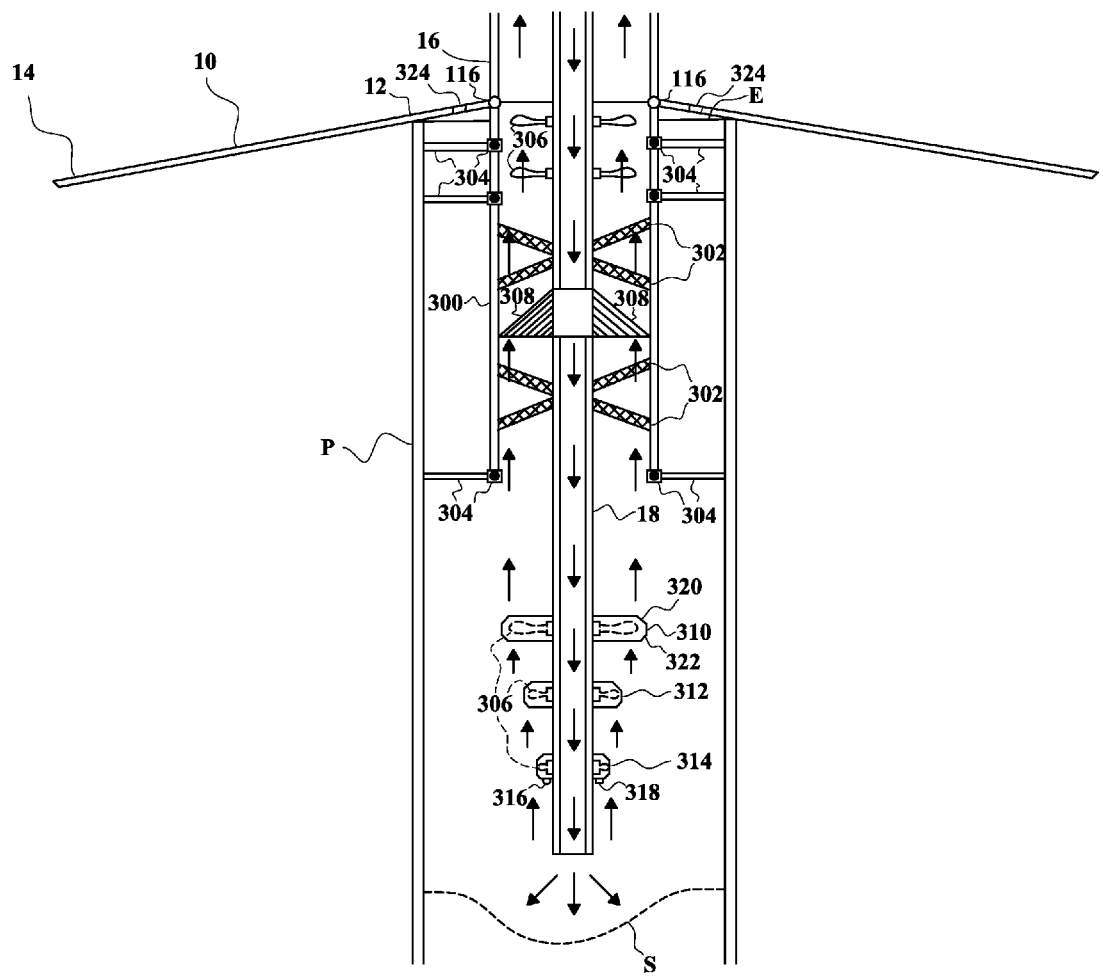
FIG. 52 is a vertical sectional view, showing the eleventh preferred embodiment of the invention after the valve and sleeve are lowered down onto the well pipe.

FIG. 51 is a vertical sectional view, showing the eleventh preferred embodiment of the invention before the funnel 10 and sleeve 300 are lowered down onto and into the well pipe P. FIG. 52 is a vertical sectional view, showing the eleventh preferred embodiment of the invention after the funnel and sleeve are lowered down onto the well pipe. (It will work in substantially the same way if another opening from which fluid is escaping is substituted for the well pipe.) The funnel and sleeve may be made of iron, steel, other metal, plastic or cement. If they are made of plastic, the plastic may be infused or combined with graphene, nylon or other enhancing material. Sleeve support arms 302 secure the sleeve to the high pressure pipe 18. (The sleeve support arms must support and stay in place with clockwise rotation of the supporting high pressure pipe. They must disconnect from the sleeve with counterclockwise rotation of the high pressure pipe, so that the valve, i.e., the rest of the apparatus, can be removed.) Expanding rings with locking mechanisms 304 secure the sleeve inside the well pipe (or other opening) and prevent leakage. (Alternatively, the locking mechanisms may be part of the sleeve.) The expanding rings and locking mechanisms may be activated by counterclockwise rotation of the return pipe 16 (which may support and control the apparatus), by a power source (electrical, hydraulic, explosive charge, springs, or mechanical), or controlled remotely.

Propellers 306 and a turbine 308 move the escaping fluid upward through the return pipe 16. The propellers and turbine may rotate either clockwise or counterclockwise. Five propellers are shown, two above the turbine and three in the positioning rings 310, 312 and 314, but there may be only one propeller or any number of propellers. The propellers in the positioning rings may be protected from damage by the positioning rings. The propellers may have each have any number of blades. The propellers may move forward or backward, and push or pull. They may be moved between an extended active position and a collapse passive position. While a single turbine is shown, there may be multiple turbines. A turbine may be active or passive.

A light 316 and camera 318 may be attached to the bottom positioning ring 314, or to other positioning rings. Alternatively, there may be multiple lights and cameras, and they may be attached anywhere. The top edges 320 of the positioning rings are angled to increase the velocity of the fluids. The bottom edges 322 of the positioning rings are angled to make it easier to get them into the pipe or other opening.

Vents 324 allow fluid inside the funnel 10, but outside the sleeve 300, to escape, which useful in placing the valve into position. The funnel is shown in a closed position in FIG. 27 and in an open position in FIG. 28. The funnel can be separated and disarticulated from the rest of the valve apparatus, as in FIG. 19. The sleeve may expand vertically by telescoping. The return pipe 16 (which supports the valve, i.e., the rest of the apparatus) may disarticulate the valve from the sleeve when it is rotated in a counterclockwise direction. The return pipe support the valve and valve parts, including propellers, turbines, positioning rings, and sleeve support arms. The return pipe supples power if, when and where needed, to the turbine, propellers, light and camera.

Figure 53:
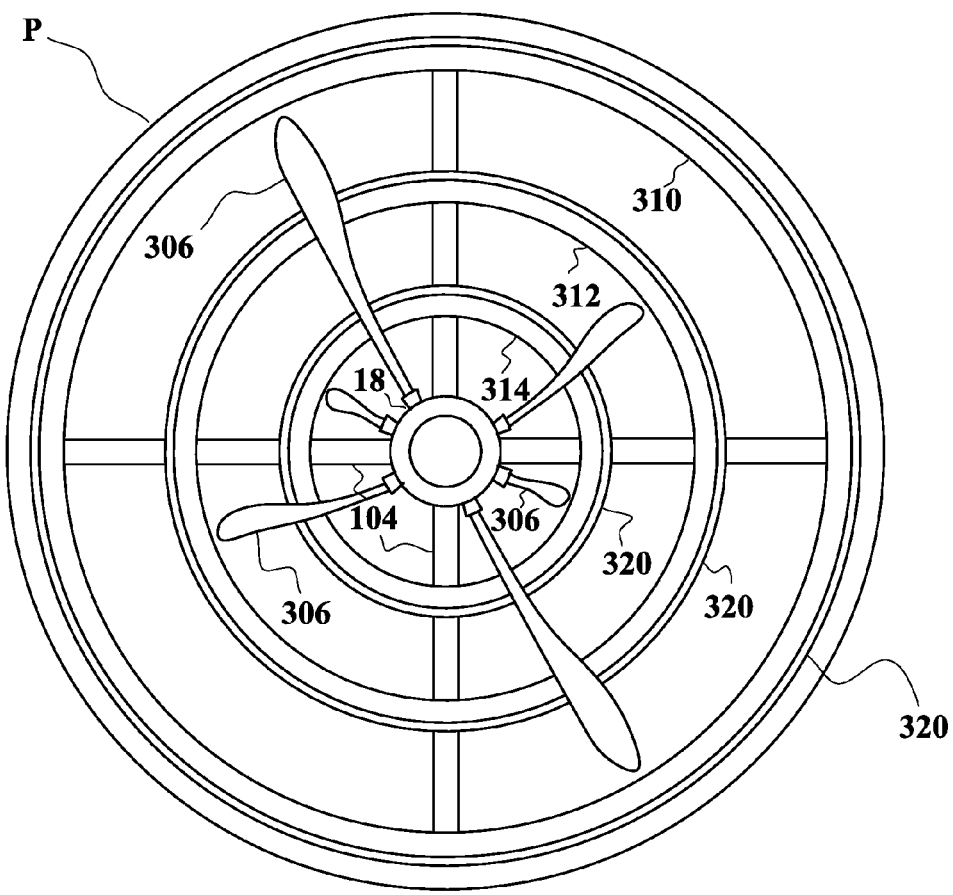
FIG. 53 is a top detail view of the well pipe with the cylindrical positioning rings inserted, in the eleventh preferred embodiment of the invention.
Figure 54:
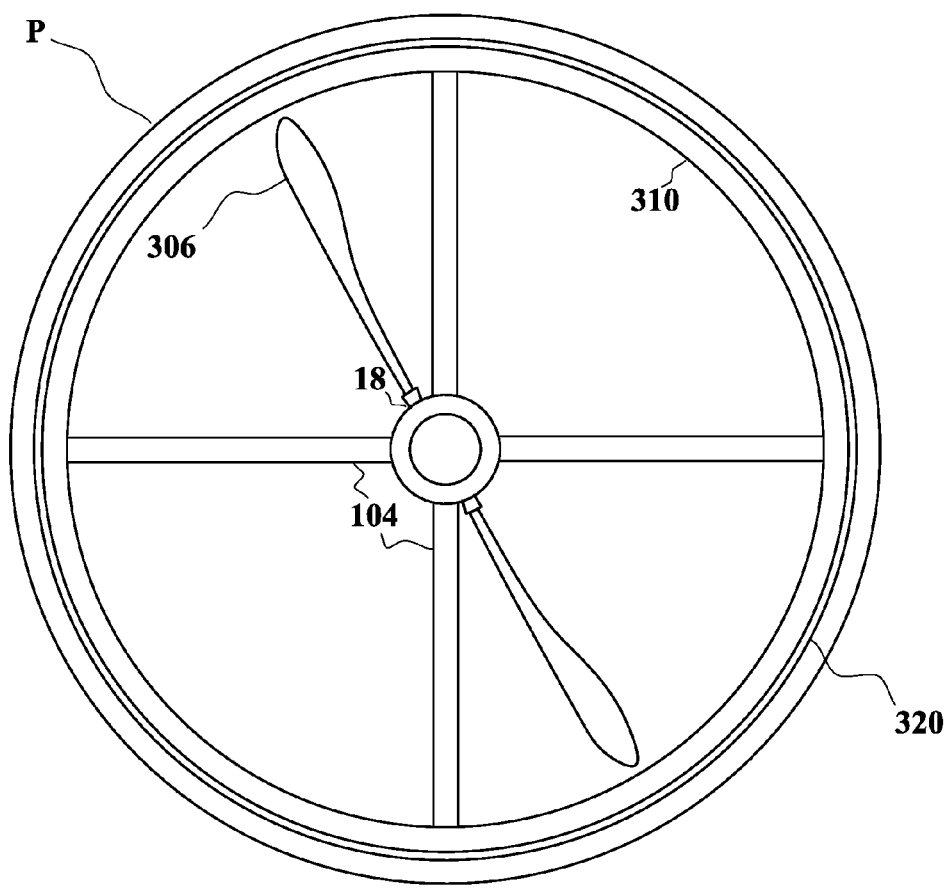
FIG. 54 is a top detail view of the largest positioning ring, in the eleventh preferred embodiment of the invention.
Figure 55:
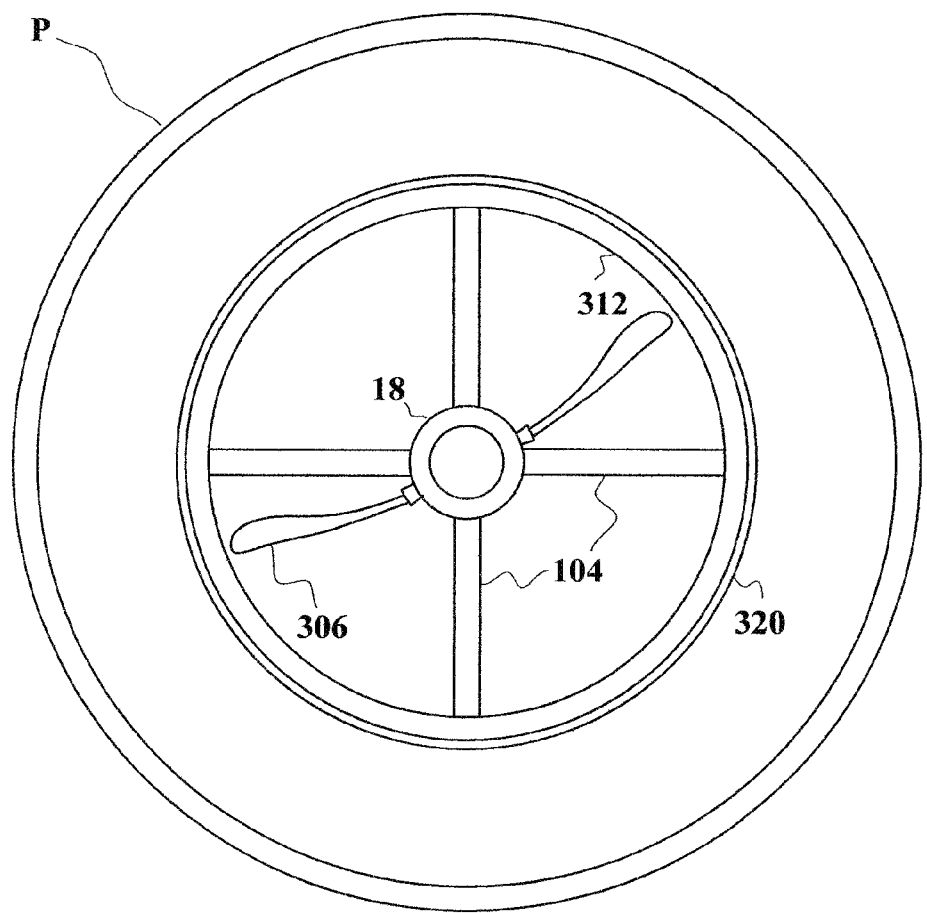
FIG. 55 is a top detail view of the middle positioning ring, in the eleventh preferred embodiment of the invention.
Figure 56:
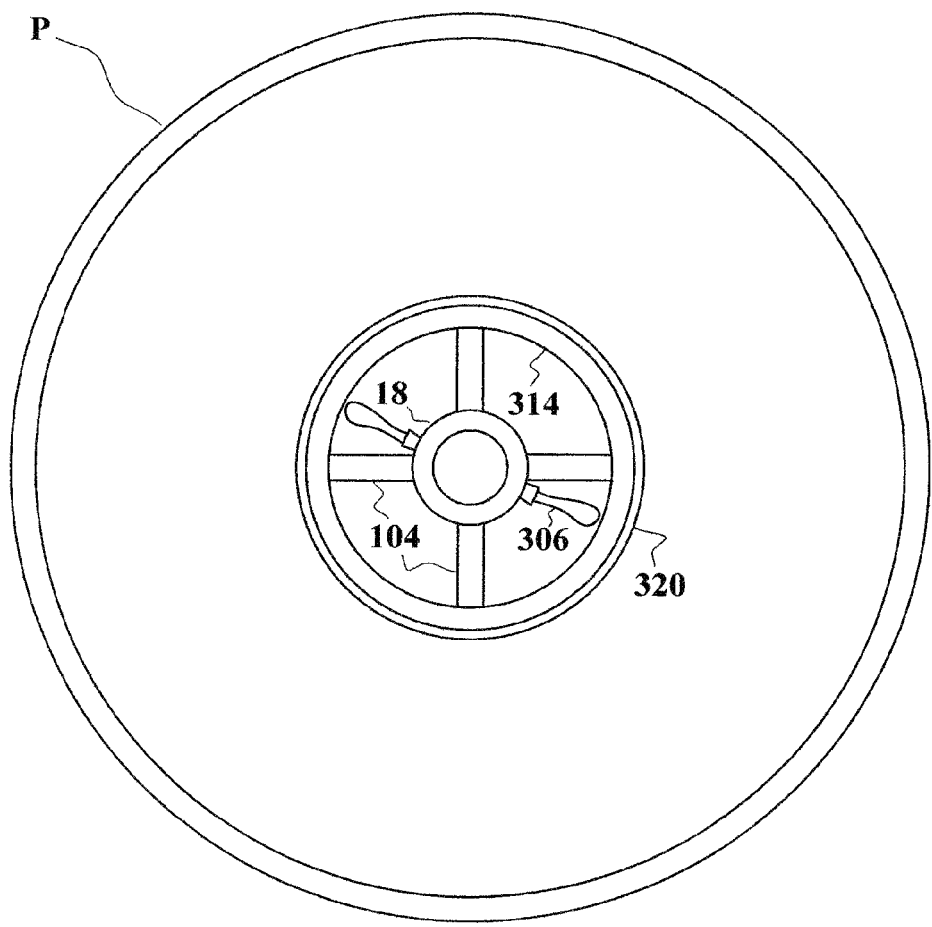
FIG. 56 is a top detail view of the smallest positioning ring, in the eleventh preferred embodiment of the invention.

FIG. 53 is a top detail view of the well pipe with the cylindrical positioning rings inserted, in the eleventh preferred embodiment of the invention, showing the propellers 306 that rotate inside the rings, and the angled top edges 320 of the rings. FIG. 54 is a top detail view of the largest positioning ring, in the eleventh preferred embodiment of the invention. FIG. 55 is a top detail view of the middle positioning ring, in the eleven preferred embodiment of the invention. FIG. 56 is a top detail view of the smallest positioning ring, in the eleventh preferred embodiment of the invention. Preferably, the largest positioning ring should have a diameter slightly smaller than the diameter of the sleeve, while the smallest positioning ring has a diameter that is one-third or less of the diameter of the sleeve. While three positioning rings are shown, there may be any number of positioning rings. The sleeve and turbine should be above the positioning rings, so that the sleeve can be aligned to enter the well pipe or other opening from which fluid is escaping.

The invention also encompasses a method of recovering from blowouts, including the steps of:

(a) placing a larger end of a funnel and a sleeve adjacent to an open end of a well pipe or other opening through which a first fluid is escaping, the funnel having a smaller end that is connected to a return pipe;

(b) moving the funnel and sleeve into alignment with the well pipe, with the aid of one or more positioning rings attached to the high pressure pipe, that can fit inside the well pipe or other opening;

(c) inserting the sleeve into the open end of the well pipe or other opening, said sleeve being connected to the return pipe;

(d) locking the sleeve into the pipe or other opening from which the first fluid is escaping, using a expanding rings with a locking mechanism attached to the sleeve;

(e) inserting a high pressure pipe into the well pipe;

(f) pumping the second fluid, at a higher pressure than that of the first fluid, through the high pressure pipe into the well pipe;

(g) separating the first fluid by the second fluid in a space adjacent to an end of the high pressure pipe that has been inserted into the well pipe; and (h) accelerating a portion of the first fluid that is not held back by the greater pressure of the second fluid, causing it to flow through the sleeve and the return pipe at an increased velocity, but at a reduced pressure due the Bernoulli effect, thus supplying suction that helps to move the funnel down onto the well pipe;

(i) wherein the Bernoulli effect is increased by the pressure of the first fluid; and (j) the pressure of the first fluid accelerates devices that accelerate it, further increasing the ram jet effect as well as the Bernoulli effect.

Steps (f) and (g) may not apply when the pressure of the first fluid is used to increase the speed (or velocity) of the propellers and turbines.

Alternatively, rather than using the return pipe to support the apparatus, it may be supported by a cable or hose.

Reversable and Passive Attachments

All propellers, turbines and other attachments can be made reversible, to make it easier to remove the valve. All propellers and turbines can be made passive (i.e., neutral) to allow the pipe flow and pressure to function as if there was no valve in place. They can be reactivated to their active function if and when necessary.

It is to be understood that the present invention is not limited to the embodiments described above, but encompasses any and all embodiments within the scope of the following claims.

I claim:

1. A blowout recovery valve, comprising:
   a valve having a smaller end and a larger end, with the larger end being suitably dimensioned and configured to be placed over an open end of a well pipe through which a first fluid is escaping,
   a return pipe connected to the smaller end of the valve;
   a sleeve, suitably dimensioned and configured to be placed inside the open end of the well pipe, with the sleeve being connected to the return pipe;
   a high pressure pipe passing through the valve, suitably dimensioned and configured to be insertable into the well pipe; and
   wherein, when a second fluid is pumped through the high pressure pipe at a pressure greater than that of the first fluid, the first fluid will be separated by the second fluid in a space adjacent to an end of the high pressure pipe that has been inserted into the well pipe, and a portion of the first fluid that is not held back by the greater pressure of the second fluid will flow through the sleeve and the return pipe at an accelerated velocity, but at a reduced pressure due to the Bernoulli effect, thus supplying suction to help move the valve down onto the well pipe, which is enhanced by pressure from the first fluid in the well pipe.

2. The blowout recovery valve according to claim 1, further comprising:
   expanding rings with locking mechanisms, that secure the sleeve inside the well pipe and prevent leakage.

3. The blowout recovery valve according to claim 1, further comprising:
   support arms, that secure the sleeve to the high pressure pipe.

4. The blowout recovery valve according to claim 1, wherein:
   propellers accelerate the flow of the escaping first fluid through the return pipe, while pressure from the first fluid in the well pipe also increases the speed of the propellers.

5. The blowout recovery vale according to claim 1, wherein:
   one or more turbines accelerate the flow of the escaping first fluid through the return pipe, while pressure from the first fluid in the well pipe also increases the speed of the propellers.

6. The blowout recovery valve according to claim 1, further comprising:
   one or more positioning rings attached to the high pressure pipe, that can fit inside the well pipe, with propellers inside the positioning rings that accelerate the flow of the escaping first fluid through the return pipe.

7. The blowout recovery valve according to claim 1, wherein:
   the valve is made of plastic.

8. The blowout recovery valve according to claim 7, wherein:
   the plastic is infused with graphene.

9. The blowout recovery valve according to claim 7, wherein:
   the plastic is infused with phosphorescent material.

* * * * *